US011953597B2

(12) United States Patent
Egawa

(10) Patent No.: US 11,953,597 B2
(45) Date of Patent: Apr. 9, 2024

(54) DISTANCE SENSOR, DISTANCE MEASUREMENT DEVICE, AND IMAGE SENSOR

(71) Applicant: Sony Semiconductor Solutions Corporation, Kanagawa (JP)

(72) Inventor: Yoshitaka Egawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 657 days.

(21) Appl. No.: 16/635,626

(22) PCT Filed: Jul. 26, 2018

(86) PCT No.: PCT/JP2018/028070
§ 371 (c)(1),
(2) Date: Jan. 31, 2020

(87) PCT Pub. No.: WO2019/031261
PCT Pub. Date: Feb. 14, 2019

(65) Prior Publication Data
US 2021/0124047 A1    Apr. 29, 2021

(30) Foreign Application Priority Data

Aug. 7, 2017  (JP) .................................. 2017-152501

(51) Int. Cl.
*G01S 17/10* (2020.01)
*G01S 7/484* (2006.01)
(Continued)

(52) U.S. Cl.
CPC .............. *G01S 17/10* (2013.01); *G01S 7/484* (2013.01); *G01S 7/4861* (2013.01); *G01S 7/4865* (2013.01)

(58) Field of Classification Search
CPC ...................................................... G01S 17/10
See application file for complete search history.

(56) References Cited

U.S. PATENT DOCUMENTS 6,049,358 A     4/2000  Jun
9,383,753 B1 *  7/2016  Templeton .............. G01S 17/89
(Continued)

FOREIGN PATENT DOCUMENTS

CN      106256313 A    12/2016
JP      2003087657 A    3/2003
(Continued)

OTHER PUBLICATIONS

Scott, et al., High-Dynamic-Range Laser Amplitude and Phase Noise Measurement Techniques, IEEE Journal on Selected Topics in Quantum Electronics, vol. 7, No. 4, Jul./Aug. 2001 (hereinafter "Scott").*

(Continued)

*Primary Examiner* — Jean Paul Cass
(74) *Attorney, Agent, or Firm* — Michael Best & Friedrich LLP

(57) ABSTRACT

A distance sensor according to an embodiment of the present disclosure includes: a controller that instructs a light source section to emit a first light pulse; a light receiver that includes a photodiode which causes a signal charge to be generated by receiving a first reflected light pulse corresponding to the first light pulse, and generates a light reception signal by storing the signal charge and converting the signal charge into a voltage; a signal change detector that performs a first detection operation of detecting a first signal change corresponding to the first reflected light pulse in the light reception signal; and a time measurement section that performs, on a basis of the first signal change, a first measurement operation of measuring a first time interval from an emission timing of the first light pulse in the light source section to a reception timing of the first reflected light pulse in the light receiver.

26 Claims, 31 Drawing Sheets

(51) Int. Cl.
*G01S 7/4861* (2020.01)
*G01S 7/4865* (2020.01)

(56) References Cited

U.S. PATENT DOCUMENTS

| | | | |
|---|---|---|---|
| 11,022,689 B2* | 6/2021 | Villeneuve | H01S 3/06733 |
| 2005/0094238 A1 | 5/2005 | Kostamovaara et al. | |
| 2010/0321547 A1 | 12/2010 | Morikawa | |
| 2011/0313722 A1* | 12/2011 | Zhu | G01S 17/933 |
| | | | 702/159 |
| 2012/0194798 A1 | 8/2012 | Crawford et al. | |
| 2014/0291483 A1 | 10/2014 | Yamada | |
| 2016/0373652 A1 | 12/2016 | Ando | |
| 2017/0070029 A1 | 3/2017 | Moeneclaey et al. | |
| 2017/0089292 A1 | 3/2017 | Nishida | |
| 2017/0273161 A1* | 9/2017 | Nakamura | G01S 7/484 |
| 2020/0284883 A1* | 9/2020 | Ferreira | G01S 7/4816 |
| 2020/0300975 A1* | 9/2020 | Okuni | G01S 17/10 |
| 2021/0152755 A1* | 5/2021 | Ando | A61B 5/1455 |
| 2022/0128352 A1* | 4/2022 | Binder | G01B 11/026 |

FOREIGN PATENT DOCUMENTS

| | | |
|---|---|---|
| JP | 2006258690 A | 9/2006 |
| JP | 2010-091377 A | 4/2010 |
| JP | 2014057229 A | 3/2014 |
| JP | 2017011693 A | 1/2017 |

OTHER PUBLICATIONS

Machine translation of Japanese Patent Pub. No. JP 2017-011693 to Ando that was filed in 2016 (US20210152755A1).*
Machine translation of Japanese Patent Pub. No. JP 2014-057229 A to Miyashita.*
Machine translation of Japanese Patent Pub. No. JP 2006-258690 to Sugiyama that was filed in 2005.*
Extended European Search Report dated Jul. 7, 2020 for correspondence European Application 18843454.2.
Sun Zhihui et al: "Pulsed time-of-flight laser scanning techniques for industrial safety monitoring applications", Sixth International Symposium on Precision Engineering Measurements and Instrumentation, SPIE, 1000 20th St. Bellingham WA 98225-6705 USA, vol. 7544, No. 1, Aug. 24, 2010 (Aug. 24, 2010), pp. 1-8, XP060005163, DOI: 10.1117/12.885351 [retrieved on Dec. 30, 2010] * paragraphs [0002]-[0005].
Sami Kurtti et al: "An Integrated Laser Radar Receiver Channel Utilizing a Time-Domain Walk Error Compensation Scheme", IEEE Transactions on Instrumentation and Measurement, IEEE Service Center, Piscataway, NJ, US, vol. 60, No. I, Jan. 1, 2011 (Jan. 1, 2011), pp. 146-157, XP011337343,ISSN: 0018-9456, DOI: 10.1109/TIM.2010.2047663* p. 149 *.

* cited by examiner

[ FIG. 1 ]
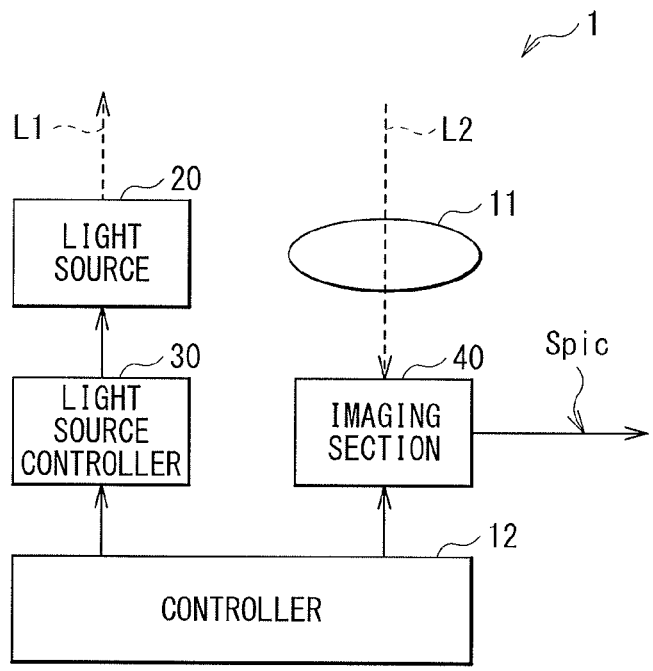
[ FIG. 2 ]
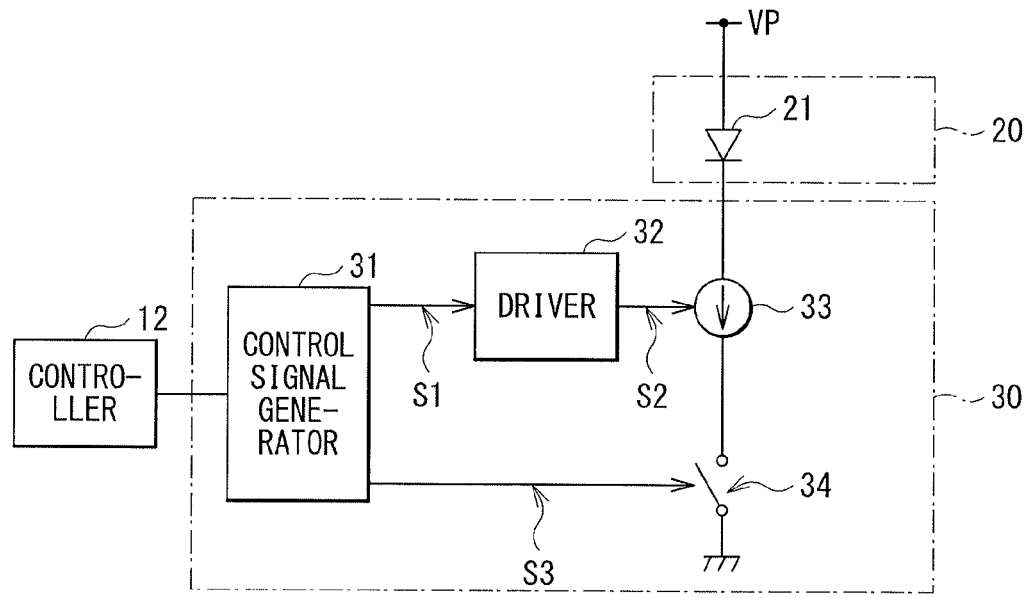

[ FIG. 3 ]
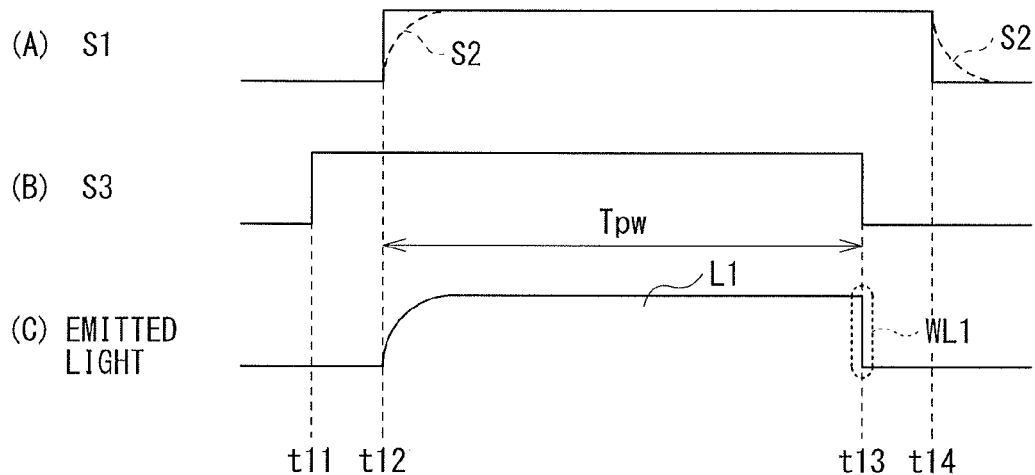
[ FIG. 4 ]
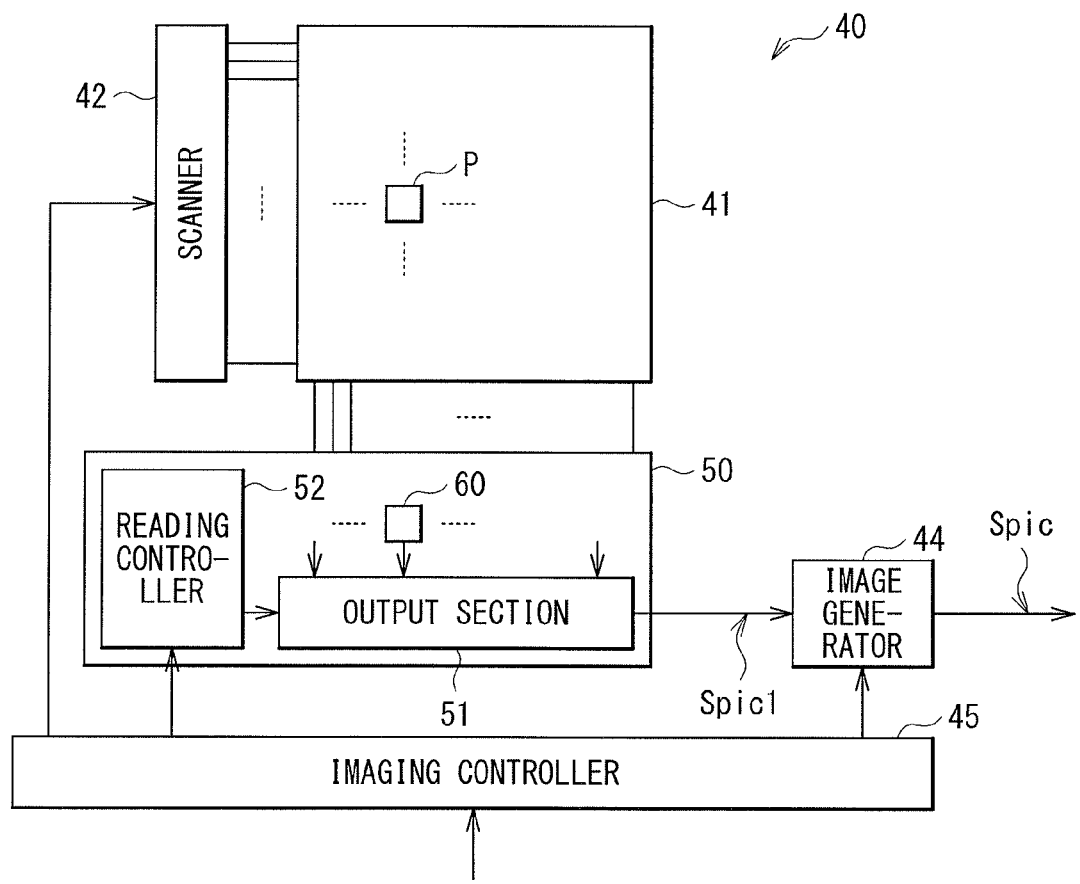

[FIG.5]
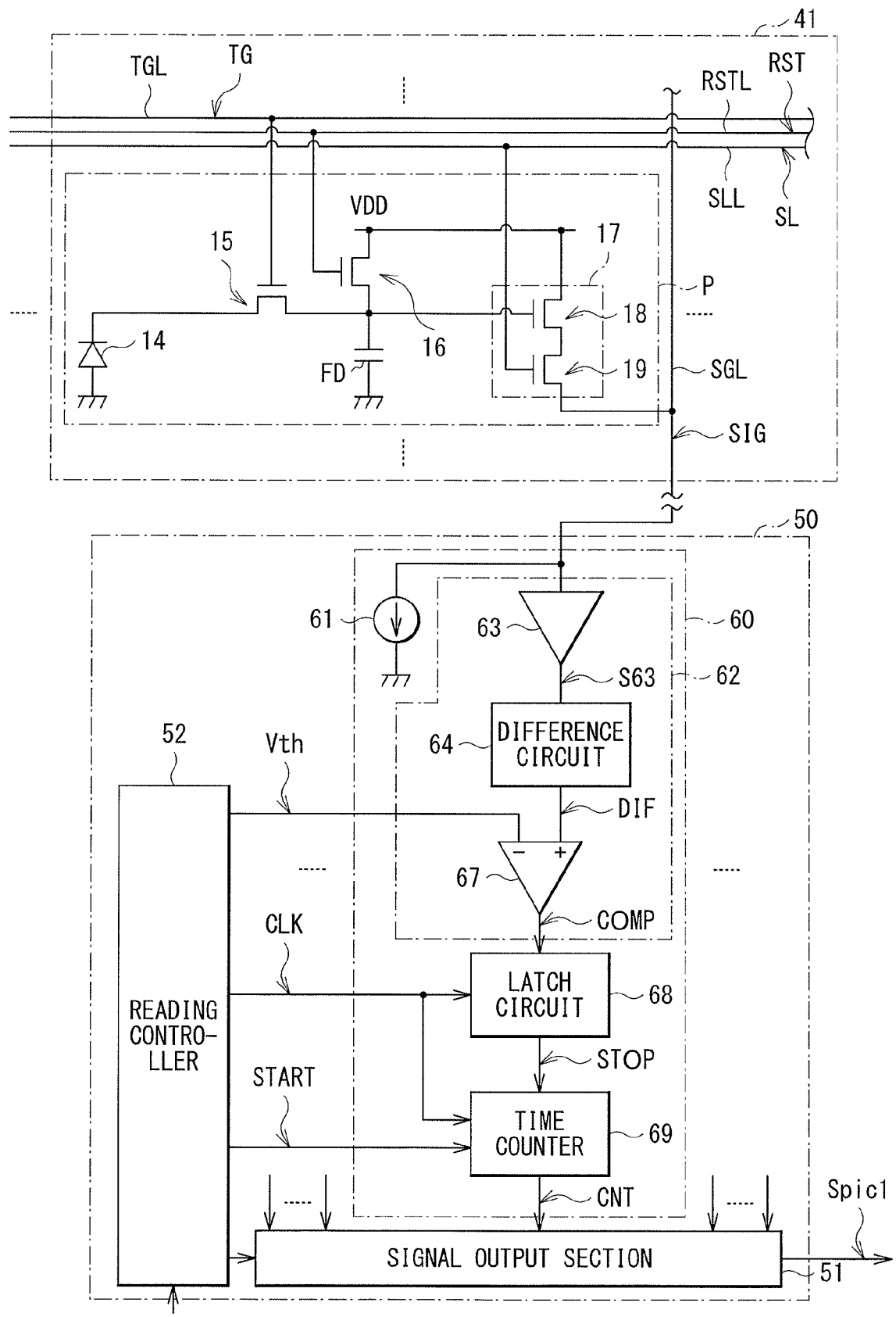

[ FIG. 6 ]
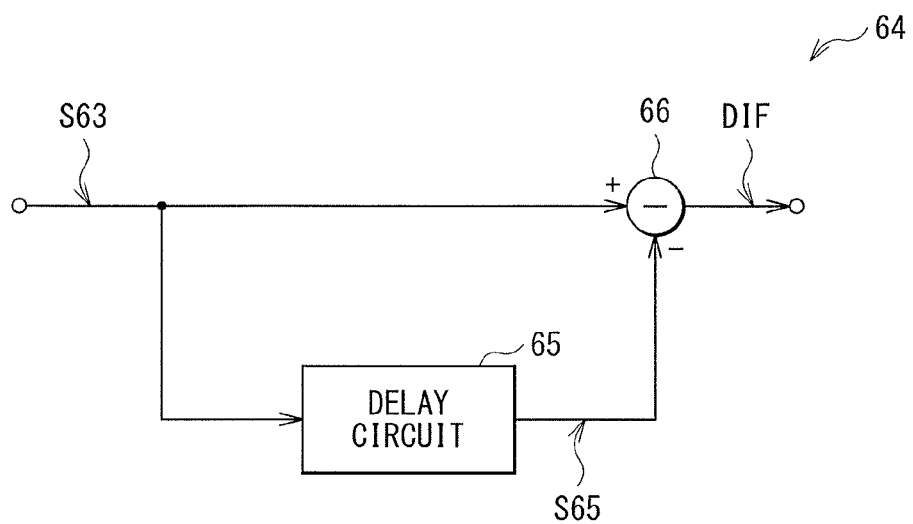

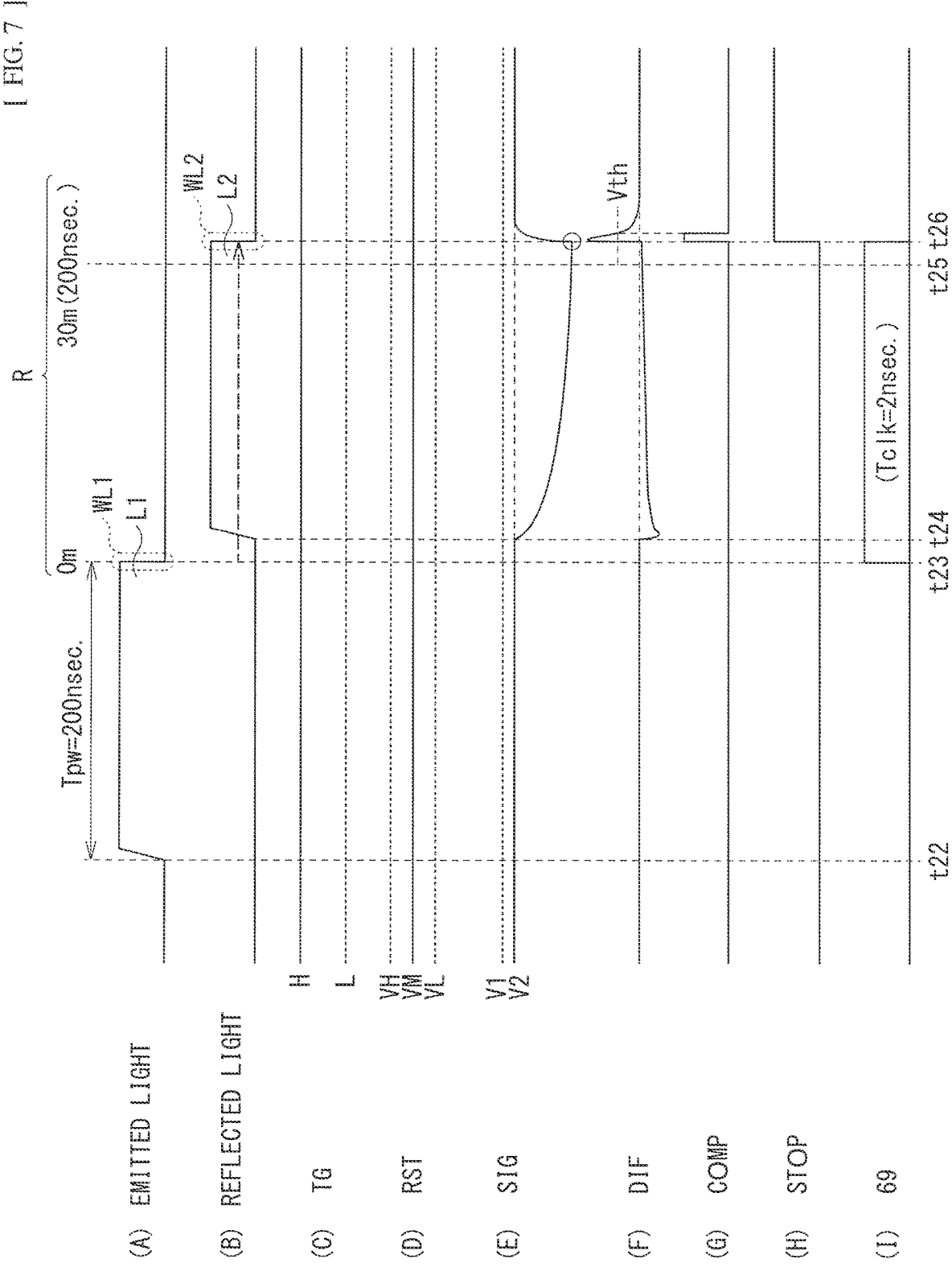

[ FIG. 8 ]
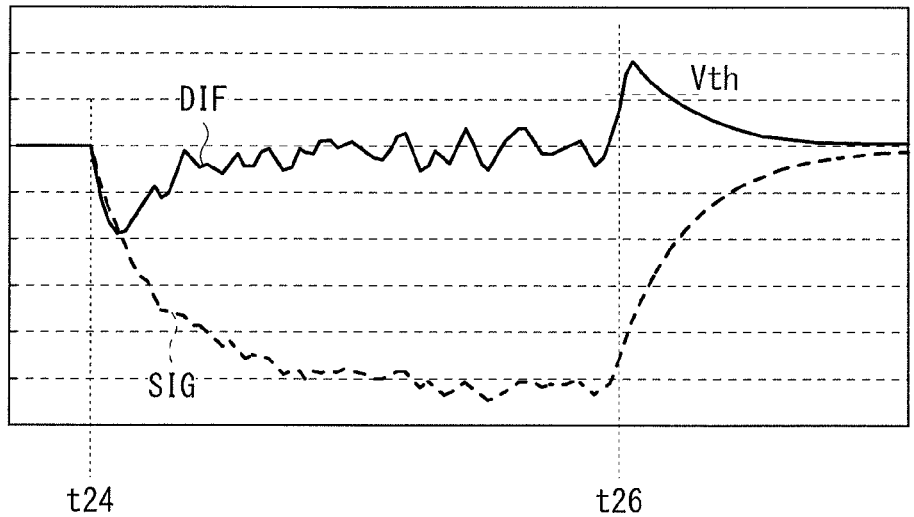
[ FIG. 9 ]
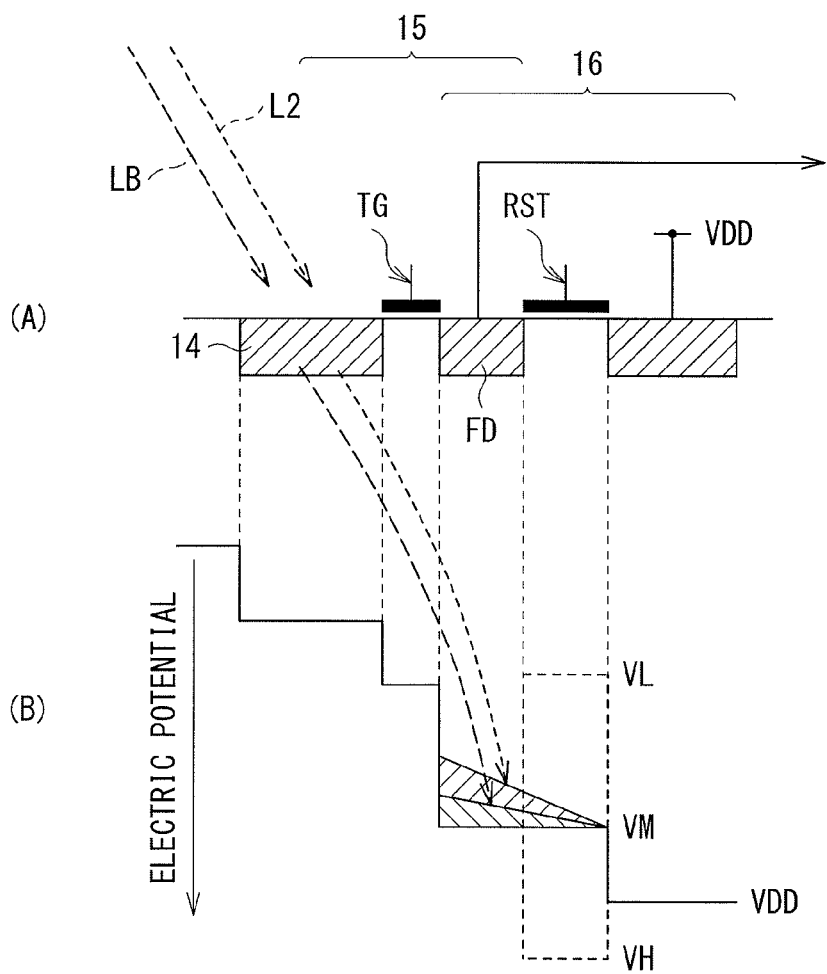

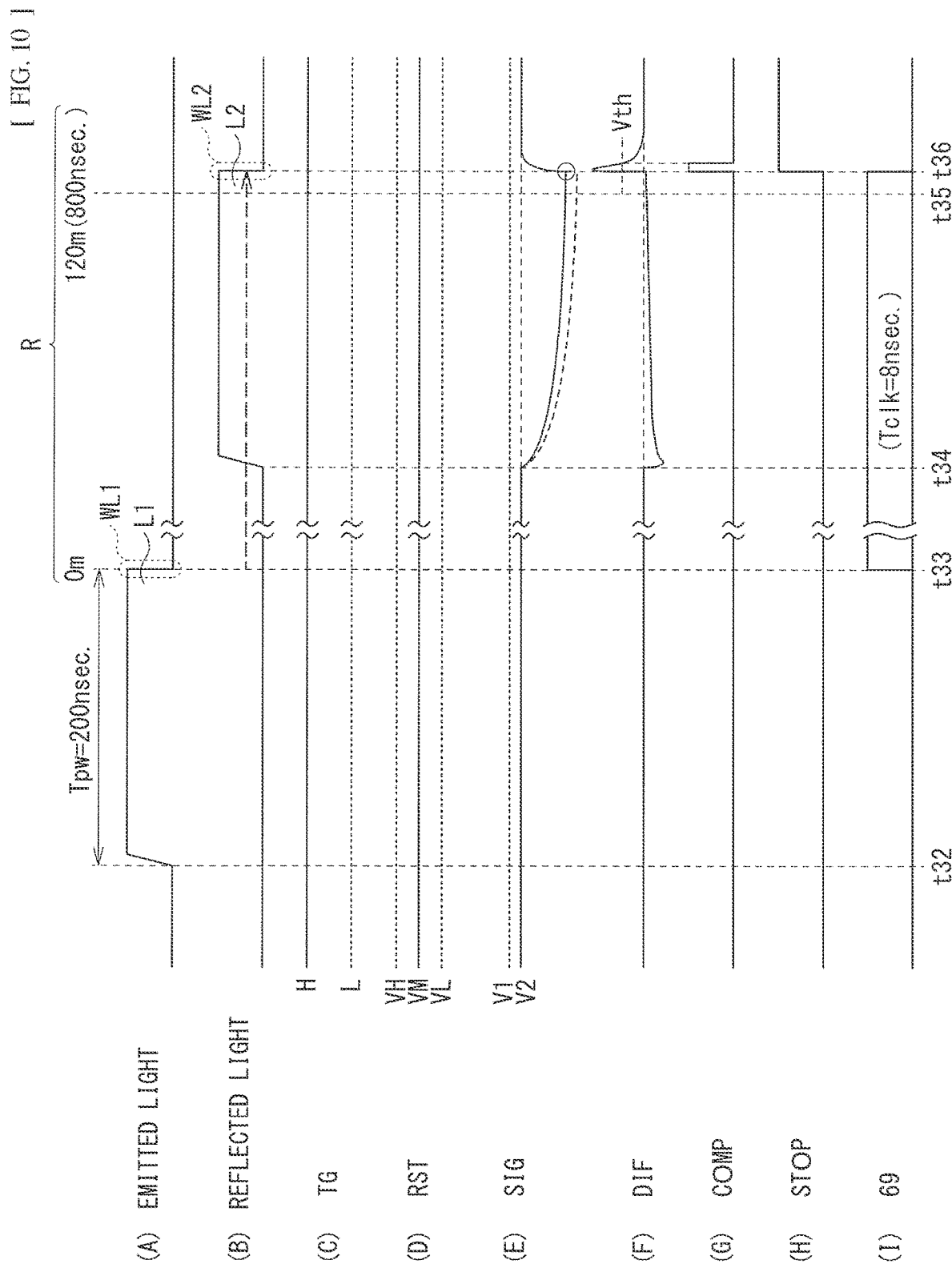

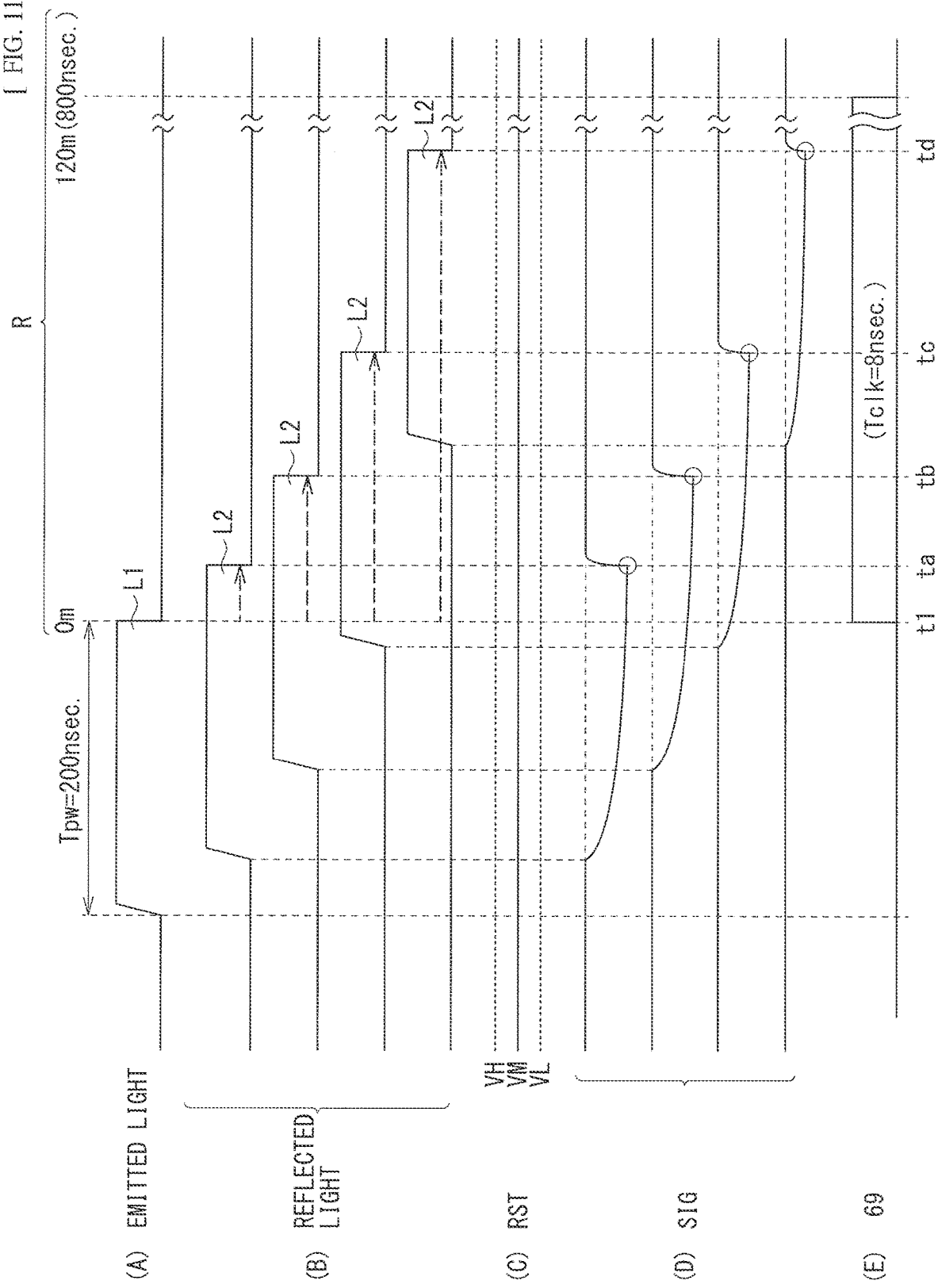

[ FIG. 12 ]
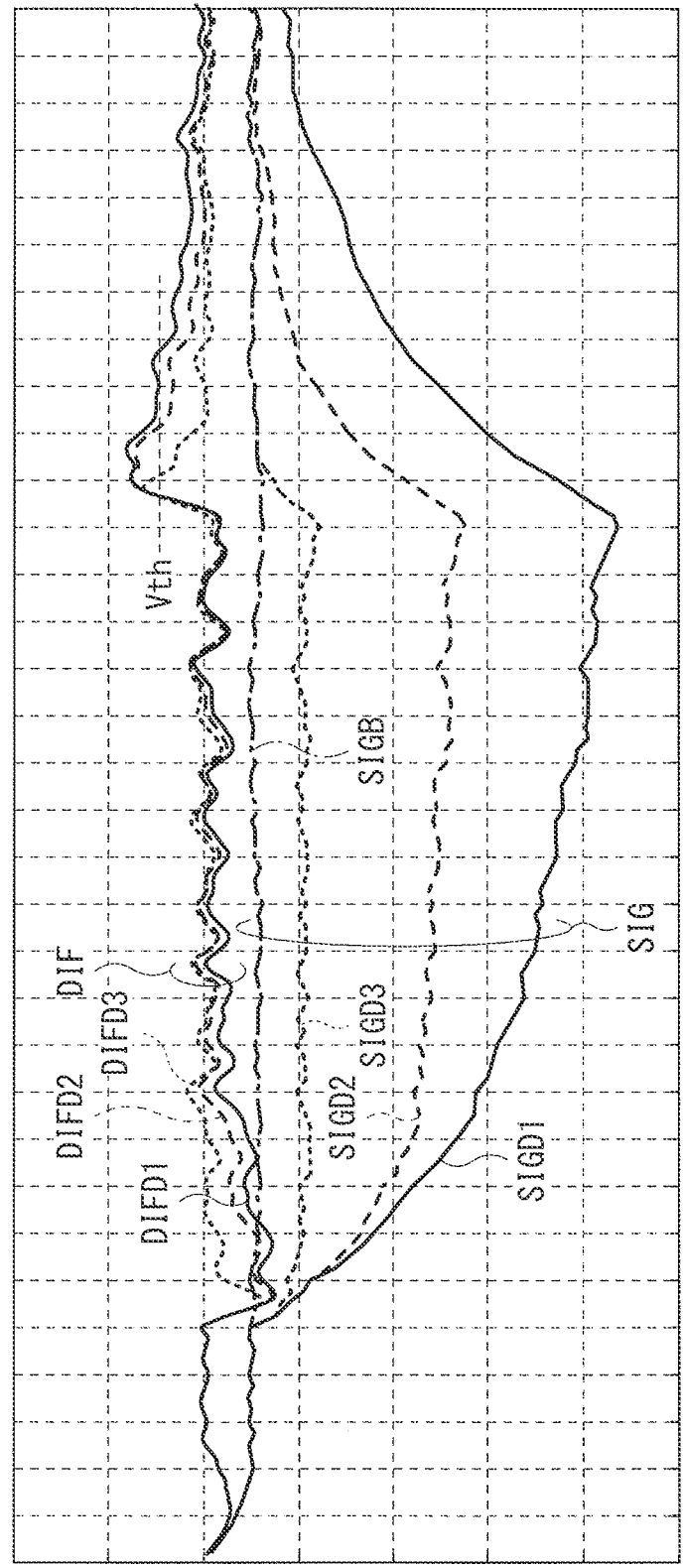

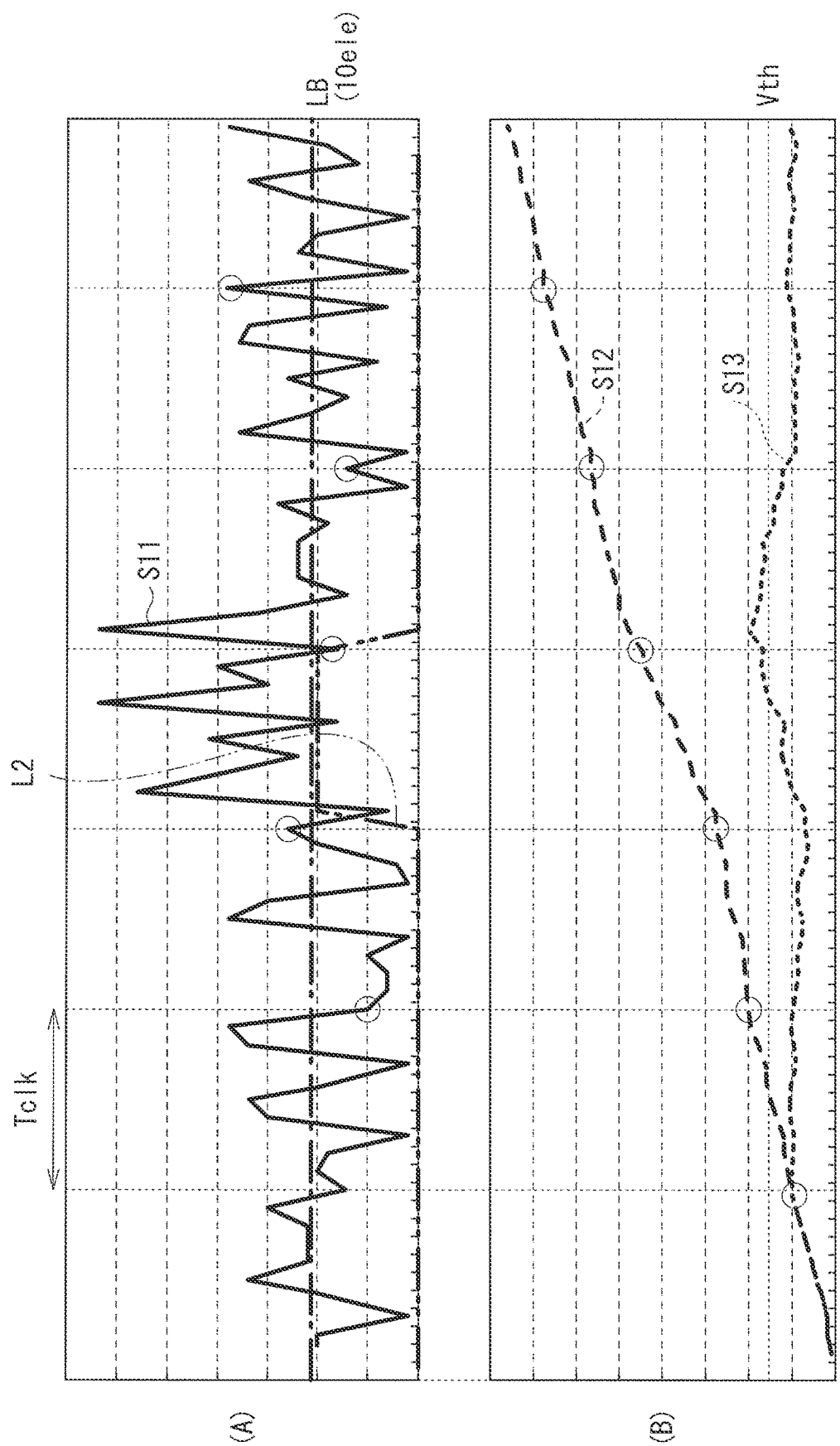

[ FIG. 14 ]
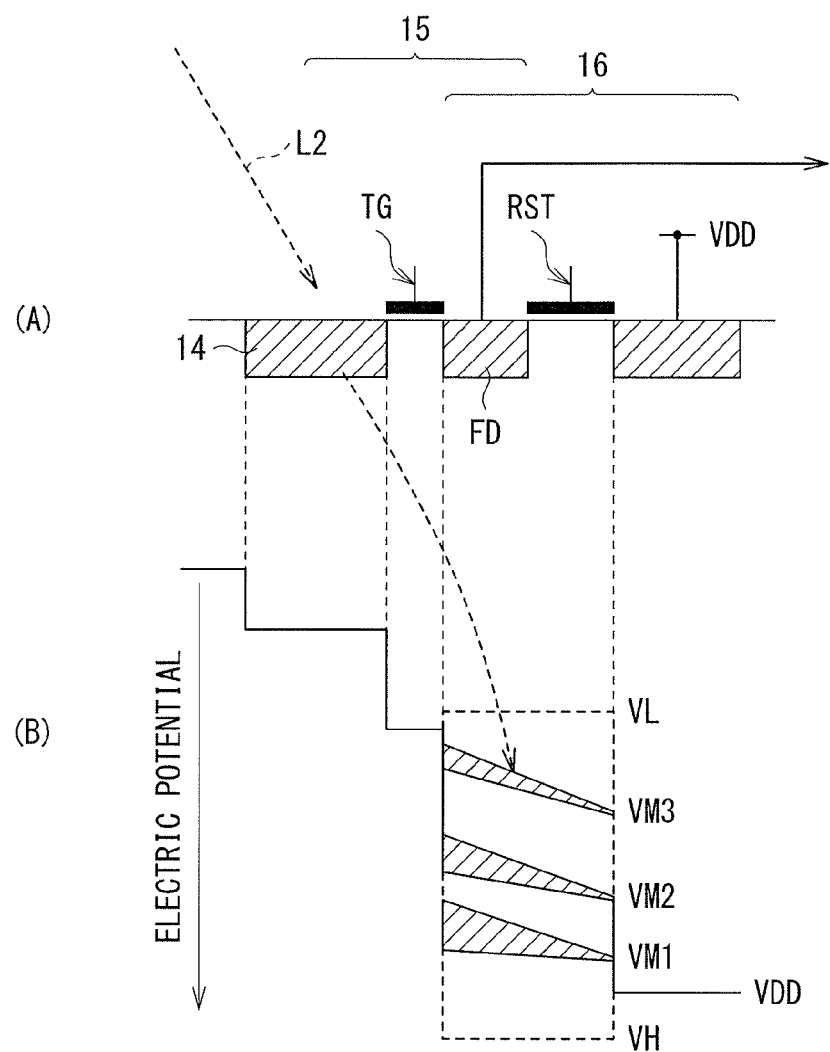

[ FIG. 15 ]
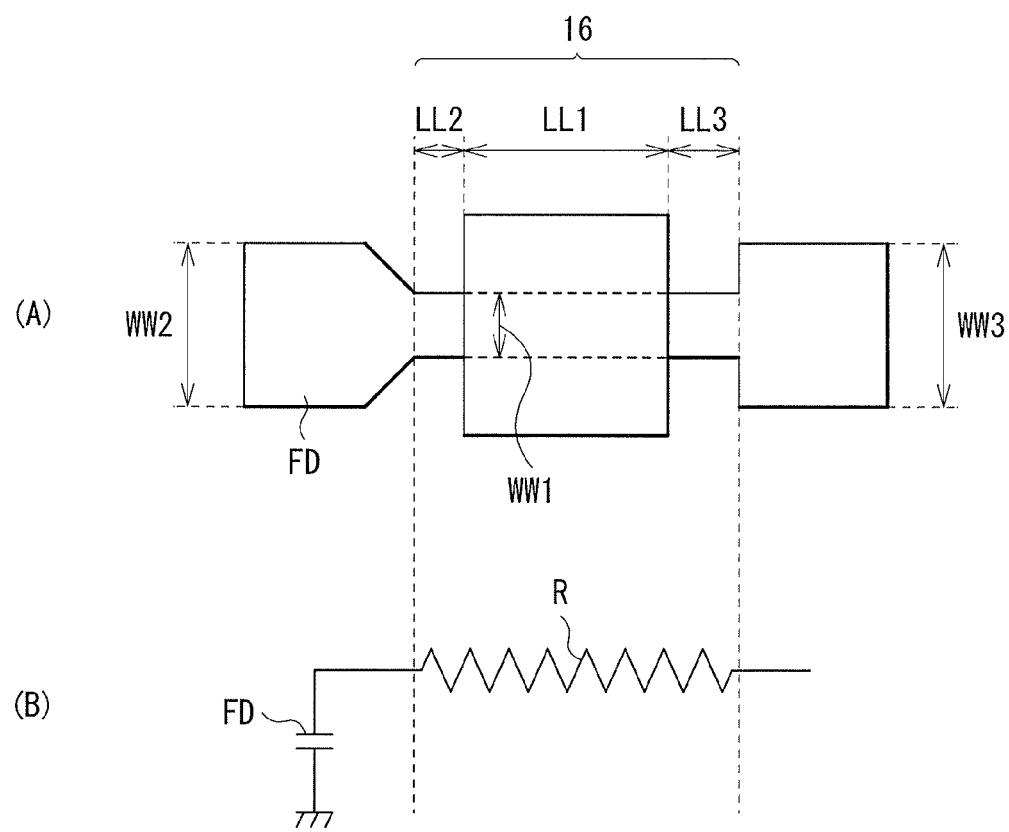

[ FIG. 16 ]
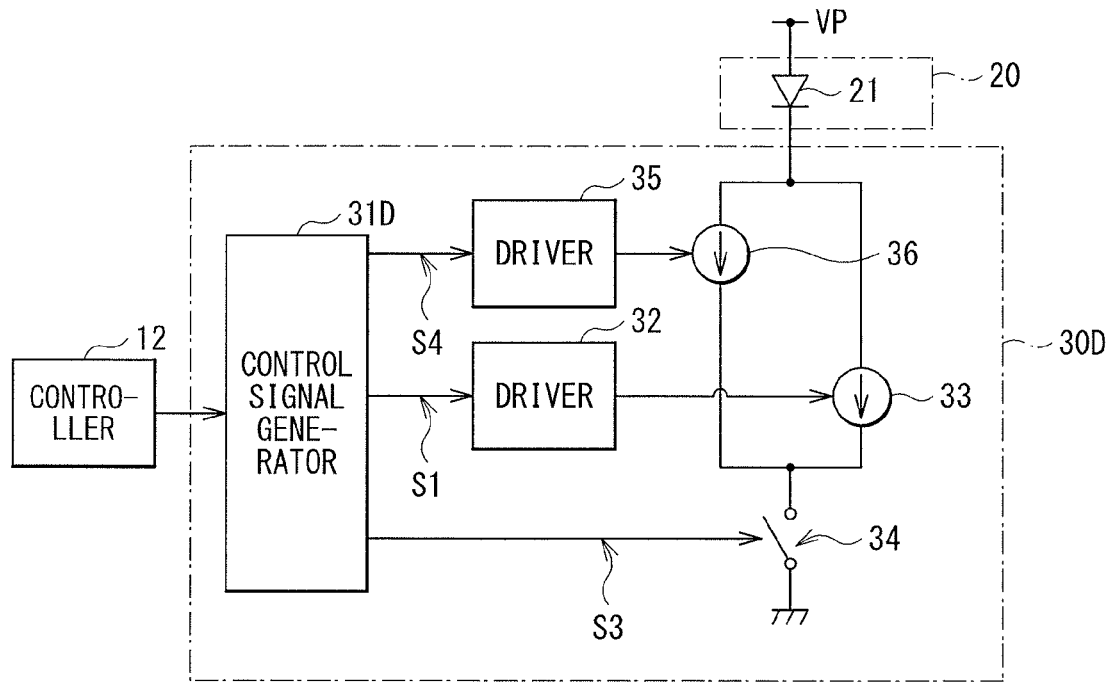
[ FIG. 17 ]
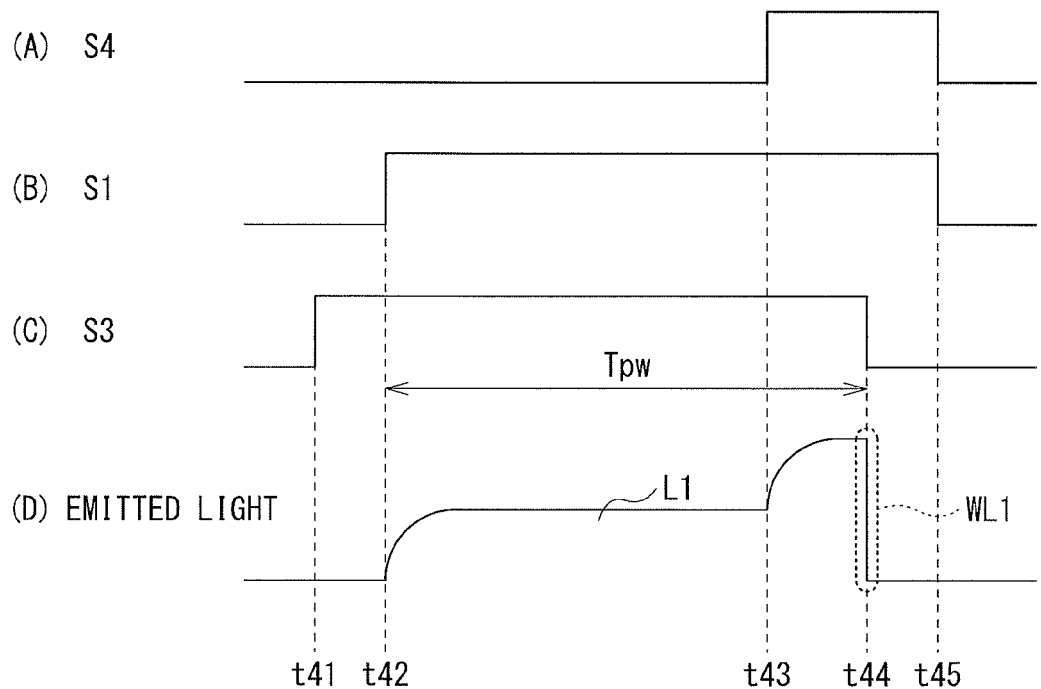

[ FIG. 18 ]
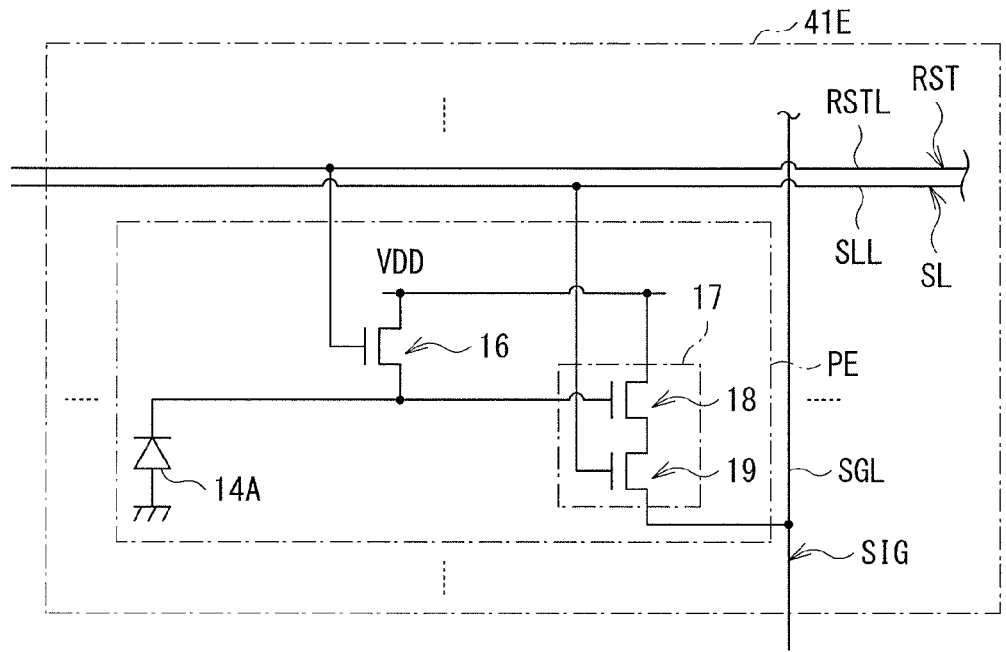
[ FIG. 19 ]
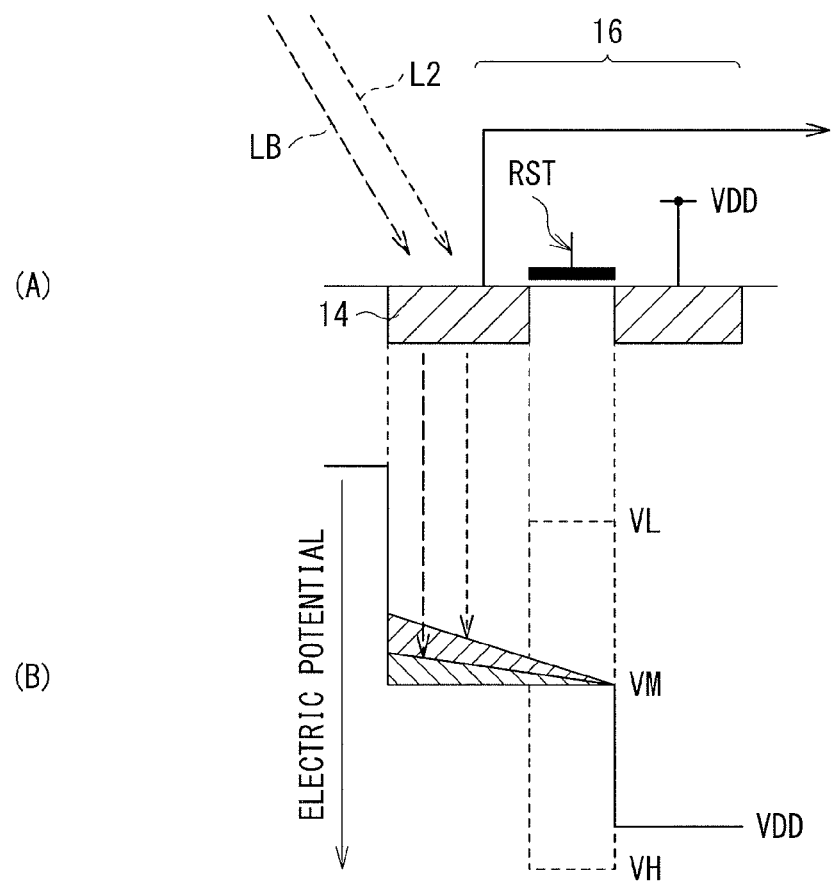

[ FIG. 20A ]
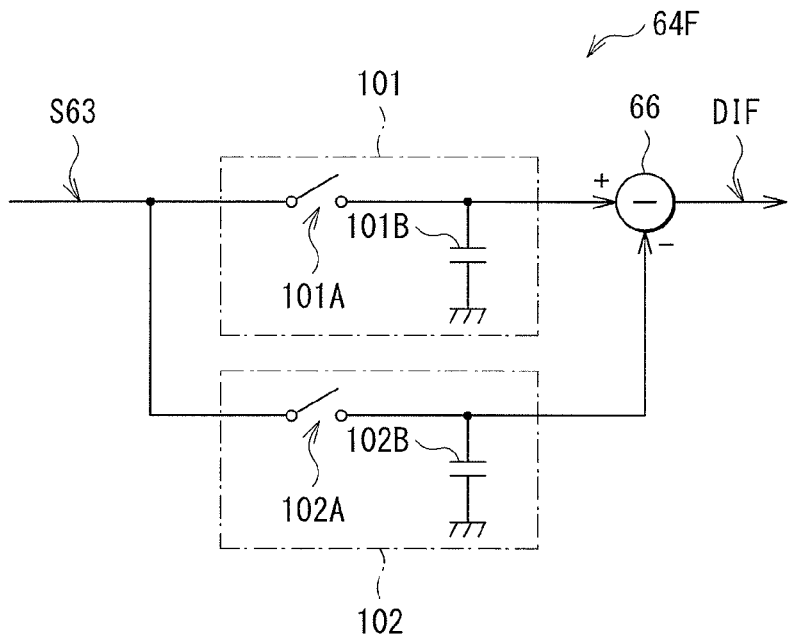
[ FIG. 20B ]
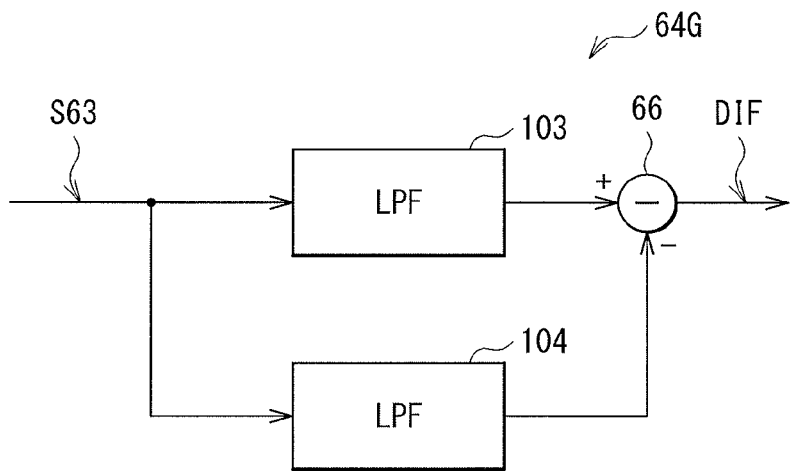

[ FIG. 21A ]
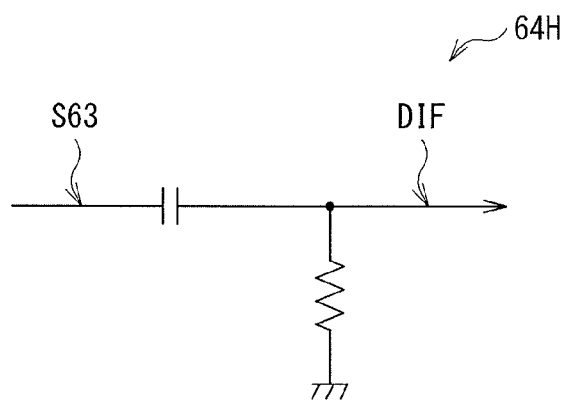
[ FIG. 21B ]
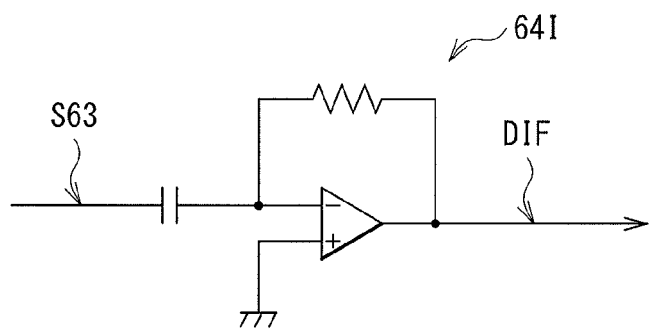

[ FIG. 22 ]
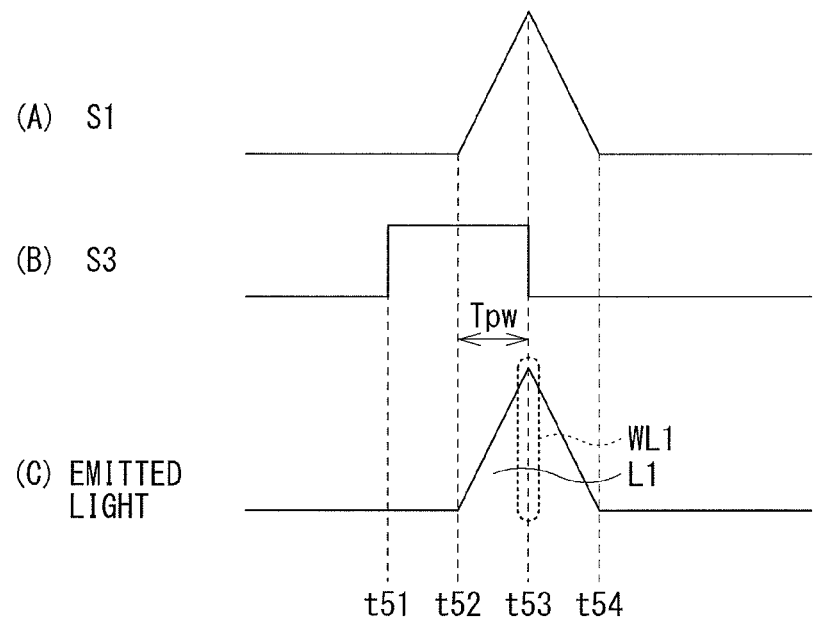
[ FIG. 23 ]
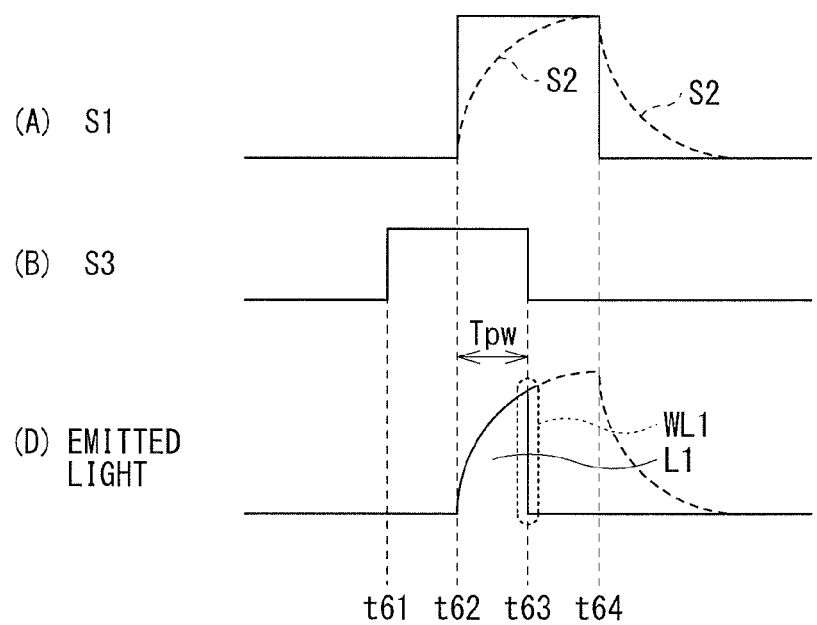

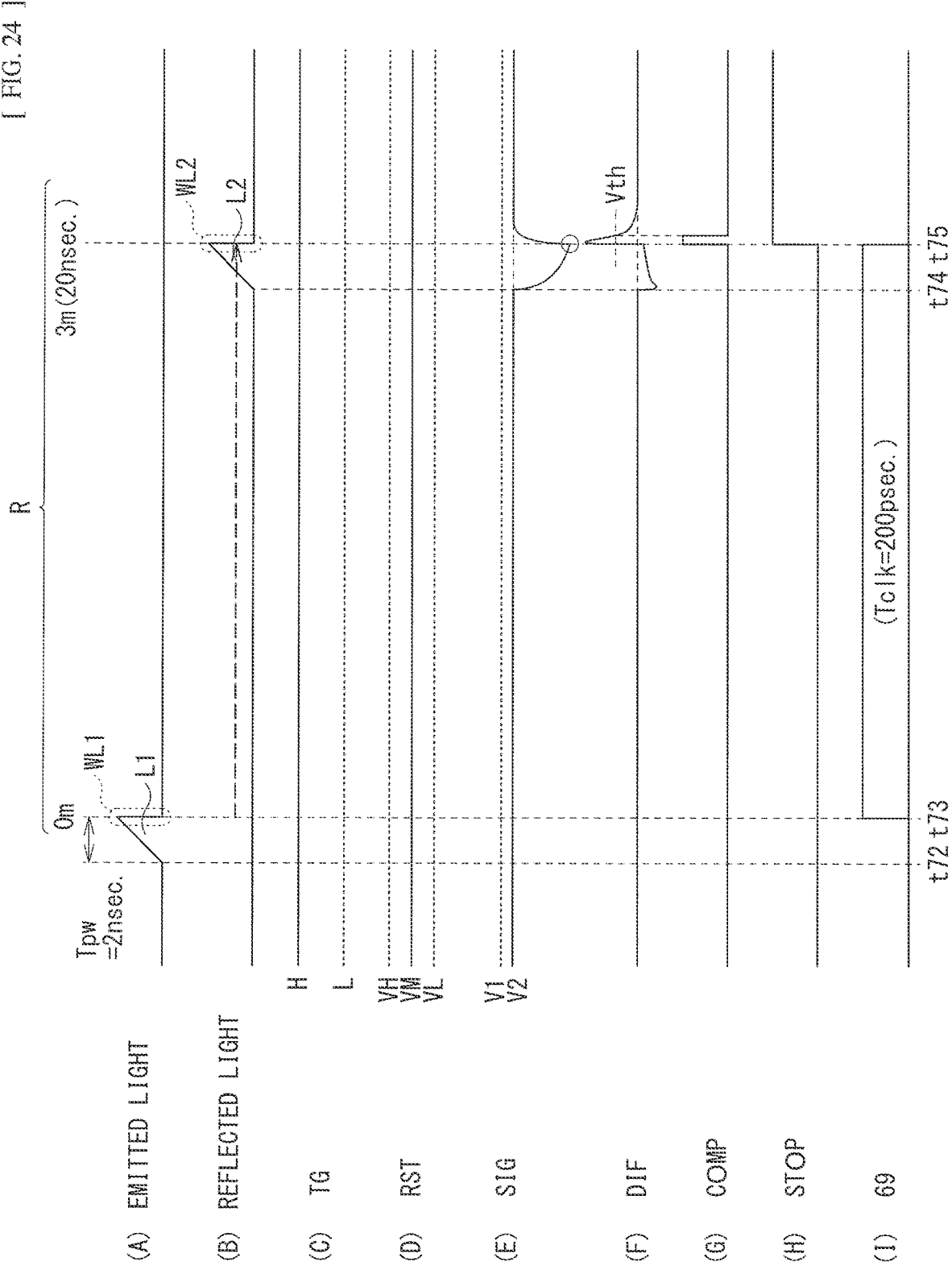
[FIG. 24]

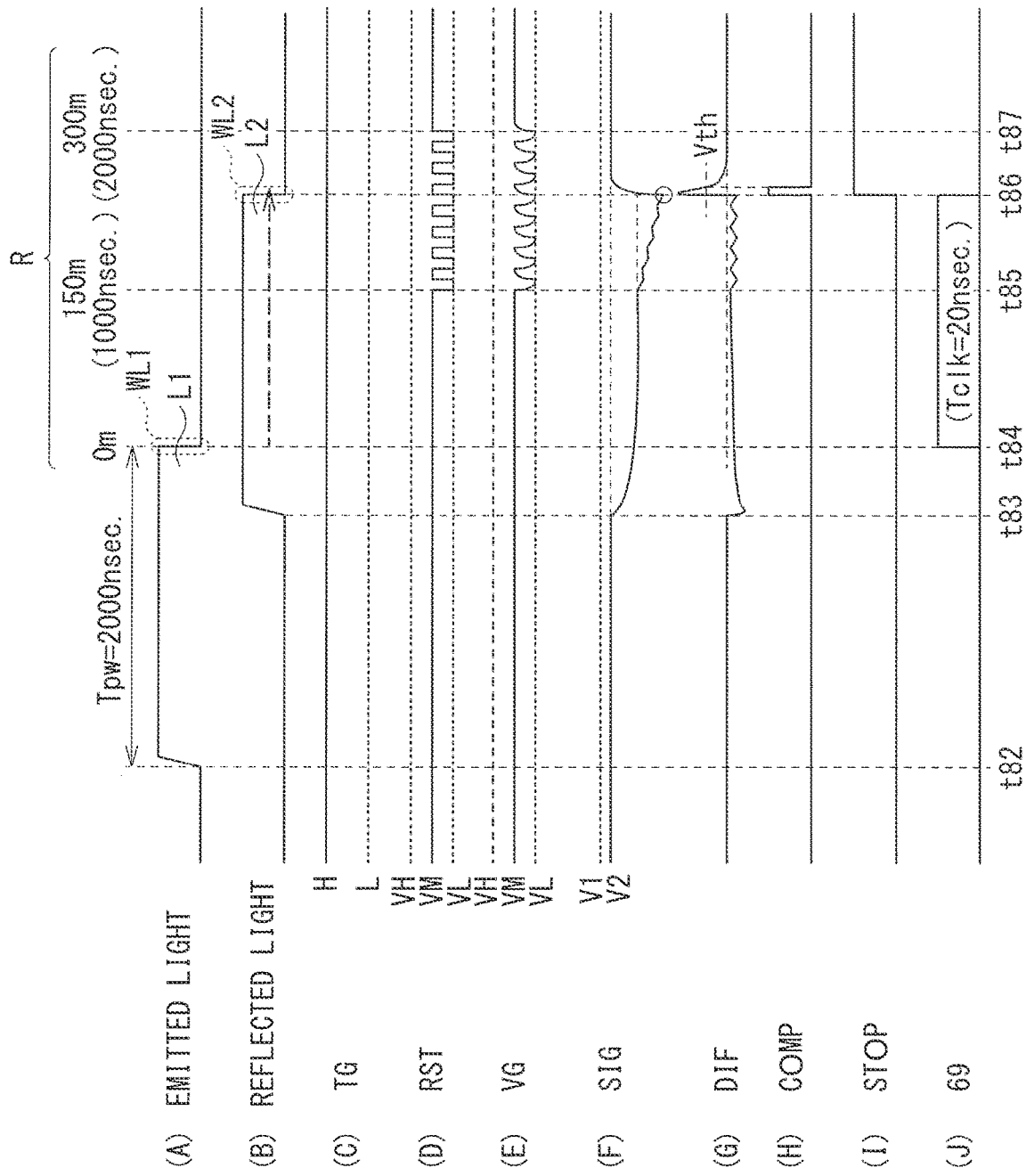
[FIG. 25]

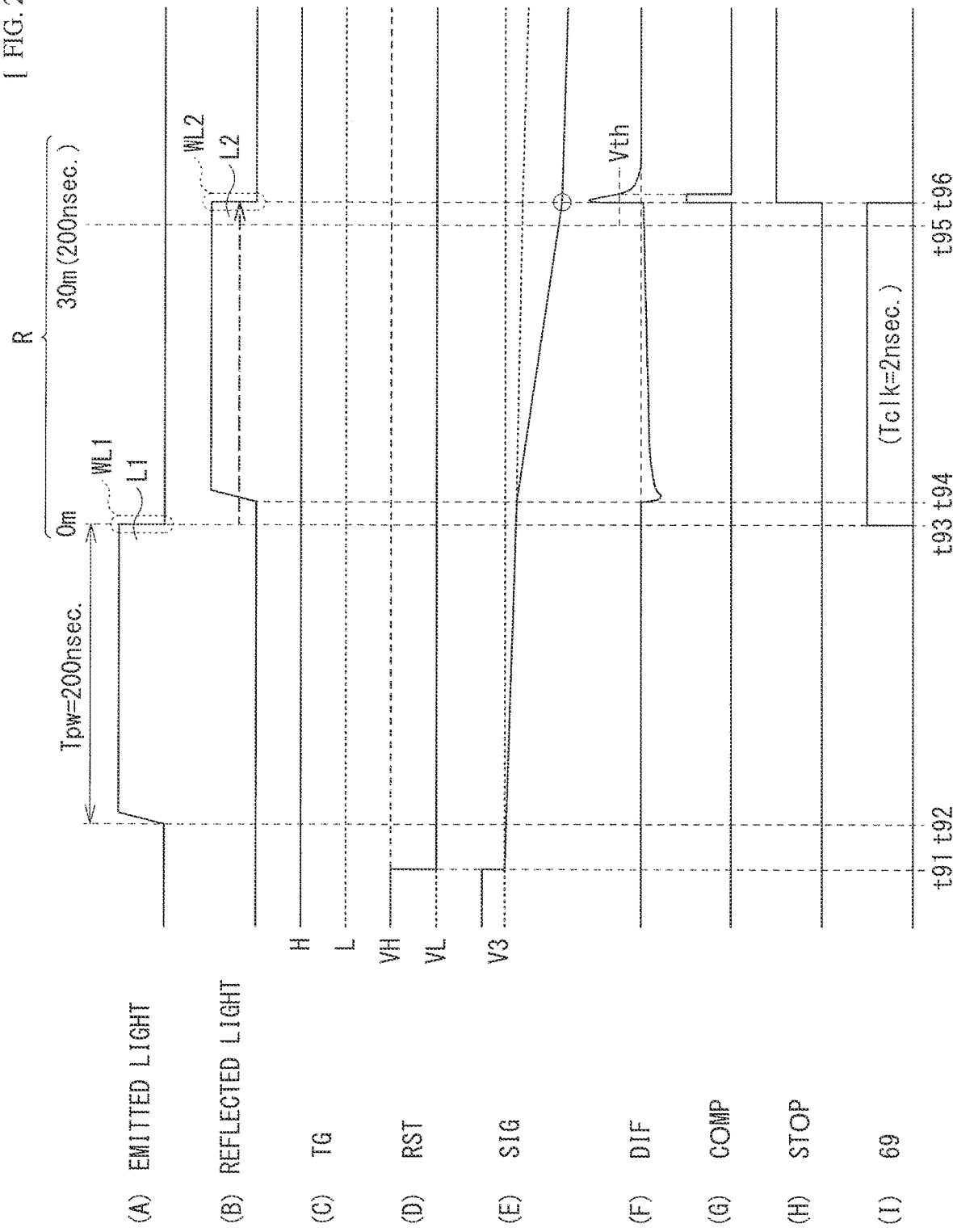

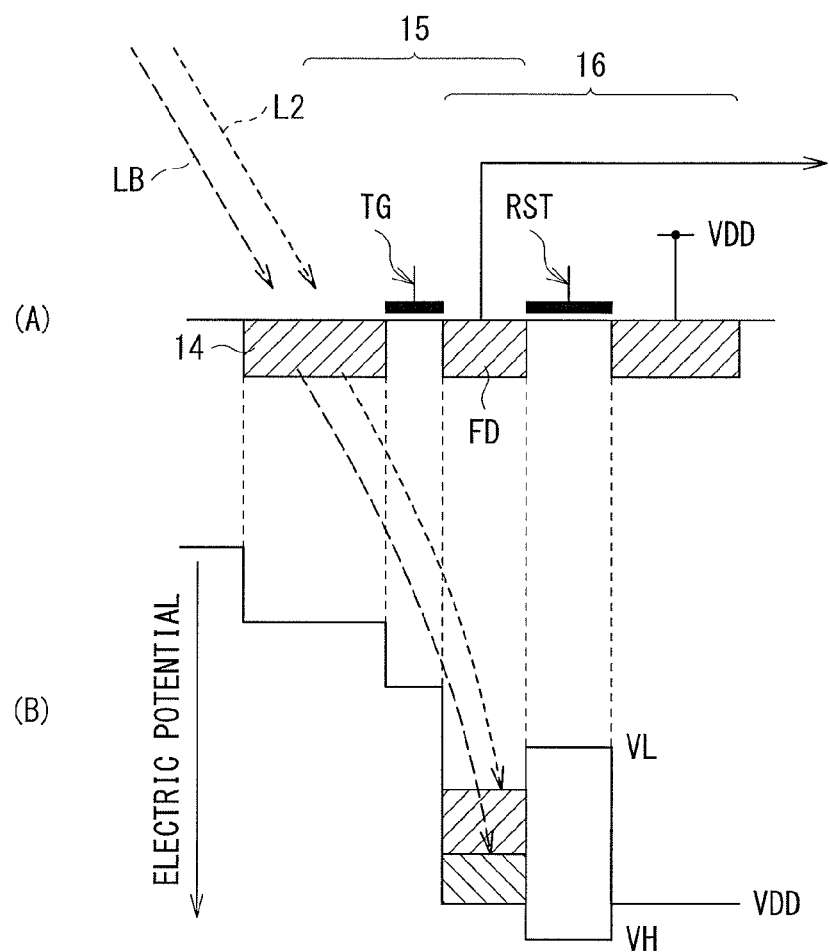
[ FIG. 27 ]

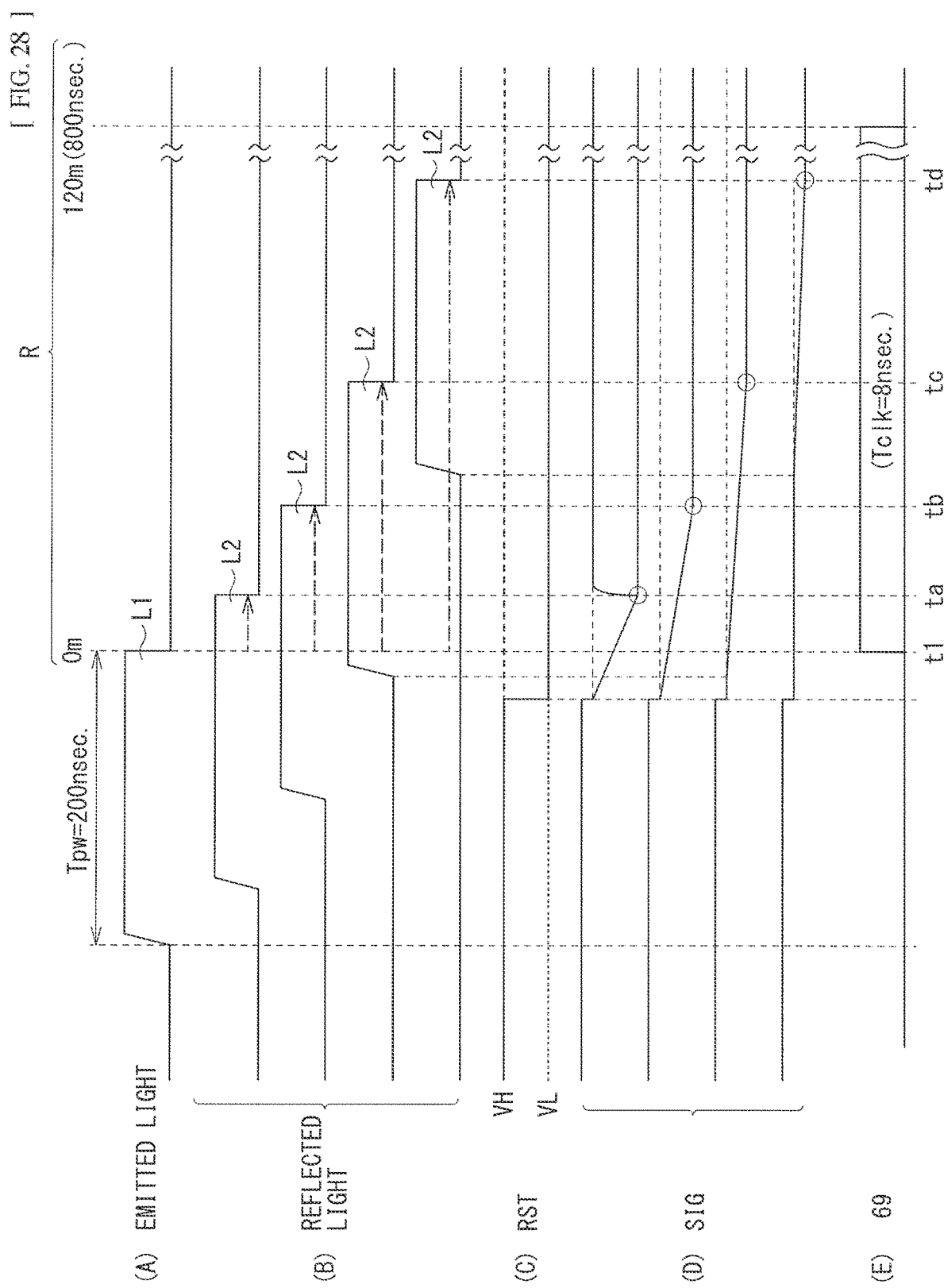

[FIG. 29]
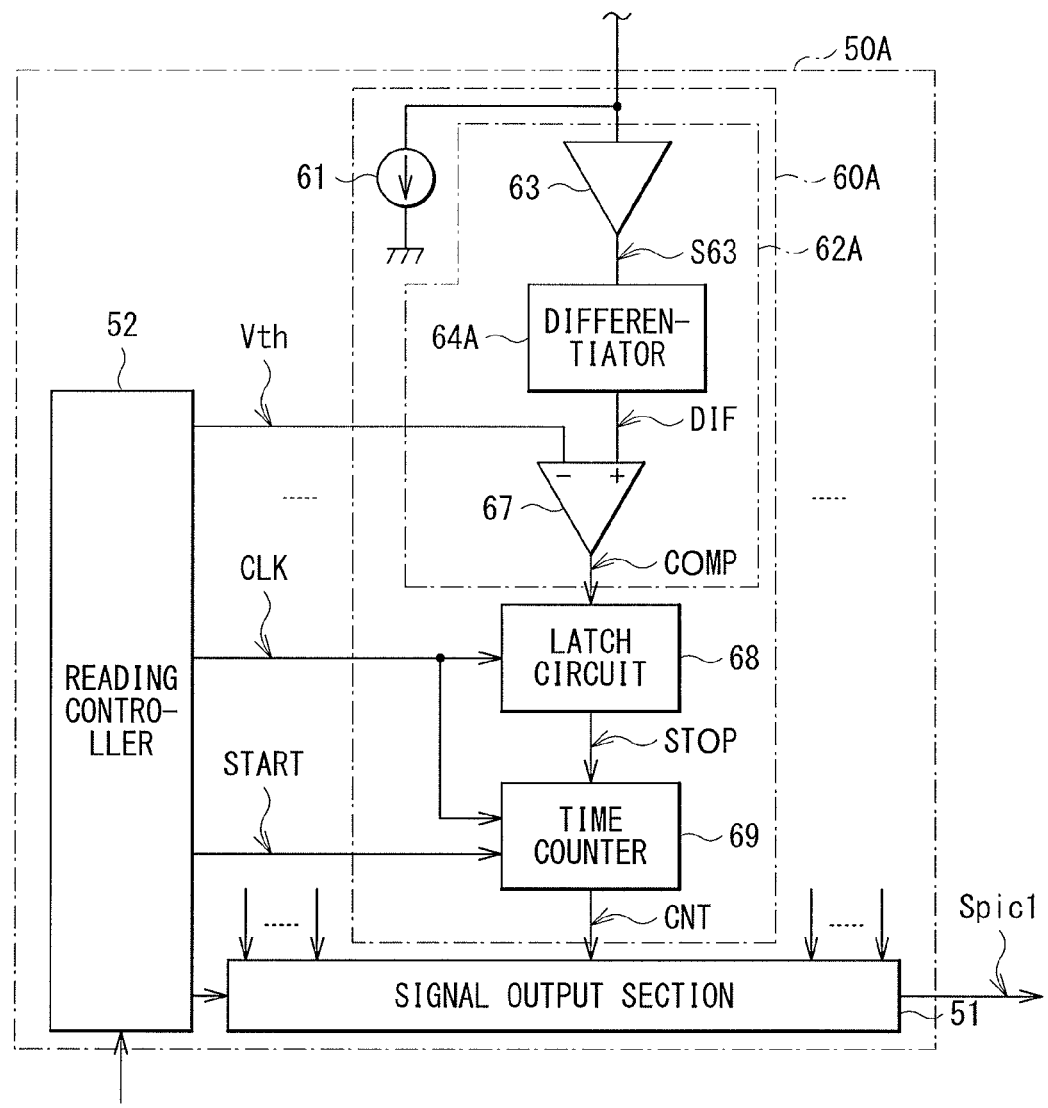

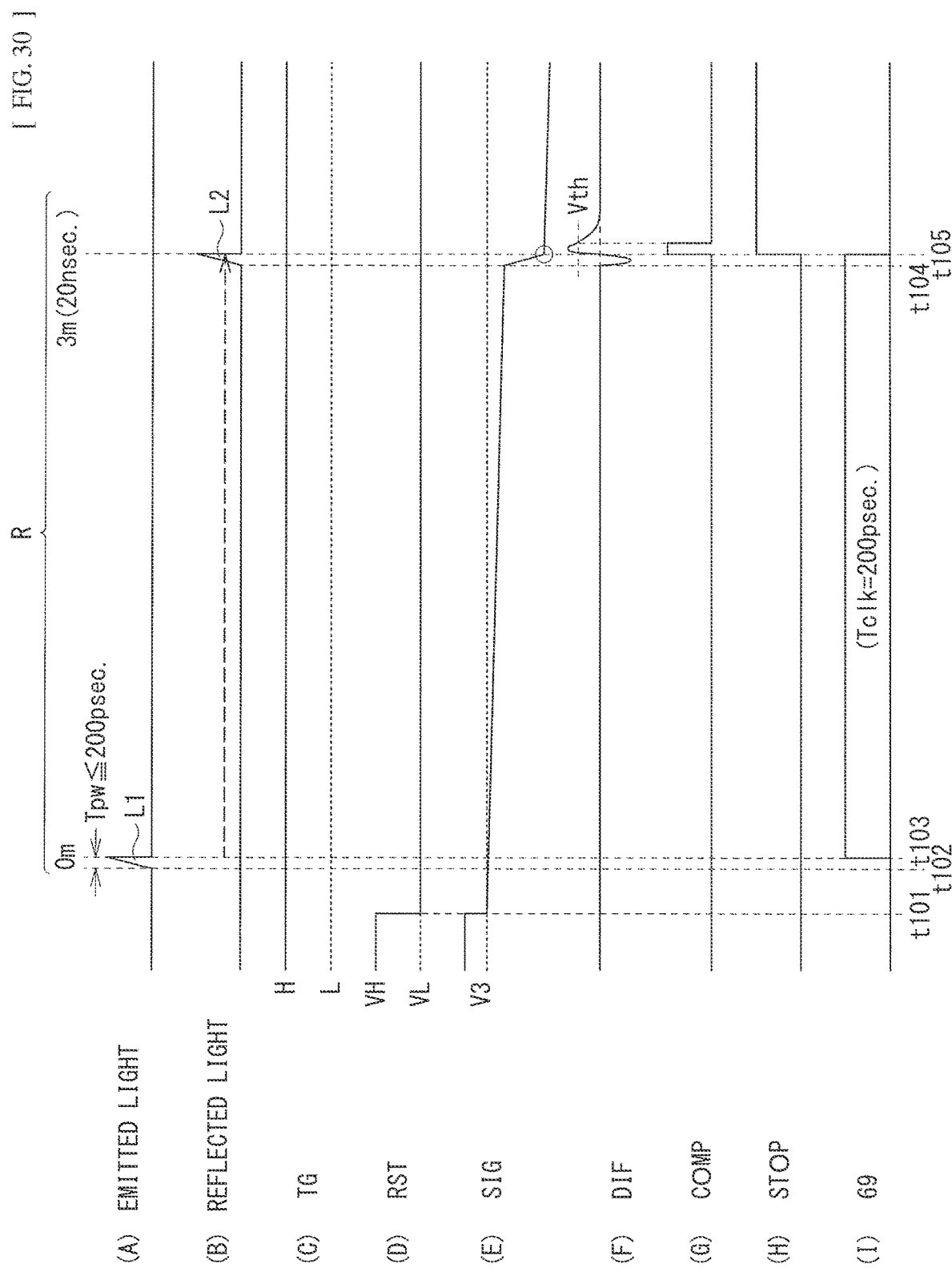
[FIG. 30]

[ FIG. 31 ]
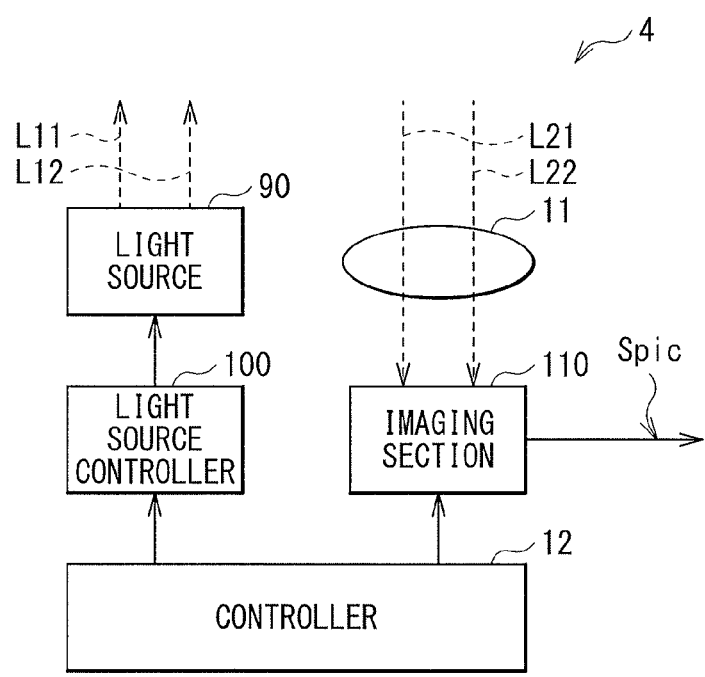

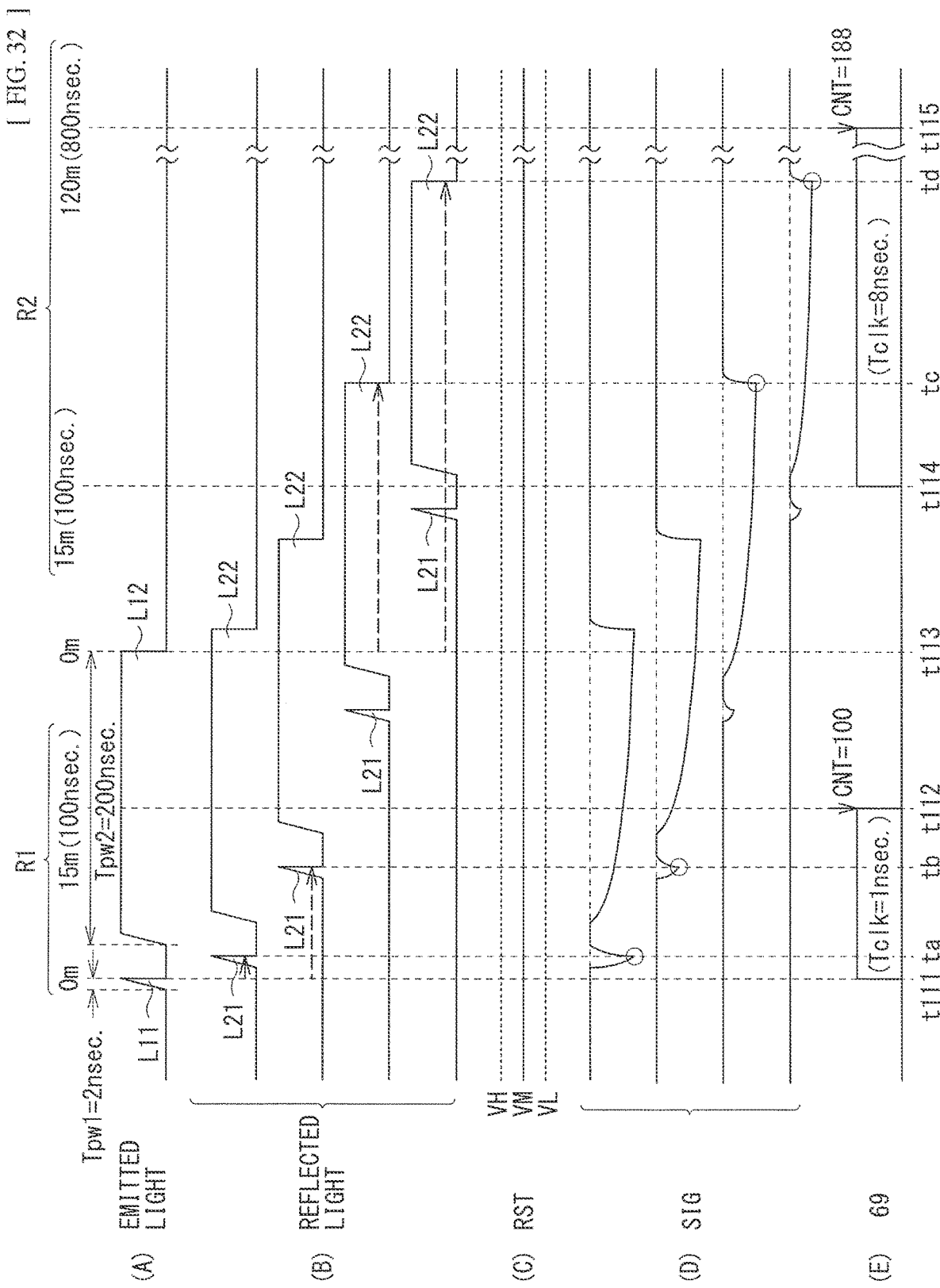

[ FIG. 33 ]
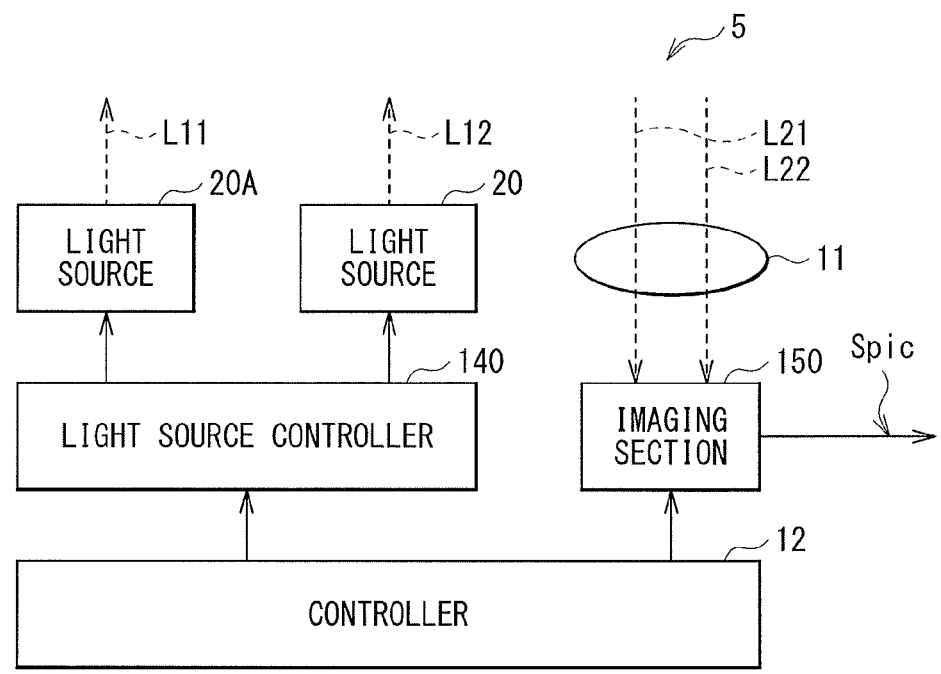

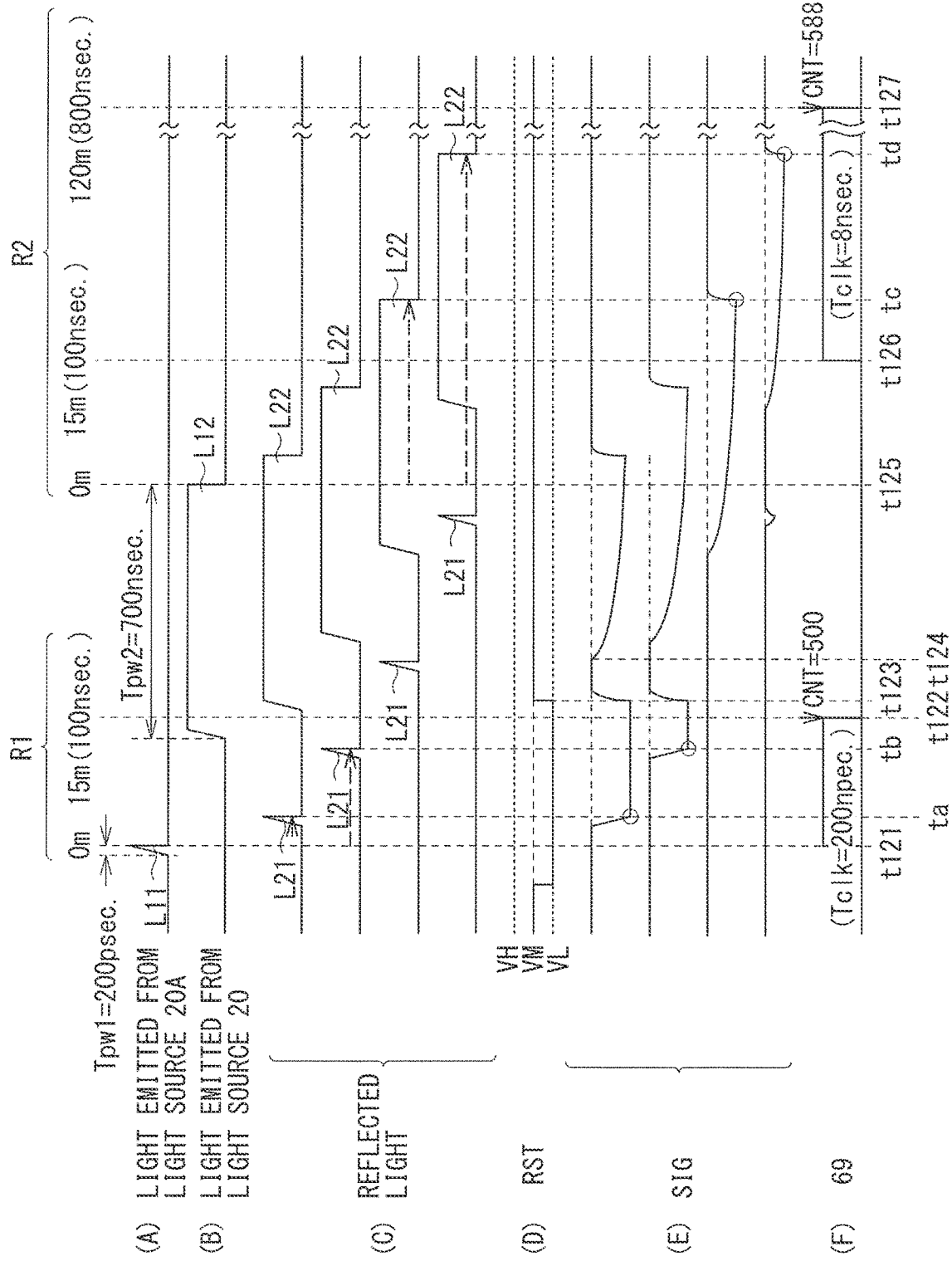
[FIG. 34]

[ FIG. 35 ]
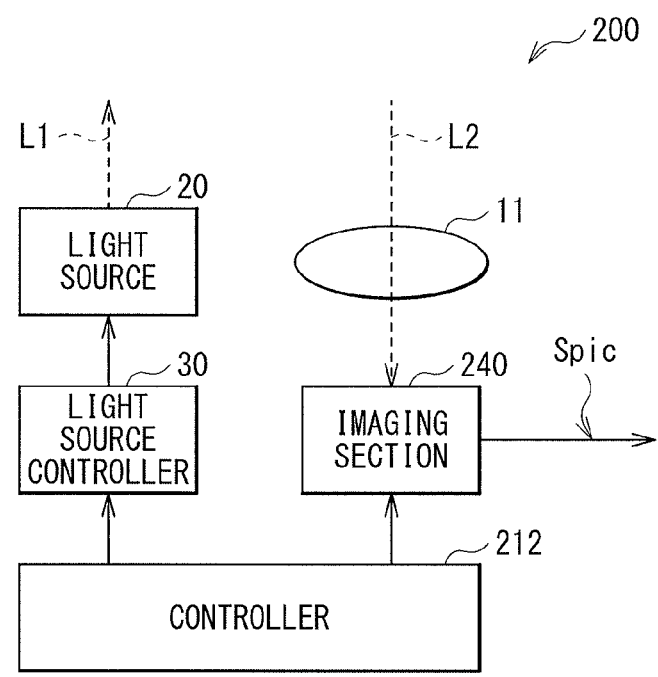

[ FIG. 36 ]
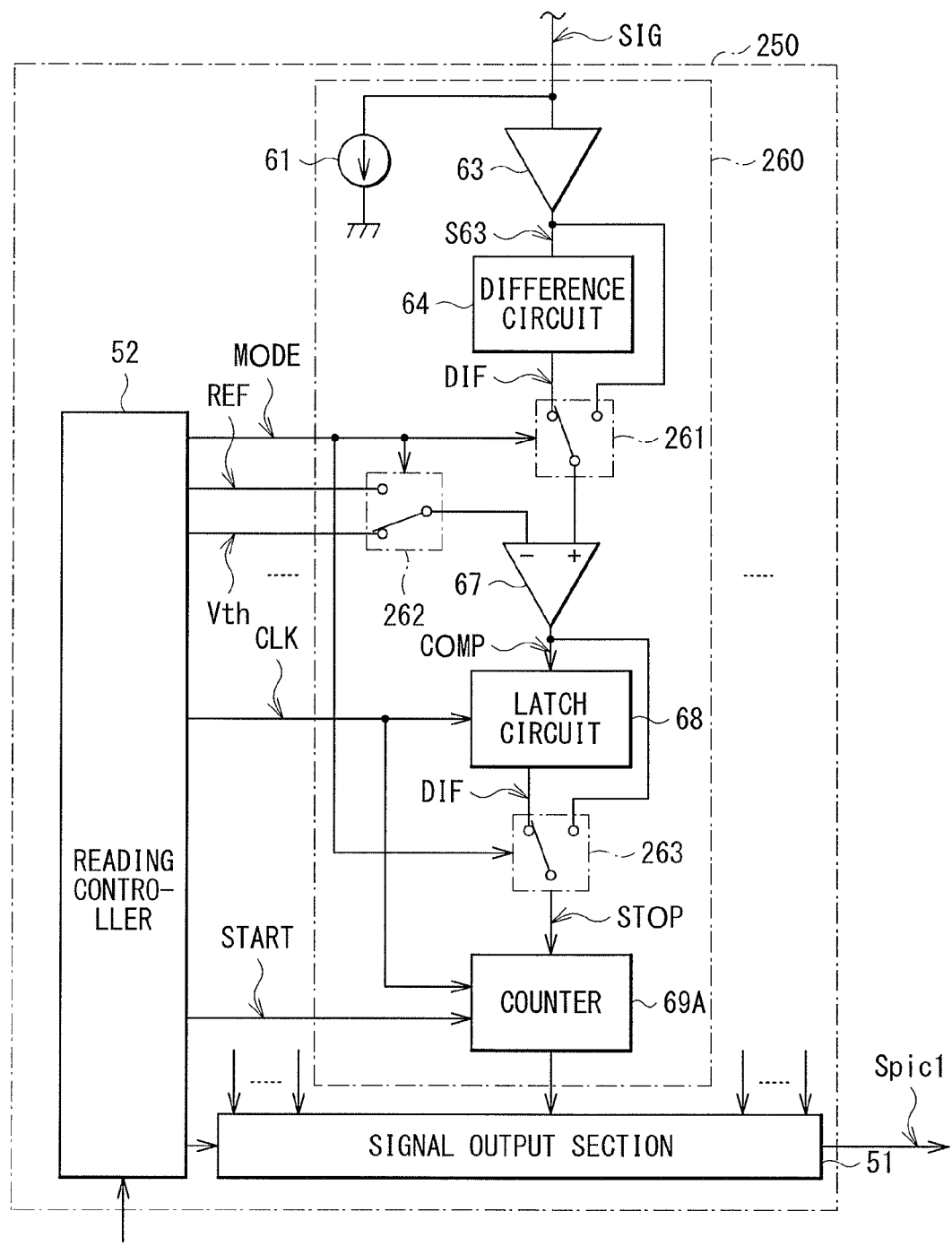

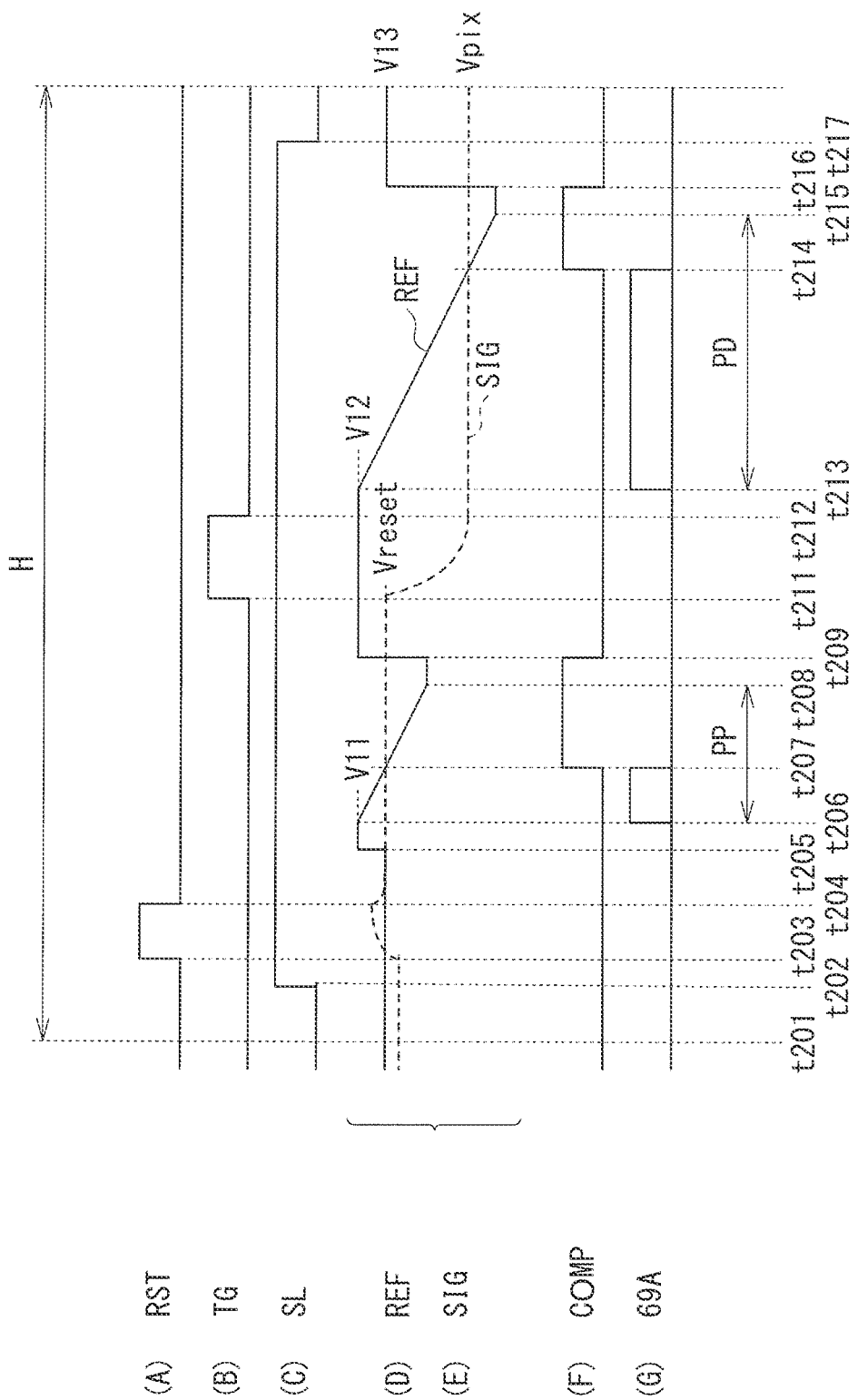

DISTANCE SENSOR, DISTANCE MEASUREMENT DEVICE, AND IMAGE SENSOR

TECHNICAL FIELD

The present disclosure relates to a distance sensor that detects a distance, a distance measurement device including the distance sensor, and an image sensor that detects a distance.

BACKGROUND ART

In measuring a distance to a measurement object, a TOF (Time Of Flight) method is often used. A distance measurement device using the TOF method emits light and also detects light reflected by the measurement object. Subsequently, the distance measurement device measures a distance to the measurement object by detecting a time difference between a timing at which the light is emitted and a timing at which the reflected light is detected (for example, see PTL 1).

CITATION LIST

Patent Literature

PTL 1: Japanese Unexamined Patent Application Publication No. 2010-91377

SUMMARY OF THE INVENTION

Meanwhile, it is desired that a distance measurement device be able to measure a distance to a measurement object which is far away, and it is expected to extend a measurable distance.

It is desirable to provide a distance sensor, a distance measurement device and an image sensor which make it possible to extend measurable distances.

A distance sensor according to an embodiment of the present disclosure includes a controller, a light receiver, a signal change detector, and a measurement section. The controller instructs a light source section to emit a first light pulse. The light receiver includes a photodiode which causes a signal charge to be generated by receiving a first reflected light pulse corresponding to the first light pulse, and generates a light reception signal by storing the signal charge and converting the signal charge into a voltage. The signal change detector performs a first detection operation of detecting a first signal change corresponding to the first reflected light pulse in the light reception signal. The time measurement section that performs, on a basis of the first signal change, a first measurement operation of measuring a first time interval from an emission timing of the first light pulse in the light source section to a reception timing of the first reflected light pulse in the light receiver.

A distance measurement device according to an embodiment of the present disclosure includes a light source section, a controller, a lens, a light receiver, a signal change detector, and a time measurement section. The light source section emits a first light pulse. The controller instructs the light source section to emit the first light pulse. The lens that a first reflected light pulse corresponding to the first light pulse enters. The light receiver includes a photodiode which causes a signal charge to be generated by receiving the first reflected light pulse via the lens, and generates a light reception signal by storing the signal charge and converting the signal charge into a voltage. The signal change detector performs a first detection operation of detecting a first signal change corresponding to the first reflected light pulse in the light reception signal. The time measurement section performs, on a basis of the first signal change, a first measurement operation of measuring a first time interval from an emission timing of the first light pulse in the light source section to a reception timing of the first reflected light pulse in the light receiver.

An image sensor according to an embodiment of the present disclosure includes a controller, a plurality of light receivers, a signal change detector, and a measurement section. The controller instructs a light source section to emit a first light pulse. The plurality of light receivers each includes a photodiode which causes a signal charge to be generated by receiving a first reflected light pulse corresponding to the first light pulse, and each generates a light reception signal by storing the signal charge and converting the signal charge into a voltage. The signal change detector performs a first detection operation of detecting a first signal change corresponding to the first reflected light pulse in the light reception signal. The measurement section performs, on a basis of the first signal change, a first measurement operation of measuring a first time interval from an emission timing of the first light pulse in the light source section to a reception timing of the first reflected light pulse in the light receiver.

According to the distance sensor, the distance measurement device, and the image sensor an embodiment of the present disclosure, in the light receiver, the first reflected light pulse corresponding to the first light pulse emitted from the light source section is received and the signal charge is generated. Then, in the light receiver, the signal charge is stored and the signal charge is converted into a voltage, and thus, the light reception signal is generated. After that, the first signal change corresponding to the first reflected light pulse in the light reception signal is detected, and, on the basis of the first signal change, a measurement is performed of the first time interval from the emission timing of the first light pulse in the light source section to the reception timing of the first reflected light pulse in the light receiver.

According to the distance sensor, the distance measurement device, and the image sensor an embodiment of the present disclosure, the light receiver causes the signal charge to be generated by receiving the first reflected light pulse, stores the signal charge and generates the light reception signal. The first time interval is measured on the basis of the first signal change corresponding to the first reflected light pulse in the light reception signal; therefore, it is possible to extend the measurable distance. It is to be noted that the effects of the present disclosure are not necessarily limited to the effects described above, and may be any of the effects described in the specification.

BRIEF DESCRIPTION OF DRAWINGS

FIG. 1 is a block diagram illustrating a configuration example of a distance measurement device according to an embodiment of the present disclosure.

FIG. 2 is a block diagram illustrating a configuration example of a light source and a light source controller illustrated in FIG. 1.

FIG. 3 is a timing waveform diagram illustrating an operation example of the light source and the light source controller illustrated in FIG. 1.

FIG. 4 is a block diagram illustrating a configuration example of an imaging section illustrated in FIG. 1.

FIG. 5 is a circuit diagram illustrating a configuration example of a pixel array and a reading section illustrated in FIG. 4.

FIG. 6 is a block diagram illustrating a configuration example of a difference circuit illustrated in FIG. 5.

FIG. 7 is a timing waveform diagram illustrating an operation example of a distance measurement device according to a first embodiment.

FIG. 8 is a waveform diagram illustrating an example of a pixel signal.

FIG. 9 is an explanatory diagram illustrating an operation example of the image pixel according to the first embodiment.

FIG. 10 is a timing waveform diagram illustrating another operation example of the distance measurement device according to the first embodiment.

FIG. 11 is a timing waveform diagram illustrating another operation example of the distance measurement device according to the first embodiment.

FIG. 12 is a timing waveform diagram illustrating an operation example of the difference circuit illustrated in FIG. 5.

FIG. 13 is an explanatory diagram illustrating an integral action performed on a minute signal.

FIG. 14 is an explanatory diagram illustrating an operation example of an image pixel according to another modification example of the first embodiment.

FIG. 15 is an explanatory diagram illustrating a layout example of an image pixel according to another modification example of the first embodiment.

FIG. 16 is a block diagram illustrating a configuration example of a light source controller according to another modification example of the first embodiment.

FIG. 17 is a timing waveform diagram illustrating an operation example of a light source and the light source controller according to another modification example of the first embodiment.

FIG. 18 is a circuit diagram illustrating a configuration example of a pixel array according to another modification example of the first embodiment.

FIG. 19 is an explanatory diagram illustrating an operation example of an image pixel illustrated in FIG. 18.

FIG. 20A is a circuit diagram illustrating a configuration example of a difference circuit according to another modification example of the first embodiment.

FIG. 20B is a block diagram illustrating a configuration example of a difference circuit according to another modification example of the first embodiment.

FIG. 21A is a circuit diagram illustrating a configuration example of a differentiator according to another modification example of the first embodiment.

FIG. 21B is a circuit diagram illustrating a configuration example of a differentiator according to another modification example of the first embodiment.

FIG. 22 is a timing waveform diagram illustrating an operation example of a light source and a light source controller according to another modification example of the first embodiment.

FIG. 23 is a timing waveform diagram illustrating an operation example of the light source and the light source controller according to another modification example of the first embodiment.

FIG. 24 is a timing waveform diagram illustrating an operation example of a distance measurement device according to another modification example of the first embodiment.

FIG. 25 is a timing waveform diagram illustrating an operation example of a distance measurement device according to a second embodiment.

FIG. 26 is a timing waveform diagram illustrating an operation example of a distance measurement device according to a third embodiment.

FIG. 27 is an explanatory diagram illustrating an operation example of an image pixel according to the third embodiment.

FIG. 28 is a timing waveform diagram illustrating another operation example of the distance measurement device according to the third embodiment.

FIG. 29 is a block diagram illustrating a configuration example of a reading section according to a modification example of the third embodiment.

FIG. 30 is a timing waveform diagram illustrating an operation example of a distance measurement device according to a modification example of the third embodiment.

FIG. 31 is a block diagram illustrating a configuration example of a distance measurement device according to a fourth embodiment.

FIG. 32 is a timing waveform diagram illustrating an operation example of the distance measurement device according to the fourth embodiment.

FIG. 33 is a block diagram illustrating a configuration example of a distance measurement device according to a fifth embodiment.

FIG. 34 is a timing waveform diagram illustrating an operation example of the distance measurement device according to the fifth embodiment.

FIG. 35 is a block diagram illustrating a configuration example of an imaging device according to an application example.

FIG. 36 is a block diagram illustrating a configuration example of a reading section according to an application example.

FIG. 37 is a timing waveform diagram illustrating an operation example of the imaging device according to the application example.

MODES FOR CARRYING OUT THE INVENTION

In the following, some embodiments of the present disclosure are described in detail with reference to the drawings. It is to be noted that description is given in the following order.
1. First Embodiment
2. Second Embodiment
3. Third Embodiment
4. Fourth Embodiment
5. Fifth Embodiment
6. Application Examples

1. First Embodiment

Configuration Example

FIG. 1 illustrates a configuration example of a distance measurement device (distance measurement device 1) according to an embodiment. The distance measurement device 1 measures a distance D to a measurement object using a TOF method. The distance measurement device 1 has a long measurable distance (about 30 m to 120 m in this example). The distance measurement device 1 includes a light source 20, a light source controller 30, a lens 11, an imaging section 40, and a controller 12. The light source controller 30, the imaging section 40, and the controller 12 can be integrally formed on a semi-conductor substrate, for example. It should be noted that the present disclosure is not limited thereto, and for example, a plurality of individual components may be mounted on a printed substrate. Specifically, for example, the imaging section 40 and the controller 12 may be configured as one semi-conductor component, and the light source 20 and the light source controller 30 may be configured as one semiconductor component, and those components may be mounted on, for example, a printed substrate.

The light source 20 emits a light pulse L1 toward the measurement object, and is configured by using, for example, a light emitting diode (LED). The light source controller 30 controls an operation of the light source 20 on the basis of an instruction from the controller 12.

FIG. 2 illustrates a configuration example of the light source 20 and the light source controller 30. It is to be noted that FIG. 2 also illustrates the controller 12.

The light source 20 includes a light emitting diode (LED) 21. An anode of the light emitting diode (LED) 21 is supplied with a voltage VP, and a cathode of the light emitting diode (LED) 21 is coupled to one end of a current source 33 (described later) of the light source controller 30. Note that, in this embodiment, although one light emitting diode (LED) 21 is used, the present disclosure is not limited thereto, and a plurality of light emitting diodes may be provided, and the plurality of light emitting diodes may be connected in series, or the plurality of light emitting diodes may be connected in parallel. In addition, a plurality of light emitting diode groups each including the plurality of light emitting diodes connected in parallel may be provided, and the plurality of light emitting diodes groups may be connected in series.

The light source controller 30 includes a control signal generator 31, a driver 32, a current source 33, and a switch 34. The control signal generator 31 generates control signals S1 and S3 on the basis of an instruction from the controller 12. The driver 32 drives the current source 33 on the basis of the control signal S1. The current source 33 allows a current having a predetermined current value to flow, and includes, for example, a MOS (Metal Oxide Semiconductor) transistor. One end of the current source 33 is coupled to the cathode of the light emitting diode (LED) 21, and the other end is connected to one end of the switch 34. The switch 34 performs an on/off operation on the basis of the control signal S3, and includes, for example, a MOS transistor. One end of the switch 34 is coupled to the other end of the current source 33, and the other end of the switch 34 is grounded.

FIG. 3 illustrates an operation example of the light source 20 and the light source controller 30, where (A) indicates a waveform of the control signal S1, (B) indicates a waveform of the control signal S3, and (C) indicates a waveform of light emitted from the light source 20. In this example, when the control signal S1 is in a high level, the current source 33 conducts a current. When the control signal S3 is in the high level, the switch 34 is turned into an on state. The light source controller 30 uses the control signals S1 and S3 to control the operation of the light source 20, and the light source 20 emits the light pulse L1. Hereinafter, this operation will be described in detail.

At timing t11, the control signal generator 31 changes the control signal S3 from a low level to the high level (FIG. 3(B)). Thus, the switch 34 changes from an off state to the on state.

Next, at timing t12, the control signal generator 31 changes the control signal S1 from the low level to the high level (FIG. 3(A)). The driver 32 drives the current source 33 on the basis of the control signal S1. The control signal S2 supplied to the current source 33 is, as illustrated in FIG. 3(A), a dull signal due to the loading, and rises slightly slowly. The current source 33 causes a current to flow in response to the control signal S2. This causes the light emitting diode (LED) 21 to begin emitting light (FIG. 3(C)).

Next, at timing t13, the control signal generator 31 changes the control signal S3 from the high level to the low level (FIG. 3(B)). This causes the switch 34 to change from the on state to the off state. The light emitting diode 21 stops emitting light (FIG. 3(C)). As a result, the light source 20 emits the light pulse L1 having a pulse width Tpw as illustrated in FIG. 3(C).

Next, at timing t14, the control signal generator 31 changes the control signal S1 from the high level to the low level (FIG. 3(A)). The driver 32 drives the current source 33 on the basis of the control signal S1. The control signal S2 supplied to the current source 33 is a dull signal due to the loading, and falls slightly slowly.

In this way, the light source 20 emits the light pulse L1 (FIG. 3(C)) towards the measurement object. As described above, in the distance measurement device 1, since the switch 34 is provided on the current path of the light emitting diode (LED) 21, it is possible to steepen the change of a light intensity in the posterior end (waveform part WL1) of the light pulse L1 by turning off the switch 34. As a result, in the distance measurement device 1, it is possible to measure the distance D to the measurement object with high accuracy by using the posterior end of the light pulse (reflected light pulse L2) reflected on the measurement object, as will be described later.

The lens 11 (FIG. 1) forms an image on an imaging plane of the imaging section 40. To the lens 11, the reflected light pulse L2 enters.

The imaging section 40 acquires a distance image PIC on the basis of an instruction from the controller 12. Each of the plurality of pixel values included in the distance image PIC indicates a value of the distance D (distance signal value). Further, the imaging section 40 outputs the acquired distance image PIC as an image signal Spic.

FIG. 4 illustrates a configuration example of the imaging section 40. The imaging section 40 includes a pixel array 41, a scanner 42, a reading section 50, an image generator 44, and an imaging controller 45. FIG. 5 illustrates a configuration example of the pixel array 41 and the reading section 50.

The pixel array 41 is a matrix-like arrangement of a plurality of image pixels P. Each of the image pixels P outputs a pixel signal SIG corresponding to the amount of light received.

As illustrated in FIG. 5, the pixel array 41 includes a plurality of control lines TGL, a plurality of control lines RSTL, a plurality of control lines SLL, and a plurality of signal lines SGL. The control line TGL extends in a horizontal direction (lateral direction in FIGS. 4 and 5), and a control signal TG is applied to the control line TGL by the scanner 42. The control line RSTL extends in a horizontal direction, and a control signal RST is applied to the control line RSTL by scanner 42. The control line RSTL extends in the horizontal direction, and a control signal RST is applied to the control line RSTL by the scanner 42. The control line SLL in a horizontal direction, and a control signal SL is applied to the control line SLL by the scanner 42. The signal line SGL extends in a vertical direction (longitudinal direction in FIGS. 4 and 5), and supplies a pixel signal SIG to the reading section 50.

The image pixel P includes a photodiode 14, a reading transistor 15, a reset transistor 16, a floating diffusion FD, and an output section 17. The reading transistor 15 and the reset transistor 16 are each an N-type MOS transistor in this example.

The photodiode 14 is a photoelectric converter that generates electrons (signal electrons) in accordance with the amount of light received. An anode of the photodiode 14 is grounded and a cathode of the photodiode 14 is coupled to a source of the reading transistor 15.

A gate of the reading transistor 15 is coupled to the control line TGL, the source of the reading transistor 15 is coupled to the cathode of the photodiode 14, and a drain of the reading transistor 15 is coupled to the floating diffusion FD.

The floating diffusion FD stores the signal electrons supplied by the photodiode 14, and converts the signal electrons into a voltage, and is formed using, for example, a diffusion layer formed on a surface of a semiconductor substrate. In FIG. 5, the floating diffusion FD is illustrated using a symbol of a capacitor element.

A gate of the reset transistor 16 is coupled to the control line RSTL, a drain of the reset transistor 16 is supplied with a voltage VDD, and a source of the reset transistor 16 is coupled to the floating diffusion FD.

The output section 17 outputs the voltage corresponding to the number of signal electrons in the floating diffusion FD to the signal line SGL as the pixel signal SIG. The output section 17 includes transistors 18 and 19. The transistors 18 and 19 are each an N-type MOS transistor in this example. A gate of the transistor 18 is coupled to the floating diffusion FD, a drain of the transistor 18 is supplied with the voltage VDD, and a source of the transistor 18 is coupled to a drain of the transistor 19. A gate of the transistor 19 is coupled to the control line SLL, the drain of the transistor 19 is coupled to the source of the transistor 18, and a source of the transistor 19 is coupled to the signal line SGL.

With this configuration, in the image pixel P, the transistor 19 is turned into the on state on the basis of the control signal SL applied to the control line SLL, whereby the image pixel P is electrically coupled to the signal line SGL. Accordingly, since the transistor 18 is coupled to a current source 61 of the reading section 50 (described later), the transistor 18 operates as a so-called source follower. Further, the reading transistor 15 is turned into the on state on the basis of the control signal TG applied to the control line TGL. The photodiode 14 is thereby coupled to the floating diffusion FD. The gate voltage VG of the reset transistor 16 is set to a middle-level voltage VM on the basis of the control signal RST applied to the control line RSTL. This causes the reset transistor 16 to be in the intermediate state between the on state and the off state. As a result, the electrons generated at the photodiode 14 of the image pixel P is supplied to the floating diffusion FD via the reading transistor 15 which is in the on state, the supplied electrons are stored in the floating diffusion FD, and some of the electrons stored in the floating diffusion FD is discharged via the photodiode 14. The output section 17 outputs a voltage corresponding to the voltage of the floating diffusion FD to the signal line SGL as the pixel signal SIG. In this manner, the image pixel P supplies the pixel signal SIG to the reading section 50 corresponding to the amount of light received.

The scanner 42 (FIG. 4) sequentially drives the plurality of image pixels P on a per-pixel line-basis on a basis of an instruction from the imaging controller 45, and includes, for example, a shift register. Specifically, the scanner 42 sequentially drives the plurality of image pixels P on a per-pixel line-basis by applying the control signal TG to the plurality of control lines TGL, applying the control signal RST to the plurality of control lines RSTL, and applying the control signal SL to the plurality of control lines SLL.

The reading section 50 measures a time interval from a posterior end timing of the light pulse L1 emitted by the light source 20 to a posterior end timing of the reflected light pulse L2 received by the image pixel P on the basis of the pixel signal SIG outputted from the image pixel P. Specifically, the reading section 50 uses the fact that a fall timing (timing t13 in FIG. 3) of the control signal S3, which is used when the light source 20 emitted the light pulse L1, corresponds to the posterior end timing of the light pulse L1, and the time interval from the fall timing of the control signal S3 to the posterior end timing of the reflected light pulse L2 is measured, thereby measuring the time interval from the posterior end timing of the light pulse L1 to the posterior end timing of the reflected light pulse L2. The reading section 50 includes a plurality of reading circuits 60, a signal output section 51, and a reading controller 52.

The plurality of reading circuits 60 are provided in correspondence with the respective plurality of signal lines SGL in this example, as illustrated in FIG. 5. The reading circuit 60 includes the current source 61, a signal change detector 62, a latch circuit 68, and a time counter 69.

The current source 61 allows a predetermined current to flow, so that the output section 17 of each image pixel P operates as a source follower.

The signal change detector 62 detects a signal change corresponding to the posterior end of the reflected light pulse L2 included in the pixel signal SIG. The signal change detector 62 includes an amplifier 63, a difference circuit 64, and a comparator 67.

The amplifier 63 generates a signal S63 by amplifying the pixel signal SIG. The gain of the amplifier 63 is able to be about 10 times, for example.

The difference circuit 64 generates a signal DIF by detecting a difference between signal values at two timings apart from each other by a predetermined time period in the signal S63 outputted from the amplifier 63.

FIG. 6 illustrates a configuration example of the difference circuit 64. The difference circuit 64 includes a delay circuit 65 and a subtracting circuit 66. The delay circuit 65 generates a signal S65 by delaying the signal S63 by a predetermined time period. The delay circuit 65 includes, for example, a coil and a capacitive element. The subtracting circuit 66 generates the signal DIF by subtracting the signal S65 from the signal S63.

The comparator 67 generates a signal COMP by comparing a voltage of the signal DIF with a threshold voltage Vth. A positive input terminal of the comparator 67 is supplied with the signal DIF, and a negative input terminal is supplied with the threshold voltage Vth.

The latch circuit 68 generates a signal STOP by sampling and latching the signal COMP at a cycle Tclk of a clock signal CLK and holding the sampling result. This signal STOP is a signal indicating the posterior end timing of the reflected light pulse L2, as will be described later.

The time counter 69 performs count operation of counting clock pulses of the clock signal CLK. Specifically, the time counter 69 starts the count operation on the basis of the signal START, and terminates the count operation on the basis of the signal STOP. The signal START is a signal indicating the posterior end timing of the light pulse L1 emitted by the light source 20. That is, the count value CNT of the time counter 69 at the time when the count operation ends corresponds to the time interval from the posterior end timing of the light pulse L1 emitted by the light source 20 to the posterior end timing of the reflected light pulse L2 received by the image pixel P. In other words, the count value CNT corresponds to a value (distance signal value) for the distance D in the image pixel P. Then, the time counter 69 supplies the count value CNT to the signal output section 51 after completing the count operation.

The signal output section 51 sequentially outputs the count values CNT supplied from the plurality of reading circuits 60 as signals Spic1 on the basis of an instruction from the reading controller 52.

The reading controller 52 controls the read operation in the reading section 50. The reading controller 52 also has a function of generating the threshold value voltage Vth, the clock signal CLK, and the signal START.

The image generator 44 (FIG. 4) generates the distance image PIC in which each pixel value indicating the value of the distance D on the basis of the signal Spic1 supplied from the reading section 50, and outputs the distance image PIC as the image signal Spic.

The imaging controller 45 supplies the control signal to the scanner 42, the reading section 50, and the image generator 44 on the basis of an instruction from the controller 12, and controls the operation of those circuits, to thereby control the operation of the imaging section 40.

With such a configuration, the imaging section 40 acquires the distance image PIC, and outputs the distance image PIC as the image signal Spic.

The controller 12 (FIG. 1) supplies the control signal to the light source controller 30 and the imaging section 40, and controls the operation of those circuits, to thereby control the operation of the distance measurement device 1.

Here, the light source 20 and the light source controller 30 correspond to an example of a "light source section" according to an embodiment of the present disclosure. The controller 12 corresponds to an example of a "controller 12" according to an embodiment of the present disclosure. The image pixel P corresponds to an example of a "light receiver" according to an embodiment of the present disclosure. The light pulse L1 corresponds to an example of a "first light pulse" according to an embodiment of the present disclosure. The reflected light pulse L2 corresponds to an example of a "first reflected light pulse" according to an embodiment of the present disclosure. The signal change detector 62 corresponds to an example of a "signal change detector" according to an embodiment of the present disclosure. The time counter 69 and the reading controller 52 correspond to an example of a "time measurement section" according to an embodiment of the present disclosure. The threshold voltage Vth corresponds to an example of a "predetermined threshold" according to an embodiment of the present disclosure. The control signal generator 31 corresponds to an example of a "switch controller" according to an embodiment of the present disclosure. The reading transistor 15 corresponds to an example of a "first transistor" according to an embodiment of the present disclosure. The reset transistor 16 corresponds to an example of a "second transistor" according to an embodiment of the present disclosure. The floating diffusion FD corresponds to an example of a "signal converter" according to an embodiment of the present disclosure. The scanner 42 corresponds to an example of a "driver" according to an embodiment of the present disclosure.

[Operations and Workings]

Subsequently, operations and workings of the distance measurement device 1 according to the present embodiment will be described.

(Outline of Overall Operation)

First, with reference to FIGS. 1, 4, and 5, an outline of an overall operation of the distance measurement device 1 will be described. The light source controller 30 (FIG. 1) controls the operation of the light source 20 on the basis of an instruction from the controller 12. The light source 20 emits the light pulse L1.

In the imaging section 40, the image pixel P (FIGS. 4 and 5) of the pixel array 41 outputs the pixel signal SIG corresponding to the amount of light received. The amplifier 63 (FIG. 5) of the reading section 50 generates the signal S63 by amplifying the pixel signal SIG. The difference circuit 64 detects a difference between signal values at two timings apart from each other by a predetermined time period on the basis of the signal S63 outputted from the amplifier 63. The comparator 67 generates the signal COMP by comparing the voltage of the signal DIF with the threshold voltage Vth. The latch circuit 68 generates a signal STOP by sampling and latching the signal COMP at the cycle Tclk of the clock signal CLK and holding the sampling result. The time counter 69 starts the count operation on the basis of the signal START, and terminates the count operation on the basis of the signal STOP. Then, the time counter 69 supplies the count value CNT to the signal output section 51 after completing the count operation. The signal output section 51 sequentially outputs the count values CNT supplied from the plurality of reading circuits 60 as signals Spic1.

The image generator 44 (FIG. 4) then generates the distance image PIC in which each pixel value indicating the value of the distance D on the basis of the signal Spic1, and outputs the distance image PIC as the image signal Spic.

(Detailed Operation)

The imaging section 40 generates the distance image PIC by sequentially driving the plurality of image pixels P in the pixel array 41 on a per-pixel line-basis. In a case where a pixel line is to be selected, the scanner 42 changes the control signal SL of the pixel line from the low level to the high level. Thus, in the image pixel P belonging to the pixel line, the output section 17 outputs a voltage corresponding to the number of signal electrons in the floating diffusion FD to the signal line SGL as the pixel signal SIG. In this operation, the voltage of the control signal TG maintains the high level. The reading transistor 15 thus maintains the on state. Further, in this operation, the voltage of the control signal RST maintains the middle-level voltage VM. Accordingly, the reset transistor 16 maintains the intermediate state between the on state and the off state. Hereinafter, the operation relating to the image pixel P belonging to the pixel line in a case where a certain pixel line is selected will be described in detail.

FIG. 7 illustrates an operation example of the distance measurement device 1, where (A) indicates a waveform of light to be emitted from the light source 20, (B) indicates a waveform of reflected light to be received by the imaging section 40, (C) indicates a waveform of the control signal TG, (D) indicates a waveform of the control signal RST, (E) indicates a waveform of the pixel signal SIG, (F) indicates a waveform of the signal DIF to be outputted from the difference circuit 64, (G) indicates a waveform of the signal COMP to be outputted from the comparator 67, (H) indicates a waveform of the signal STOP to be outputted from the latch circuit 68, and (I) indicates an operation of the time counter 69.

This example illustrates an operation in a case where a measurement range R is set to about 30 m. In a case where the distance D between the distance measurement device 1 and the measurement object is 30 m, the time from the light emitted from the light source 20 is reflected by the measurement object to the light is received by the imaging section 40 is about 200 nsec. Further, in this example, the cycle Tclk of the clock signal CLK is set to 2 nsec. In this case, the measurement resolution of a case where the distance D between the distance measurement device 1 and the measurement object is 30 m is set to 1/100 (=2 nsec/200 nsec).

As described above, since the gate voltage VG of the reset transistor 16 of the image pixel P is maintained at the middle-level voltage VM, the reset transistor 16 maintains the intermediate state between the on state and the off state. In the intermediate state, the resistance value between the drain and the source in reset transistor 16 is higher than resistance value in the on state and lower than the resistance value in the off state.

In the time period prior to the timing t22, the photodiode 14 of the image pixel P generates an electron by performing photoelectric conversion on the basis of a background light LB. The electron is supplied to the floating diffusion FD via the reading transistor 15 which is in the on state and is stored. Since the reset transistor 16 is in the intermediate state between the on state and the off state, some of the electrons stored in the floating diffusion FD is discharged from the floating diffusion FD via reset transistor 16. The amount of electrons supplied from the photodiode 14 to the floating diffusion FD according to the background light LB is balanced with the amount of electrons discharged from the floating diffusion FD. As a result, the voltage of the pixel signal SIG is maintained at voltage V2 slightly lower than voltage V1 (FIG. 7(E)), voltage V1 being a voltage in which the background light LB is absent.

Next, at timing t22, the light source 20 starts emitting light (FIG. 7(A)). Specifically, the light source controller 30 drives the light source 20 as illustrated in FIG. 3 on the basis of an instruction from the controller 12, the light source 20 starts emitting light.

Next, at timing t23, the light source 20 stops emitting light (FIG. 7(A)). Specifically, the light source controller 30 drives the light source 20 as illustrated in FIG. 3 on the basis of an instruction from the controller 12, to thereby stop emitting light. As a result, the light pulse L1 is generated in the time period from timing t22 to timing t23. The pulse width Tpw of the light pulse L1 is 200 nsec in this example.

Also, at timing t23, the time counter 69 starts the count operation (FIG. 7(I)). Specifically, first, the controller 12 instructs the reading section 50 to cause the time counter 69 to start the count operation in accordance with the fall timing (timing t13 in FIG. 3) of the control signal S3. The reading controller 52 of the reading section 50 generates the signal START at timing t23 corresponding to the posterior end of the light pulse L1 on the basis of an instruction from the controller 12, and the time counter 69 starts the count operation on the basis of the signal START.

In this case, at timing t24, the reflected light pulse L2 corresponding to the light pulse L1 reaches the imaging section 40 (FIG. 7(B)).

In response to the reflected light pulse L2, in the time period from timing t24 to timing t26, the voltage of the pixel signal SIG decreases from voltage V2 (FIG. 7(E)). The amplifier 63 of the reading circuit 60 amplifies the pixel signal SIG. Then, the difference circuit 64 generates the signal DIF on the basis of the signal S63 outputted from the amplifier 63 (FIG. 7(F)).

FIG. 8 illustrates a more specific waveform of the pixel signal SIG and the signal DIF from timing t24 to timing t26. FIG. 9 illustrates the operation of the image pixel P between timings t24 and t26, where (A) indicates the coupling of the photodiode 14, the reading transistor 15, the floating diffusion FD, and the reset transistor 16, and (B) indicates the electric potentials at the respective elements. Between timings t24 and t26, the photodiode 14 performs photoelectric conversion on the basis of both the background light LB and the reflected light pulse L2. The electrons generated by the photoelectric conversion is stored in the floating diffusion FD. The voltage of the pixel signal SIG is thereby decreased from voltage V2. At this time, since the reset transistor 16 is in the intermediate state between the on state and the off state, some of the electrons stored in the floating diffusion FD are discharged from the floating diffusion FD via the reset transistor 16. As the electrons stored in the floating diffusion FD increases, the electrons expelled from the floating diffusion FD increases, so that over time, the change in the voltage of the pixel signal SIG becomes gradual.

At timing t26, when the reflected light L2 terminates, the voltage of the pixel signal SIG rises and returns to voltage V2 (FIG. 7(E)). That is, since the reflected light pulse L2 terminates at and after timing t26, the electrons supplied to the floating diffusion FD are decreased. As a result, the electrons are discharged from the floating diffusion FD via the reset transistor 16, and the electrons stored in the floating diffusion FD decrease, thereby increasing the voltage of the pixel signal SIG and causing the voltage to return to voltage V2.

In response to the change in the voltage of the pixel signal SIG, the voltage of the signal DIF outputted from the difference circuit 64 once rises above the threshold voltage Vth and then falls (FIG. 7(F)). In response to this, the comparator 67 changes the signal COMP (FIG. 7(G)). The latch circuit 68 changes the signal STOP from the low level to the high level on the basis of the rising edge of the signal COMP (FIG. 7(H)). That is, the change timing of the signal STOP corresponds to the timing of the posterior end (waveform part WL2) of the reflected light pulse L2. In FIG. 7(E), the part of the pixel signal SIG corresponding to the change timing of the signal STOP is indicated by a circle.

The time counter 69 then terminates the count operation of the clock signal CLK on the basis of the signal STOP (FIG. 7(I)). Thus, the time counter 69 starts the count operation on the basis of the signal START in the posterior end timing (timing t23) of the light pulse L1 and terminates the count operation on the basis of the signal STOP in the posterior end timing (timing t26) of the reflected light pulse L2. That is, the count value CNT of the time counter 69 when the time counter 69 terminates the count operation corresponds to the time interval from the posterior end timing of the light pulse L1 emitted by the light source 20 to the posterior end timing of the reflected light pulse L2 received by the image pixel P. The time counter 69 supplies the count value CNT to the signal output section 51 at and after timing t26.

FIG. 10 illustrates another operation example of the distance measurement device 1. This example illustrates an operation in a case where the measurement range R is set to about 120 m. In a case where the distance D between the distance measurement device 1 and the measurement object is 120 m, the time from the light emitted from the light source 20 is reflected by the measurement object to the light is received by the imaging section 40 is about 800 nsec. In this example, the cycle Tclk of the clock signal CLK is set to 8 nsec. In this case, the measurement resolution of a case where the distance D between the distance measurement device 1 and the measurement object is 120 m is set to 1/100 (=8 nsec/800 nsec). Note that the measurement resolution is an example, and can be appropriately changed. For example, in a case where the measurement resolution is set to 1/1000, the cycle Tclk of the clock signal CLK is set to 0.8 nsec.

Also in this example, in a similar manner to the case of FIG. 7, in the time period prior to timing t32, the amount of electrons supplied from the photodiode 14 to the floating diffusion FD according to the background light LB is balanced with the amount of electrons discharged from the floating diffusion FD. As a result, the voltage of the pixel signal SIG is maintained at voltage V2 (FIG. 10(E)).

Next, at timing t32, the light source 20 starts emitting light, and at timing t33, the light source 20 stops emitting light (FIG. 10(A)). As a result, the light pulse L1 is generated in the time period from timing t32 to timing t33. Further, at timing t33 corresponding to the posterior end of the light pulse L1, the time counter 69 starts the count operation (FIG. 10(I)).

In this example, at timing t34, the reflected light pulse L2 corresponding to the light pulse L1 reaches the imaging section 40 (FIG. 10(B)).

In response to the reflected light pulse L2, in the time period from timing t34 to timing t36, the voltage of pixel signal SIG decreases from voltage V2 (FIG. 10(E)). In this example, since the distance D from the distance measurement device 1 to the measurement object is long, the change in the voltage of the pixel signal SIG from voltage V2 is smaller than a case where the distance D is short (broken line). At timing t36, when the reflected light pulse L2 terminates, the voltage of the pixel signal SIG rises and returns to voltage V2 (FIG. 10(E)).

In response to a change in the voltage of the pixel signal SIG, the voltage of the signal DIF outputted from the difference circuit 64 once rises above the threshold voltage Vth and then falls (FIG. 10(F)). In response, the comparator 67 changes the signal COMP (FIG. 10(G)). The latch circuit 68 changes the signal STOP from the low level to the high level on the basis of the rising edge of the signal COMP (FIG. 10(H)).

The time counter 69 then terminates the count operation of the clock signal CLK on the basis of the signal STOP (FIG. 10(I)). The time counter 69 supplies the count value CNT to the signal output section 51 at and after timing t36.

FIG. 11 illustrates an operation example of the distance measurement device 1 in a case where the distance D between the distance measurement device 1 and the measurement object varies, where (A) indicates a waveform of light to be emitted from the light source 20, (B) indicates waveforms of reflected light to be received by the imaging section 40, (C) indicates a waveform of the control signal RST, (D) indicates waveforms of the pixel signals SIG, and (E) indicates an operation of the time counter 69. Here, FIG. 11(E) indicates a time period in which it is possible for the time counter 69 to perform the count operation.

In this example, the measurement range R is set to about 120 m. Further, in this example, the cycle Tclk of the clock signal CLK is set to 8 nsec. Therefore, the measurement resolution of a case where the distance D between the distance measurement device 1 and the measurement object is 120 m is set to 1/100 (=8 nsec/800 nsec).

As illustrated in FIG. 11(B), depending on the distance D between the distance measurement device 1 and the measurement object, the timing at which the reflected light pulse L2 reaches the imaging section 40 changes. The time counter 69 starts the count operation at timing t1 corresponding to the posterior end of the light pulse L1, and stops the count operation on the basis of the changes of the pixel signals SIG at timings ta, tb, tc, and td corresponding to the posterior ends of the reflected light pulses L2. Thus, the reading circuit 60 measures the time interval from the posterior end timing of the light pulse L1 emitted by the light source 20 to the posterior end timing of the reflected light pulse L2 received by the image pixel P.

FIG. 12 illustrates examples of waveforms of the pixel signal SIG and the signal DIF in a case where the distances D between the distance measurement device 1 and the measurement object are distances D1 to D3. A waveform SIGD1 indicates a waveform of the pixel signal SIG in a case where the distance D is a distance D1, a waveform SIGD2 indicates a waveform of the pixel signal SIG in a case where the distance D is a distance D2, and a waveform SIGD3 indicates a waveform of the pixel signal SIG in a case where the distance D is a distance D3. A waveform DIFD1 indicates a waveform of the signal DIF in a case where the distance D is the distance D1, a waveform DIFD2 indicates a waveform of the signal DIF in a case where the distance D is the distance D2, and a waveform DIFD3 indicates a waveform of the signal DIF in a case where the distance D is the distance D3. Here, the distance D1 is shorter than the distance D2, and the distance D2 is shorter than the distance D3. In FIG. 12, the timings at which the pixel signals SIG start to change are drawn to coincide. The waveform SIGB of the pixel signal SIG in a case where only the background light LB is used is also depicted.

Thus, depending on the distance D between the distance measurement device 1 and the measurement object, the amount of voltage change of the pixel signal SIG varies. In this case, however, regardless of the distance D between the distance measurement device 1 and the measurement object, the voltage of the signal DIF exceeds the threshold voltage Vth. This allows the distance measurement device 1 to generate the signal STOP and the time counter 69 to stop the count operation on the basis of the signal STOP. As a result, in the distance measurement device 1, since the count value CNT is not changed by the light intensity of the reflected light, it is possible to measure the distance D between the distance measurement device 1 and the measurement object with high accuracy.

Note that, in this example, the three cases in which the distances D between the distance measurement device 1 and the measurement object are different are used, but the same applies to, for example, the case in which the reflectances in the measurement object are different. In this case, even when the light intensity of the reflected light differs depending on the reflectance, the count value CNT does not change depending on the light intensity of the reflected light as described above, so that it is possible to measure the distance D between the distance measurement device 1 and the measurement object with high accuracy.

Next, a highly sensitive detecting operation when the light intensity of the reflected light is small will be described. In the image pixel P, the electron (signal electron) generated in the photodiode 14 is stored in the floating diffusion FD. The distance measurement device 1 performs an integral action by storing the signal electrons using the floating diffusion FD, and is able to detect a minute signal on the basis of the result obtained by the integral action.

FIG. 13(A) illustrates an example of an operation in a case where the minute signal is not integrated, and FIG. 13(B)

illustrates an example of an operation in a case where the minute signal is integrated. In those examples, the background light LB corresponds to a minute signal of 10 electrons, and the reflected light pulse L2 corresponds to a minute signal of 10 electrons. Also, in FIG. 13, the circled portions indicate sample points by the reading circuit 60.

As illustrated in FIG. 13(A), in the case where the minute signal is not integrated, a noise such as an optical shot noise, for example, is added to the minute signal (signal S11), so that a signal component of the reflected light pulse L2 is buried. Therefore, even if the signal S11 is sampled at the cycle Tclk of the clock signal CLK, there is a possibility that the reflected light pulse L2 is not detected.

In contrast, as illustrated in FIG. 13(B), in the case where the minute signal is integrated, the noise is integrated in addition to the minute signal, so that it is possible to cause the reflected light pulse L2 to be easily detected on the basis of the integrated signal (signal S12). Specifically, it is possible to cause the reflected light pulse L2 to be easily detected by generating a signal S13 corresponding to the signal DIF on the basis of the signal S12 and comparing the voltage of the signal S13 with the threshold voltage Vth.

As described above, in the distance measurement device 1, the light source 20 emits one light pulse L1, and the image pixel P receives the reflected light pulse L2 corresponding to the light pulse L1. As a result, for example, a plurality of (e.g., 1000) light pulses can be emitted, and it is possible to make the light intensity (power) of the light pulse L1 higher than the light intensity (power) when the distance D is obtained by performing a statistical process on the basis of the plurality of reflected light pulses corresponding to the plurality of light pulses. In order to prevent an eye of the human from being damaged even if the light emitted from the light source 20 enters the eye, it is desirable to limit the power per unit time, for example. In this case, since it is possible to reduce the number of light pulses L1 in the distance measurement device 1, it is possible to increase the power per one light pulse L1. As a result, it becomes possible to increase the measurable distance in the distance measurement device 1. For example, by multiplying the power of the light pulse L1 by a factor of 1000, the measurable distance can be extended by a factor of 31.6 (the square root of 1000).

Further, in the distance measurement device 1, since the light source 20 emits one light pulse L1, it is possible to reduce the power consumed. That is, for example, in a case where the plurality of light pulses is emitted and the distance D is obtained on the basis of the plurality of reflected light pulses, the power consumed by the circuits that perform the process on the basis of the light source and the plurality of reflected light pulses may be increased. In contrast, in the distance measurement device 1, since the light source 20 emits one light pulse L1 and obtains the distance D on the basis of one reflected light pulse L2, it is possible to reduce the power consumed. In addition, since it is possible to suppress the amount of heat generation by reducing the power consumption in this manner, it is possible to stably operate the device, and it is possible to reduce the possibility of deterioration of the measurement accuracy due to heat generation, for example. In addition, it is possible to perform the distance measurement operation over a long period of time by utilizing such low power consumption and a small amount of heat generation.

Further, in the distance measurement device 1, the voltage of the control signal RST is set to the middle-level voltage VM. As a result, it is possible to store the electrons generated in the photodiode 14 in the floating diffusion FD, and to discharge some of the electrons stored in the floating diffusion FD via the reset transistor 16, which enables to increase the measurable distance. That is, if the voltage of the control signal RST is set to the low level voltage VL, since the reset transistor 16 is in the off state, the electrons stored in the floating diffusion FD are not discharged. In this case, for example, since the electrons based on the background light LB continues to be stored in the floating diffusion FD, if the distance D is long, the storage amount of the electrons in the floating diffusion FD may reach the upper limit and become saturated. In contrast, in the distance measurement device 1, the voltage of the control signal RST is set to the middle-level voltage VM. Accordingly, some of the electrons stored in the floating diffusion FD can be discharged via the reset transistor 16, so that the possibility that the electrons based on the background light LB continue to be stored in the floating diffusion FD is be reduced. As a result, it is possible to increase the measurable length in the distance measurement device 1.

Further, in the distance measurement device 1, since the timing of the posterior end of the reflected light pulse L2 is detected, it is possible to easily measure the distance D to the measurement object. That is, as illustrated in FIG. 7, for example, when the reflected light pulse L2 terminates, since the electrons supplied to the floating diffusion FD decrease, the voltage of the pixel signal SIG rises by discharging the electrons from the floating diffusion FD via the reset transistor 16. As described above, since the pixel signal SIG largely changes at the posterior end timing of the reflected light pulse L2, it is possible to increase an S/N ratio, and thus, it becomes possible to easily detect the timing of the posterior end of the reflected light pulse L2. As a result, the distance measurement device 1 is able to easily measure the distance D to the measurement object.

In the distance measurement device 1, since the electrons generated in the photodiode 14 are stored in the floating diffusion FD, the minute signal can be integrated. In this case, in the distance measurement device 1, since it is possible to increase the signal amount by increasing the integration time, it is possible to easily detect the reflected light pulse L2.

[Effects]

As described above, in the present embodiment, since the light source emits one light pulse and the image pixel receives the reflected light pulse corresponding to the light pulse, it is possible to increase the measurable distance, In the present embodiment, since the light source emits one light pulse and the image pixel receives the reflected light pulse corresponding to the light pulse, it is possible to reduce the power consumed and to cause the device to operate stably.

In the present embodiment, since the voltage of the control signal RST is set to the middle-level voltage, it is possible to increase the measurable distance, In the present embodiment, since the timing of the posterior end of the reflected light pulse is detected, it is possible to easily measure the distances to the measurement object.

In the present embodiment, since the electrons generated in the photodiode are stored in the floating diffusion, it is possible to easily detect the reflected light pulse.

Modification Example 1-1

In the above embodiment, the voltage of the control signal RST is set to the middle-level voltage VM, however, as shown in FIG. 14, this middle-level voltage VM may be adjusted depending on the measurement range R, for example. In this example, the middle-level voltage VM can be set to three voltages VM1 to VM3. The voltage VM1 is higher than the voltage VM2, and the voltage VM2 is higher than the voltage VM3.

For example, by setting the middle-level voltage VM to the voltage VM1, the electric potential difference between the voltage VM1 and the voltage VDD becomes small, so that it is possible to increase the electrons stored in the floating diffusion FD. In this case, the change of the pixel signal SIG corresponding to the posterior end of the reflected light pulse L2 is slow, because the electrons discharged from the floating diffusion FD are reduced.

Further, for example, by setting the middle-level voltage VM to the voltage VM3, the electric potential difference between the voltage VM3 and the voltage VDD becomes large, so that it is possible to increase the electrons discharged from the floating diffusion FD. As a result, it is possible to accelerate the change of the pixel signal SIG corresponding to the posterior end of the reflected light pulse L2. In this case, the electrons stored in the floating diffusion FD are reduced.

If the measurable distance is set to a long distance, for example, it is possible to set the middle-level voltage VM to a high voltage (e.g., voltage VM1). Thus, for example, it is possible to increase the electrons stored in the floating diffusion FD. In this case, since the change of the pixel signal SIG corresponding to the posterior end of the reflected light pulse L2 becomes slow, the measurement resolution may decrease, but since the distance D itself is long, it is possible to suppress the effect on the measurement accuracy.

In contrast, if the measurable distance is set to a short distance, for example, it is possible to set the middle-level voltage VM to a low voltage (e.g., voltage VM3). Thus, for example, it is possible to make the change of the pixel signal SIG corresponding to the posterior end of the reflected light pulse L2 fast, so that it is possible to increase the measurement resolution. In this case, although it is difficult to store the electrons in the floating diffusion FD, since the light intensity of the reflected light pulse L2 is high due to the short distance D, it is possible to increase the electrons stored in the floating diffusion FD to some extent.

Modification Example 1-2

The reset transistor 16 may have a configuration as illustrated in FIG. 15(A), for example. A gate length LL1 of the reset transistor 16 is desirably longer than a gate width WW1 of the reset transistor 16. A width WW2 of the floating diffusion FD is desirably wider than the gate width WW1 of the reset transistor 16. A width WW3 of a contact region to which the voltage VDD is supplied is desirably wider than the gate width WW1 of the reset transistor 16.

A length of the source of the reset transistor 16 may be set to a length LL2, and the source may be coupled to the floating diffusion FD. In a similar manner, a length of the drain of the reset transistor 16 may be set to a length LL3, and the drain may be coupled to the contact region to which the voltage VDD is supplied. By increasing the length LL2 and the length LL3, it is possible to increase the resistance value in the reset transistor 16 as illustrated in FIG. 15(B). This makes it possible to adjust a time constant at which the electrons are discharged from the floating diffusion FD via the reset transistor 16. For example, when the capacitance value is set to 2 fF and the resistance value is set to 100 kΩ it is possible to set the time constant to 200 psec. The resistance value of 100 kΩ is, for example, the resistance value when the high level voltage VH is applied to the gate of the reset transistor 16. Further, for example, when the capacitance value is set to 2 fF and the resistance value is set to 1 MΩ, it is possible to set the time constant to 2 nsec. The resistance value of 1 MΩ is, for example, the resistance value when the middle-level voltage VM is applied to the gate of the reset transistor 16.

Modification Example 1-3

In the above embodiment, as illustrated in FIG. 2, the light source controller 30 is configured using one current source 33, but the present disclosure is not limited thereto. Hereinafter, a light source controller 30D according to the present modification example will be described in detail.

FIG. 16 illustrates a configuration example of the light source controller 30D. The light source controller 30D includes a control signal generator 31D, a driver 35, and a current source 36. The control signal generator 31D generates control signals S1, S3, and S4 on the basis of an instruction from the controller 12. The driver 35 drives the current source 36 on the basis of the control signal S4. The current source 36 allows a current of a predetermined current to flow, and has one end coupled to the cathode of the light emitting diode (LED) 21 and the other end coupled to one end of the switch 34. That is, the current source 36 is connected in parallel with the current source 33.

FIG. 17 illustrates an operation example of the light source 20 and the light source controller 30D, where (A) indicates a waveform the control signal S4, (B) indicates a waveform the control signal S1, (C) indicates a waveform the control signal S3, and (D) indicates a waveform the light to be emitted from the light source 20. In this example, when the control signal S4 is in the high level, the current source 36 conducts a current.

At timing t41, the control signal generator 31D changes the control signal S3 from the low level to the high level (FIG. 17(C)). The switch 34 changes from the off state to the on state.

Next, at timing t42, the control signal generator 31D changes the control signal S1 from the low level to the high level (FIG. 17(B)). The driver 32 drives the current source 33 on the basis of the control signal S1. As a result, the light emitting diode (LED) 21 starts emitting light (FIG. 17(D)).

Next, at timing t43, the control signal generator 31D changes the control signal S4 from the low level to the high level (FIG. 17(A)). The driver 35 drives the current source 36 on the basis of the control signal S4. As a result, a current flows through the light emitting diode (LED) 21 to further increase the light intensity (FIG. 17(D)).

Next, at timing t44, the control signal generator 31D changes the control signal S3 from the high level to the low level (FIG. 17(C)). As a result, the switch 34 changes from the on state to the off state. Then, the light emitting diode (LED) 21 stops emitting light (FIG. 17(D)).

Next, at timing t45, the control signal generator 31D changes the control signals S1 and S4 from the high level to the low level (FIGS. 17(A) and (B)).

In this way, the light source 20 emits the light pulse L1 (FIG. 17(D)) towards the measurement object. As described above, in a distance measurement device 1D including the light source controller 30D, since the two current sources 33 and 36 are provided, it is possible to increase the change of the light intensity in the posterior end (waveform part WL1) of the light pulse L1. As a result, it is possible to increase the amount of change of the pixel signal SIG corresponding to the posterior end of the reflected light pulse L2, so that it is possible to increase the measurable distance. In addition, since the current source 36 allows the current to flow only in a predetermined time period in the vicinity of the posterior end of the light pulse L1, it is possible to effectively reduce the power consumed as compared with the case where the current flows in the entire time period from the anterior end to the posterior end of the light pulse L1.

Modification Example 1-4

In the above embodiment, as illustrated in FIG. 5, the image pixel P is provided with four transistors (the reading transistor 15, the reset transistor 16, the transistors 18 and 19) and the floating diffusion FD, but the present disclosure is not limited thereto. Hereinafter, an imaging section 40E according to the present modification example will be described in detail.

In a similar manner to the imaging section 40 (FIG. 4) according to the above embodiment, the imaging section 40E includes a pixel array 41E, a scanner 42E, the reading section 50, the image generator 44, and the imaging controller 45.

FIG. 18 illustrates a configuration example of the pixel array 41E. The pixel array 41E is a matrix-like arrangement of a plurality of image pixels PE. The pixel array 41E includes a plurality of control lines RSTL, a plurality of control lines SLL, and a plurality of signal lines SGL.

The image pixel PE includes a photodiode 14A, the reset transistor 16, and the output section 17. In the image pixel PE, in the image pixel P (FIG. 5) according to the above embodiment, the photodiode 14 is replaced with the photodiode 14A, and the reading transistor 15 and the floating diffusion FD are omitted. The photodiode 14A is a photoelectric converter that generates electrons (signal electrons) in accordance with the amount of light received and stores the generated electrons therein. An anode of the photodiode 14A is grounded and a cathode of the photodiode 14A is coupled to the source of the reset transistor 16 and the gate of the transistor 18.

With this configuration, in the image pixel PE, the transistor 19 is turned into the on state on the basis of the control signal SL applied to the control line SLL, whereby the image pixel PE is electrically coupled to the signal line SGL. Since the transistor 18 is coupled to the current source 61 of the reading section 50, the transistor 18 operates as a so-called source follower. Further, the gate voltage VG of the reset transistor 16 is set to the middle-level voltage VM on the basis of the control signal RST applied to the control line RSTL. This causes the reset transistor 16 to be in the intermediate state between the on state and the off state. As a result, the electrons generated at the photodiode 14 of the image pixel PE are stored inside the photodiode 14, and some of the electrons stored inside the photodiode 14 are discharged via the reset transistor 16. Then, the output section 17 outputs a voltage corresponding to the voltage of the cathode of the photodiode 14 to the signal line SGL as the pixel signal SIG.

The scanner 42E sequentially drives the plurality of image pixels PE on a per-pixel line-basis on a basis of an instruction from the imaging controller 45. Specifically, the scanner 42E applies the control signal RST to the plurality of control lines RSTL, and applies the control signal SL to the plurality of control lines SLL, thereby sequentially driving the plurality of image pixels PE on a per-pixel line-basis.

FIG. 19 illustrates an operation of the image pixel PE and corresponds to FIG. 9 according to the above embodiment. The photodiode 14 performs photoelectric conversion on the basis of both the background light LB and the reflected light pulse L2. The electrons generated by the photoelectric conversion are stored in the photodiode 14. At this time, since the reset transistor 16 is in the intermediate state between the on state and the off state, some of the electrons stored in the photodiode 14 are discharged via the reset transistor 16.

In the image pixel P according to the above embodiment and the image pixel PE according to the present modification example, the output section 17 includes two transistors 18 and 19, but the present disclosure is not limited thereto. Alternatively, for example, the transistor 19 may be omitted. In this case, it is desirable to selectively apply the voltage VDD or the voltage VSS to the drain of the reset transistor 16. In a case where the voltage VDD is applied to the drain of the reset transistor 16, the image pixel is able to output the pixel signal SIG in the similar manner as in the above-described embodiment and the like. In a case where the voltage VSS is applied to the drain of the reset transistor 16, it is possible to turn the transistor 18 into the off state by turning the reset transistor 16 into the on state.

Modification Example 1-5

In the above embodiment, the difference circuit 64 is configured by the circuit illustrated in FIG. 6, but the present disclosure is not limited thereto. Alternatively, various configurations may be used that utilize the principles of correlated double sampling (CDS).

Specifically, for example, a difference circuit 64F illustrated in FIG. 20A may be used. The difference circuit 64F includes sample-hold circuits 101 and 102, and the subtracting circuit 66. The sample-hold circuit 101 includes a switch 101A and a capacitive element 101B, and the sample-hold circuit 102 includes a switch 102A and a capacitive element 102B. The switches 101A and 102A are turned into the on state at timings different from each other by a predetermined time period. With this configuration, the difference circuit 64F is able to generate the signal DIF by detecting a difference between signal values at two timings apart from each other by the predetermined time period in the signal S63.

Further, for example, a difference circuit 64G illustrated in FIG. 20B may be used. The difference circuit 64G includes low-pass filters (LPFs) 103 and 104. The low-pass filters (LPFs) 103 and 104 may each include, for example, a resistor and a capacitive element. A time constant of the low-pass filter 104 is set to a value longer than a time constant of the low-pass filter 103. As a result, a phase of the output signal of the low-pass filter (LPF) 104 lags behind a phase of the output signal of the low-pass filter (LPF) 103. Thus, the difference circuit 64G is able to generate the signal DIF by detecting a difference between signal values at two timings apart from each other by a predetermined time period in the signal S63.

In the difference circuit 64G, it is possible to realize a simple configuration as compared with the difference circuit 64F (FIG. 20A) in which the switches 101A and 102A are to be turned on and off. Further, in the difference circuit 64G, noises are reduced by the low-pass filters (LPFs) 103 and 104. It is to be noted that, in this example, although two low-pass filters (LPFs) 103 and 104 are provided, the present disclosure is not limited thereto, and for example, the low-pass filter (LPF) 103 may be omitted.

Modification Example 1-6

Although the difference circuit 64 is used in the above embodiment, the present disclosure is not limited thereto.

Instead, a differentiator (Highpass Filter Circuit) 64H illustrated in FIG. 21A or a differentiator 64I illustrated in FIG. 21B may be used. The differentiator 64H is a passive type differentiator using a resistor and a capacitive element, and the differentiator 64I is an active type differentiator using a resistor, a capacitive element, and an operational amplifier. The differentiators 64H and 64I each output a result of differentiating the signal S63 as the signal DIF.

Modification Example 1-7

In the above embodiment, the light pulse L1 having a long pulse width Tpw is used, but the present disclosure is not limited thereto. Hereinafter, a distance measurement device 1J according to the present modification example will be described in detail.

The distance measurement device 1J has a short measurable distance (e.g., about 3 m). In a similar manner to the distance measurement device 1 (FIG. 1) according to the above embodiment, the distance measurement device 1J includes the light source 20, a light source controller 30J, the lens 11, the imaging section 40, and the controller 12.

The light source controller 30J controls the operation of the light source 20 on the basis of an instruction from the controller 12. In a similar manner to the light source controller 30 (FIG. 2) according to the above embodiment, the light source controller 30J includes a control signal generator 31J, the driver 32, the current source 33, and the switch 34. The control signal generator 31J generates the control signals S1 and S3 such that the light source 20 emits the light pulse L1 having a short pulse width Tpw.

FIG. 22 illustrates an operation example of the light source 20 and a light source controller 30J. In this example, the control signal generator 31J generates the control signal S1 in a form of a triangular waveform. At timing t51, the control signal generator 31J changes the control signal S3 from the low level to the high level (FIG. 22(B)). As a result, the switch 34 changes from the off state to the on state. Next, at the time period from timing t52 to timing t53, the control signal generator 31J gradually changes the control signal S1 from the low level to the high level (FIG. 22(A)). The driver 32 drives the current source 33 on the basis of the control signal S1. As a result, the light emitting diode (LED) 21 starts emitting light and gradually increases the light intensity (FIG. 22(C)). Next, at timing t53, the control signal generator 31J changes the control signal S3 from the high level to the low level (FIG. 22(B)). As a result, the switch 34 changes from the on state to the off state. Then the light emitting diode (LED) 21 stops emitting light (FIG. 22(C)). Next, in the time period from timing t53 to timing t54, the control signal generator 31J gradually changes the control signal S1 from the high level to the low level (FIG. 22(A)).

FIG. 23 illustrates another operation example of the light source 20 and the light source controller 30J. In this example, the control signal generator 31J generates the control signal S1 in a form of a rectangular waveform. At timing t61, the control signal generator 31J changes the control signal S3 from the low level to the high level (FIG. 23(B)). As a result, the switch 34 changes from the off state to the on state. Next, at timing t62, the control signal generator 31J changes the control signal S1 from the low level to the high level (FIG. 23(A)). The driver 32 drives the current source 33 on the basis of the control signal S1. As illustrated in FIG. 23(A), the control signal S2 supplied to the current source 33 becomes a dull signal due to loading and rises slightly slowly. The current source 33 causes a current to flow in response to the control signal S2. As a result, the light emitting diode (LED) 21 starts emitting light (FIG. 23(C)). Next, at timing t63, the control signal generator 31J changes the control signal S3 from the high level to the low level (FIG. 23(B)). As a result, the switch 34 changes from the on state to the off state. Then, the light emitting diode (LED) 21 stops emitting light (FIG. 23(C)). Next, at timing t64, the control signal generator 31J changes the control signal S1 from the high level to the low level (FIG. 23(A)). The driver 32 drives the current source 33 on the basis of the control signal S1. The control signal S2 supplied to the current source 33 becomes a dull signal due to loading and falls slightly slowly.

In this way, the light source 20 emits the light pulse L1 having a short pulse width Tpw (FIGS. 22(C) and 23(C)) towards the measurement object. Also in the distance measurement device 1J, by turning off the switch 34, the change of the light intensity in the posterior end (waveform part WL1) of the light pulse L1 is made steep.

FIG. 24 illustrates an operation example of the distance measurement device 1J. The example illustrates an operation in a case where the measurement range R is set to about 3 m. In a case where the distance D between the distance measurement device 1J and the measurement object is 3 m, the time from the light emitted from the light source 20 is reflected by the measurement object to the light is received by the imaging section 40 is about 20 nsec. Further, in this example, the cycle Tclk of clock signal CLK is set to 200 psec. In this case, the measurement resolution of a case where the distance D between the distance measurement device 1J and the measurement object is 3 m is set to 1/100 (=200 psec/20 nsec).

In the time period prior to the timing t72, the amount of electrons supplied from the photodiode 14 to the floating diffusion FD according to the background light LB is balanced with the amount of electrons discharged from the floating diffusion FD. As a result, the voltage of the pixel signal SIG is maintained at voltage V2 (FIG. 24(E)).

Next, at timing t72, the light source 20 starts emitting light, and the light intensity gradually increases in the time period from timing t72 to timing t73 (FIG. 24(A)). Then, at timing t73, the light source 20 stops emitting light. As a result, the light pulse L1 is generated in the time period from timing t72 to timing t73. The pulse width Tpw of the light pulse L1 is, in this example, 2 nsec.

At timing t73 corresponding to the posterior end (waveform part WL1) of the light pulse L1, the time counter 69 starts the count operation (FIG. 24(I)).

Then, in this example, at timing t74, the reflected light pulse L2 corresponding to the light pulse L1 reaches the imaging section 40 (FIG. 24(B)).

In response to the reflected light pulse L2, the voltage of the pixel signal SIG decreases from voltage V2 in the time period from timing t74 to timing t75 (FIG. 24(E)). The amplifier 63 of the reading circuit 60 amplifies the pixel signal SIG. The difference circuit 64 generates the signal DIF on the basis of the signal S63 outputted from the amplifier 63 (FIG. 24(F)).

Then, at timing t75, when the reflected light pulse L2 terminates, the voltage of the pixel signal SIG rises and returns to voltage V2 (FIG. 24(E)). In response to the change of the voltage of the pixel signal SIG, the voltage of the signal DIF outputted from the difference circuit 64 rises once, exceeds the threshold voltage Vth, and then falls (FIG. 24(F)). In response, the comparator 67 changes the signal COMP (FIG. 24(G)). The latch circuit 68 changes the signal STOP from the low level to the high level on the basis of the rising edge of the signal COMP (FIG. 24(H)).

Then, at timing t75 corresponding to the posterior end (waveform part WL2) of the reflected light pulse L2, the time counter 69 terminates the count operation of the clock signal CLK on the basis of the signal STOP (FIG. 24(I)). The time counter 69 supplies the count value CNT to the signal output section 51 at and after timing t75.

As described above, in the distance measurement device 1J, by using the light pulse L1 having a short pulse width Tpw, for example, it is possible to measure a short distance D while reducing power consumption.

Other Modification Examples

In the above embodiment, the image pixel P is arranged in the form of matrices in the plane, but the present disclosure is not limited thereto. Alternatively, a so-called line sensor may be configured by arranging image pixels P in one row, for example. Further, for example, a single image pixel P may be provided.

The photodiode 14 of the image pixel P may be, for example, an avalanche photodiode. Further, for example, the amplifier 63 may be omitted in the reading circuit 60.

In addition, two or more of the above modification examples may be combined.

2. Second Embodiment

Next, a distance measurement device 2 according to a second embodiment will be described. In the present embodiment, the measurable distance is extended by storing more electrons in the floating diffusion FD. Note that the components substantially the same as those of the distance measurement device 1 according to the first embodiment are denoted by the same reference numerals, and descriptions thereof are omitted as appropriate.

In a similar manner to the distance measurement device 1 (FIG. 1) according to the first embodiment, the distance measurement device 2 includes the light source 20, the light source controller 30, the lens 11, an imaging section 70, and the controller 12. In a similar manner to the imaging section 40 according to the first embodiment, the imaging section 70 includes the pixel array 41, a scanner 72, the reading section 50, the image generator 44, and the imaging controller 45.

The scanner 72 sequentially drives the plurality of image pixels P on a per-pixel line-basis on the basis of an instruction from the imaging controller 45. The scanner 72 alternates the voltage of the control signal RST between the middle-level voltage VM and the low level voltage VL in the time period corresponding to the second half of the measurement range R.

FIG. 25 illustrates an operation example of the distance measurement device 2, where (A) indicates a waveform of light to be emitted from the light source 20, (B) indicates a waveform of reflected light to be received by the imaging section 70, (C) indicates a waveform of the control signal TG, (D) indicates a waveform of the control signal RST to be generated by the scanner 42, (E) indicates a waveform of the gate voltage VG of the reset transistor 16, (F) indicates a waveform of the pixel signal SIG, (G) indicates a waveform of the signal DIF to be outputted from the difference circuit 64, (H) indicates a waveform of the signal COMP to be outputted from the comparator 67, (I) indicates a waveform of the signal STOP to be outputted from the latch circuit 68, and (J) indicates an operation of the time counter 69.

This example illustrates an operation in a case where a measurement range R is set to about 300 m. In a case where the distance D between the distance measurement device 2 and the measurement object is 300 m, the time from the light emitted from the light source 20 is reflected by the measurement object to the light is received by the imaging section 40 is about 2000 nsec. In this example, the cycle Tclk of the clock signal CLK is set to 20 nsec. In this case, the measurement resolution of a case where the distance D between the distance measurement device 2 and the measurement object is 300 m is set to 1/100 (=20 nsec/2000 nsec).

In the time period prior to timing t82, the amount of electrons supplied from the photodiode 14 to the floating diffusion FD according to the background light LB is balanced with the amount of electrons discharged from the floating diffusion FD. As a result, the voltage of the pixel signal SIG is maintained at voltage V2 (FIG. 25(F)).

Next, at timing t82, the light source 20 starts emitting light, and at timing t84, the light source 20 stops emitting light (FIG. 25(A)). As a result, the light pulse L1 is generated in the time period from timing t82 to timing t84. The pulse width Tpw of the light pulse L1 is 2000 nsec in this example. Further, at timing t84 corresponding to the posterior end (waveform part WL1) of the light pulse L1, the time counter 69 starts the count operation (FIG. 25(J)).

In this example, at timing t83 prior to the light source 20 stopping the light emission, the reflected light pulse L2 corresponding to the light pulse L1 reaches the imaging section 70 (FIG. 25(B)).

In response to the reflected light pulse L2, in the time period from timing t83 to t86, the voltage of pixel signal SIG decreases from voltage V2 (FIG. 25F). The amplifier 63 of the reading circuit 60 amplifies the pixel signal SIG. Then, the difference circuit 64 generates the signal DIF on the basis of the signal S63 outputted from the amplifier 63 (FIG. 25(G)).

Further, in the scanner 72 of the imaging section 70, in the time period from timing t85 to timing t87, the voltage of the control signal RST regarding the image pixel P is alternated between the middle-level voltage VM and the low level voltage VL (FIG. 25(D)). The alternating cycle may be set to, for example, 20 nsec. as in the cycle Tclk of clock signal CLK. This causes the gate voltage VG of the reset transistor 16 to alternate between the middle-level voltage VM and the low level voltage VL with a slight slowing down (FIG. 25(E)). Here, timing t85 is the timing at which the distance D between distance measurement device 2 and measurement object corresponds to 150 m, and timing t87 is the timing at which the distance D between distance measurement device 2 and measurement object corresponds to 300 m. That is, the scanner 72 alternates the voltage of the control signal RST between the middle-level voltage VM and the low level voltage VL in the time period corresponding to the second half of the measurement range R.

Thus, in the floating diffusion FD of the image pixel P; electrons are stored when the gate voltage VG of the reset transistor 16 comes near the low level voltage VL; and electrons are stored and electrons are discharged when the gate voltage VG of the reset transistor 16 comes near the middle-level voltage VM. As a result, since more electrons are stored in the floating diffusion FD than when the gate voltage VG of the reset transistor 16 is maintained at the middle-level voltage VM, the voltage of the pixel signal SIG drops further in the time period at and after timing t85.

Then, at timing t86, when the reflected light pulse L2 terminates, the voltage of the pixel signal SIG rises and returns to voltage V2 (FIG. 25(F)). In response to the change in the voltage of the pixel signal SIG, the voltage of the signal DIF outputted from the difference circuit 64 rises once, exceeds the threshold voltage Vth G, and then falls (FIG. 25(G)). In response to this, the comparator 67 changes the signal COMP (FIG. 25(H)). The latch circuit 68 changes the signal STOP from the low level to the high level on the basis of the rising edge of the signal COMP, (FIG. 25(I)).

Then, the time counter 69 terminates the count operation of the clock signal CLK on the basis of the signal STOP at timing t86 corresponding to the posterior end (waveform part WL2) of the reflected light pulse L2 (FIG. 25(J)). The time counter 69 supplies the count value CNT to the signal output section 51 at and after timing t86.

Thus, in the distance measurement device 2, in the time period corresponding to the second half of the measurement range R, the voltage of the control signal RST is alternated between the middle-level voltage VM and the low level voltage VL. As a result, it is possible to increase the electrons stored in the floating diffusion FD. That is, the longer the distance D between the distance measurement device 2 and the measurement object, the lower the light intensity of the reflected light pulse L2, and thus the electrons stored in the floating diffusion FD are decreased. Thus, in distance measurement device 2, the voltage of control signal RST is alternated between the middle-level voltage VM and the low level voltage VL to increase the electrons stored in the floating diffusion FD. As a result, in the distance measurement device 2, it is possible to increase the amount of change of the pixel signal SIG corresponding to the posterior end (waveform part WL2) of the reflected light pulse L2, so that it is possible to increase the measurable distance. For example, by multiplying the quantity of electrons stored in the floating diffusion FD by a factor of 10, the measurable distance can be extended by a factor of 3.16 (the square root of 10).

Further, in the distance measurement device 2, since the alternating cycle of the control signal RST in the second half of the measurement range R is set to the same level as the cycle Tclk of the clock signal CLK, it is possible to suppress the deterioration of the measurement resolution. That is, when the gate voltage VG of the reset transistor 16 comes near the low level voltage VL, electrons are stored in the floating diffusion FD, but the electrons are not discharged from the floating diffusion FD. Therefore, when the gate voltage VG of the reset transistor 16 comes near the low level voltage VL at the timing at which the reflected light pulse L2 terminates, the amount of change of the pixel signal SIG is small, so that the signal DIF hardly exceeds the threshold voltage Vth. Thereafter, when the gate voltage VG of the reset transistor 16 comes near the high level voltage VH, since electrons are discharged from the floating diffusion FD, the pixel signal SIG changes greatly, and the signal DIF exceeds the threshold voltage Vth. Therefore, by alternating the control signal RST in this manner, the measurement resolution may be aggravated. In the distance measurement device 2, the alternating cycle of control signal RST is made comparable to the cycle Tclk of the clock signal CLK. As a result, in the distance measurement device 2, since it is possible to make the measurement resolution determined by the cycle Tclk of the clock signal CLK and the measurement resolution determined by the alternating cycle of the control signal RST substantially the same, it is possible to suppress the deterioration of the measurement resolution due to the alternating of the control signal RST.

As described above, in the present embodiment, since the voltage of the control signal RST is alternated between the middle-level voltage and the low level voltage, it is possible to increase the measurable distance. Other effects are similar to those of the first embodiment.

Modification Example 2

The modification examples of the first embodiment may be applied to the distance measurement device 2 according to the above embodiment.

3. Third Embodiment

Next, a distance measurement device 3 according to a third embodiment will be described. In the present embodiment, the electrons are not discharged from the floating diffusion FD. Note that the components substantially the same as those of the distance measurement device 1 according to the first embodiment are denoted by the same reference numerals, and descriptions thereof are omitted as appropriate.

In a similar manner to the distance measurement device 1 (FIG. 1) according to the first embodiment, the distance measurement device 3 includes the light source 20, the light source controller 30, the lens 11, an imaging section 80, and the controller 12. In a similar manner to the imaging section 40 according to the first embodiment, the imaging section 80 includes the pixel array 41, a scanner 82, the reading section 50, the image generator 44, and the imaging controller 45.

The scanner 82 sequentially drives the plurality of image pixels P on a per-pixel line-basis on the basis of an instruction from the imaging controller 45. The scanner 82 applies the control signal RST having the high level voltage VH or the low level voltage VL to the plurality of control lines RSTL.

FIG. 26 illustrates an operation example of the distance measurement device 3, where (A) indicates a waveform of light to be emitted from the light source 20, (B) indicates a waveform of reflected light to be received by the imaging section 80, (C) indicates a waveform of the control signal TG, (D) indicates a waveform of the control signal RST, (E) indicates a waveform of the pixel signal SIG, (F) indicates a waveform of the signal DIF to be outputted from the difference circuit 64, (G) indicates a waveform of the signal COMP to be outputted from the comparator 67, (H) indicates a waveform of the signal STOP to be outputted from the latch circuit 68, and (I) indicates an operation of the time counter 69.

This example illustrates an operation in a case where a measurement range R is set to about 30 m. In a case where the distance D between the distance measurement device 3 and the measurement object is 30 m, the time from the light emitted from the light source 20 is reflected by the measurement object to the light is received by the imaging section 40 is about 200 nsec. In this example, the cycle Tclk of the clock signal CLK is set to 2 nsec. In this case, the measurement resolution of a case where the distance D between the distance measurement device 3 and the measurement object is 30 m is set to 1/100 (=2 nsec/200 nsec).

First, at timing t91, the scanner 82 of the imaging section 80 changes the voltage of the control signal RST regarding the image pixel P from the high level voltage VH to the low level voltage VL (FIG. 26(D)). Thus, the reset transistor 16 of the image pixel P turns into the off state. As the voltage of the control signal RST changes, the voltage of the pixel signal SIG slightly drops and becomes voltage V3 (FIG. 26(E)). Then, the voltage of the pixel signal SIG gradually decreases from voltage V3 at and after timing t91. That is, the photodiode 14 generates electrons by performing photoelectric conversion on the basis of the background light LB, and the electrons are stored in the floating diffusion FD, so that the voltage of the pixel signal SIG gradually decreases.

Note that, in this example, the voltage of the control signal RST is set to the low level voltage VL before the light source 20 starts emitting the light pulse L1, but the present disclosure is not limited thereto. Alternatively, for example, the voltage of the control signal RST may be set to the low level voltage VL after the light source 20 starts emitting the light pulse L1, as described below.

Next, at timing t92, the light source 20 starts emitting light, and at timing t93, the light source 20 stops emitting light (FIG. 26(A)). As a result, the light pulse L1 is generated in the time period from timing t92 to timing t93. The pulse width Tpw of this light pulse L1 is 200 nsec in this example. At timing t93 corresponding to the posterior end (waveform part WL1) of the light pulse L1, the time counter 69 starts the count operation (FIG. 26(I)).

Then, in this example, at timing t94, the reflected light pulse L2 corresponding to the light pulse L1 reaches the imaging section 80 (FIG. 26(B)).

In response to the reflected light pulse L2, in the time period from timing t94 to timing t96, the voltage of the pixel signal SIG is further reduced by a larger degree of change (FIG. 26(E)). The amplifier 63 of the reading circuit 60 amplifies the pixel signal SIG. Then, the difference circuit 64 generates the signal DIF on the basis of the signal S63 outputted from the amplifier 63 (FIG. 26(F)).

FIG. 27 illustrates the operation of the image pixel P between timings t94 and t96, where (A) indicates the coupling of the photodiode 14, the reading transistor 15, the floating diffusion FD, and the reset transistor 16, and (B) indicates the electric potentials at the respective elements. Between timings t94 and t96, the photodiode 14 performs photoelectric conversion on the basis of both the background light LB and the reflected light pulse L2. The electrons generated by the photoelectric conversion is stored in the floating diffusion FD. At this time, since the reset transistor 16 is in the off state, the electrons stored in the floating diffusion FD are not discharged via the reset transistor 16, unlike the case of the distance measurement device 1 according to the first embodiment, for example. As a result, the voltage of the pixel signal SIG continues to drop, because the electrons continue to be stored in the floating diffusion FD.

Then, at timing t96, when the reflected light pulse L2 terminates, the degree of change of the voltage of the pixel signal SIG decreases (FIG. 26(E)). In other words, since the reflected light pulse L2 is terminated at and after timing t96, electrons are stored in the floating diffusion FD only by the background light LB; therefore, the degree of change of the voltage of the pixel signal SIG becomes small.

In response to the change in the voltage of the pixel signal SIG, the voltage of the signal DIF outputted from the difference circuit 64 rises once, exceeds the threshold voltage Vth, and then falls (FIG. 26(F)). In response, the comparator 67 changes the signal COMP (FIG. 26(G)). The latch circuit 68 changes the signal STOP from the low level to the high level on the basis of the rising edge of the signal COMP (FIG. 26(H)). That is, the change timing of the signal STOP corresponds to the timing of the posterior end (waveform part WL2) of the reflected light pulse L2.

Then, the time counter 69 terminates the count operation of the clock signal CLK on the basis of the signal STOP (FIG. 26(I)). The time counter 69 supplies the count value CNT to the signal output section 51 at and after timing t96.

FIG. 28 illustrates an operation example of the distance measurement device 3 where the distance D between the distance measurement device 3 and the measurement object varies, where (A) indicates a waveform of light to be emitted from the light source 20, (B) indicates waveforms of reflected light to be received by the imaging section 80, (C) indicates a waveform of the control signal RST, (D) indicates waveforms of the pixel signals SIG, (E) indicates an operation of the time counter 69. Here, FIG. 28(E) illustrates a time period in which the time counter 69 is able to perform the count operation. In this example, the voltage of the control signal RST is turned to the low level voltage VL after the light source 20 starts emitting the light pulse L1.

In this example, the measurement range R is set to about 120 m. In this example, the cycle Tclk of the clock signal CLK is set to 8 nsec. Thus, the measurement resolution of a case where the distance D between the distance measurement device 1 and the measurement object is 120 m is set to 1/100 (=8 nsec/800 nsec).

As illustrated in FIG. 28(B), the timing at which the reflected light pulse L2 reaches the imaging section 80 changes in accordance with the distance D between the distance measurement device 3 and the measurement object. The time counter 69 starts the count operation at timing t1 corresponding to the posterior end of the light pulse L1, and stops the count operation on the basis of the changes of the pixel signals SIG at timings ta, tb, tc, and td corresponding to the posterior ends of the reflected light pulses L2. Thus, the reading circuit 60 measures the time interval from the time the light source 20 emits the light pulse L1 to the time the image pixel P receives the reflected light pulse L2.

As described above, even when the control signal RST is set to the low level voltage VL and the electrons are not discharged from the floating diffusion FD, it is possible to measure the distance D between the distance measurement device 3 and the measurement object.

Modification Example 3-1

In the above embodiment, the light pulse L1 having a long pulse width Tpw is used, but the present disclosure is not limited thereto. Hereinafter, a distance measurement device 3A according to the present modification example will be described in detail.

The distance measurement device 3A has a short measurable distance (e.g., about 3 m). In a similar manner to the distance measurement device 3 according to the above embodiment, the distance measurement device 3A includes a light source 20A, a light source controller 30A, the lens 11, an imaging section 80A, and the controller 12.

The light source 20A includes a laser device. That is, in this example, the light pulse L1 is a laser beam. The light source controller 30A controls the operation of the light source 20A on the basis of an instruction from the controller 12.

In a similar manner to the imaging section 80 according to the third embodiment, the imaging section 80A includes the pixel array 41, the scanner 82, a reading section 50A, the image generator 44, and the imaging controller 45.

FIG. 29 illustrates a configuration example of the reading section 50A. The reading section 50A includes a plurality of reading circuits 60A. The reading circuit 60A includes a signal change detector 62A. The signal change detector 62A includes a differentiator 64A. As the differentiator 64A, the differentiator 64H illustrated in FIG. 21A or the differentiator 64I illustrated in FIG. 21B may be used.

FIG. 30 illustrates an operation example of the distance measurement device 3A. The example illustrates an operation in a case where the measurement range R is set to about 3 m. In a case where the distance D between the distance measurement device 3A and the measurement object is 3 m, the time from the light emitted from the light source 20 is reflected by the measurement object to the light is received by the imaging section 40 is about 20 nsec. Further, in this example, the cycle Tclk of clock signal CLK is set to 200 psec. In this case, the measurement resolution of a case where the distance D between the distance measurement device 3A and the measurement object is 3 m is set to 1/100 (=200 psec/20 nsec).

First, at timing t101, the scanner 82 of the imaging section 80A changes the voltage of the control signal RST regarding the image pixel P from the high level voltage VH to the low level voltage VL (FIG. 30(D)). As the voltage of the control signal RST changes, the voltage of the pixel signal SIG slightly drops and becomes voltage V3 (FIG. 30(E)). Then, the voltage of the pixel signal SIG gradually decreases from voltage V3 at and after timing t101, due to the effect of the background light LB.

Next, at timing t102, the light source 20A starts emitting light, and the light intensity gradually increases in the time period from timing t102 to timing t103 (FIG. 30(A)). At timing t103, the light source 20A stops emitting light. As a result, the light pulse L1 is generated in the time period from timing t102 to timing t103. The pulse width Tpw of the light pulse L1 is 200 psec or less in this example.

Further, at timing t103 corresponding to the posterior end of the light pulse L1, the time counter 69 starts the count operation (FIG. 30(I)).

In this example, the reflected light pulse L2 corresponding to the light pulse L1 reaches the imaging section 80 at timing t104 (FIG. 30(B)).

In response to the reflected light pulse L2, in the time period from timing t104 to timing t105, the voltage of the pixel signal SIG is further reduced with a greater degree of change (FIG. 30(E)). The amplifier 63 of the reading circuit 60A amplifies the pixel signal SIG. Then, the differentiator 64A generates the signal DIF on the basis of the signal S63 outputted from the amplifier 63 (FIG. 30(F)).

Then, at timing t105, when the reflected light pulse L2 terminates, the degree of change of the voltage of the pixel signal SIG decreases (FIG. 30(E)). In response to the change in the voltage of the pixel signal SIG, the voltage of the signal DIF outputted from the differentiator 64A drops once and then rises, exceeds the threshold voltage Vth, and then falls (FIG. 30(F)). In response, the comparator 67 changes the signal COMP (FIG. 30(G)). The latch circuit 68 changes the signal STOP from the low level to the high level on the basis of the rising edge of the signal COMP (FIG. 30(H)). That is, the change timing of the signal STOP corresponds to the posterior end timing of the reflected light pulse L2.

Then, the time counter 69 terminates the count operation of the clock signal CLK on the basis of the signal STOP at timing t105 (FIG. 30(D)). The time counter 69 supplies the count value CNT to the signal output section 51 at and after timing t105.

As described above, in the distance measurement device 3A, since the light source 20A includes the laser device, it is possible to decrease the pulse width Tpw of the light pulse L1 and to increase the light intensity of the light pulse L1. This makes it possible to increase the measurable distance in the distance measurement device 3A. In addition, since the signal electrons are stored in the floating diffusion FD while the light intensity of the light pulse L1 is increased in this manner, it is possible to increase the S/N ratio, which allows the timing of posterior end of the reflected light pulse L2 to be detected easily.

Other Modification Examples

The modification examples of the first embodiment may be applied to the distance measurement device 3 according to the above embodiment.

4. Fourth Embodiment

Next, a distance measurement device 4 according to a fourth embodiment will be described. In the present embodiment, two light pulses are emitted, and the distance D is obtained on the basis of two reflected light pulses corresponding to the two light pulses. Note that the components substantially the same as those of the distance measurement device 1 according to the first embodiment are denoted by the same reference numerals, and descriptions thereof are omitted as appropriate.

FIG. 31 illustrates a configuration example of the distance measurement device 4. The distance measurement device 4 includes a light source 90, a light source controller 100, the lens 11, an imaging section 110, and the controller 12.

The light source 90 emits two light pulses L11 and L12 toward the measurement object, and includes, for example, a light emitting diode. The light pulse L11 is a pulse whose pulse width Tpw1 is short, and the light pulse L12 is a pulse whose pulse width Tpw1 is long. The light source controller 100 controls the operation of the light source 90 on the basis of an instruction from the controller 12.

The lens 11 forms an image on an imaging plane of the imaging section 110. Into the lens 11, two reflected light pulses L21 and L22 respectively corresponding to the two light pulses L11 and L12 enter.

The imaging section 110 acquires the distance image PIC on the basis of an instruction from the controller 12. In a similar manner to the imaging section 40 (FIG. 4) according to the first embodiment, the imaging section 110 includes the pixel array 41, the scanner 42, a reading section 120, the image generator 44, and the imaging controller 45. The reading section 120 has a plurality of reading circuits 130.

With this configuration, in a case where the distance D from the distance measurement device 4 to the measurement object is short, the distance measurement device 4 measures the distance D using the light pulse L11 having the short pulse width Tpw1 and the reflected light pulse L21, and, in the case where the distance D from the distance measurement device 4 to the measurement object is long, the distance measurement device 4 measures the distance D using the light pulse L12 having the long pulse width Tpw2 and the reflected light pulse L22.

Here, the light pulse L11 corresponds to an example of a "first light pulse" according to an embodiment of the present disclosure. The light pulse L12 corresponds to an example of a "second light pulse" according to an embodiment of the present disclosure. The reflected light pulse L21 corresponds to an example of a "first reflected light pulse" according to an embodiment of the present disclosure. The reflected light pulse L22 corresponds to an example of a "second reflected light pulse" according to an embodiment of the present disclosure. The reading controller 52 corresponds to an example of a "clock generator" according to an embodiment of the present disclosure.

FIG. 32 illustrates an operation example of the distance measurement device 4 in a case where the distance D between the distance measurement device 4 and the measurement object varies, where (A) indicates a waveform of light to be emitted from the light source 90, (B) indicates waveforms of reflected light to be received by the imaging section 110, (C) indicates a waveform of the control signal RST, (D) indicates waveforms of the pixel signals SIG, and (E) indicates an operation of the time counter 69. Here, FIG. 32(E) indicates a time period in which it is possible for the time counter 69 to perform the count operation.

In this example, the measurement range R is set to about 120 m. The measurement range R includes a measurement range R1 for short distances from 0 m to 15 m and a measurement range R2 for long distances from 15 m to 120 m. The measurement range R1 for short distances is a range in which the distance D is measured using the light pulse L11 having the short pulse width Tpw1 and the reflected light pulse L21, and the measurement range R2 for long distances is a range in which the distance D is measured using the light pulse L12 having the long pulse width Tpw2 and the reflected light pulse L22.

In the measurement range R1 for short distances, the cycle Tclk of the clock signal CLK is set to 1 nsec, and, in the measurement range R2 for long distances, the cycle Tclk of the clock signal CLK is set to 8 nsec. Thus, for example, the measurement resolution of a case where the distance D between the distance measurement device 4 and the measurement object is 15 m is set to 1/100 (=1 nsec/100 nsec), and the measurement resolution of a case where the distance D between the distance measurement device 4 and the measurement object is 120 m is set to 1/100 (=8 nsec/800 nsec).

As illustrated in FIG. 32(A), the light source 90 sequentially emits the light pulse L11 and the light pulse L12 in this order. In this example, the pulse width Tpw1 of the light pulse L11 is 2 nsec and the pulse width Tpw2 of the light pulse L12 is 200 nsec. Then, as illustrated in FIG. 32(B), the imaging section 110 successively receives the reflected light pulse L21 and the reflected light pulse L22. Depending on the distance D between the distance measurement device 4 and the measurement object, the timings at which the reflected light pulses L21 and L22 reaches the imaging section 110 vary.

The time counter 69 starts the count operation at timing t111 corresponding to the posterior end of the light pulse L11. The cycle Tclk of the clock signal CLK at this time is 1 nsec. In a case where the distance D between the distance measurement device 4 and the measurement object is less than or equal to 15 m, the time counter 69 stops the count operation on the basis of the change in the pixel signal SIG at a timing corresponding to the posterior end of the reflected light pulse L21 (timings to and tb in this example). The specific operation is similar to the operation of the distance measurement device 1J (FIG. 24). Thus, the reading circuit 130 measures the time interval from the posterior end timing of the light pulse L11 emitted by the light source 90 to the posterior end timing of the reflected light pulse L21 received by the image pixel P.

In a case where the distance D between the distance measurement device 4 and the measurement object is more than 15 m, the reflected light pulse L21 does not reach the imaging section 110 at timing t112, which is 100 nsec later than timing t111. Therefore, the time counter 69 temporarily stops the count operation at timing t112. At this time, the count value CNT is 100. The time counter 69 then resumes the count operation at timing t114, which is 100 nsec later than timing t113 corresponding to the posterior end of the light pulse L12. That is, the count value CNT is counted up from 100. The cycle Tclk of the clock signal CLK at this time is 8 nsec. Then, the time counter 69 stops the count operation on the basis of the change of the pixel signal SIG at a timing corresponding to the posterior end of the reflected light pulse L22 (timings tc and td in this example). The specific operation is similar to the operation of the distance measurement device 1 (FIG. 7). For example, in a case where the distance D between the distance measurement device 4 and the measurement object is 120 m, the count value CNT is 188. In this way, the reading circuit 130 measures the time interval from timing t114, which is 100 nsec later than the posterior end timing of the light pulse L12 emitted by the light source 90 to the posterior end timing of the reflected light pulse L22 received by the image pixel P. Since the length of the time period from timing t113 to timing t114 is known (100 nsec in this instance), it is possible that the reading circuit 130 equivalently measure the time interval from the posterior end timing of the light pulse L12 emitted by the light source 90 to the posterior end timing of the reflected light pulse L22 received by the image pixel P.

Thus, in distance measurement device 4, the measurement range R is divided into the measurement range R1 for short distances and the measurement range R2 for long distances. Then, in the measurement range R1 for short distances, the distance D is measured by using the light pulse L11 having the short pulse width Tpw1 and the reflected light pulse L21, and in the measurement range R2 for long distances, the distance D is measured by using the light pulse L12 having the long pulse width Tpw2 and the reflected light pulse L22. Further, the cycle Tclk of the clock signal CLK at the time of performing the measurement in the measurement range R2 for long distances is made longer than the cycle Tclk of the clock signal CLK at the time of performing the measurement in the measurement range R1 for short distances.

Accordingly, in the distance measurement device 4, it is possible to increase the measurement resolution in a case where the distance D is short, as compared with a case where the cycle Tclk of the clock signal CLK is constant in the whole range of the measurement range R, for example. Further, for example, in a case where the distance D is long (e.g., 120 m), it is possible to suppress the count value CNT of the time counter 69 to a low value, which enables to suppress the circuit size of the time counter 69. In addition, in the case where the distance D is long, it is possible to lower a frequency of the clock signal CLK, which enables to reduce the power consumption.

Other Modification Examples

In the above embodiment, the measurement range R is divided into the measurement range R1 for short distances and the measurement range R2 for long distances, but the present disclosure is not limited thereto, and instead, the measurement range R may be divided into, for example, three or more measurement ranges.

The modification examples of the first embodiment may be applied to the distance measurement device 4 according to the above embodiment.

5. Fifth Embodiment

Next, a distance measurement device 5 according to a fifth embodiment will be described. In the present embodiment, two light pulses are respectively emitted two light sources. Note that the components substantially the same as those of the distance measurement device 4 according to the fourth embodiment are denoted by the same reference numerals, and descriptions thereof are omitted as appropriate.

FIG. 33 illustrates a configuration example of the distance measurement device 5. The distance measurement device 5 includes the light sources 20A and 20, a light source controller 140, the lens 11, an imaging section 150, and the controller 12.

The light source 20A emits the light pulse L11 toward the measurement object, and includes a laser device. The light source 20 emits the light pulse L12 toward the measurement object, and includes a light emitting diode. The light pulse L11 is a pulse with a short pulse width Tpw1, and the light pulse L12 is a pulse with a long pulse width Tpw2. The light source controller 140 controls the operations of the light sources 20A and 20 on the basis of an instruction from the controller 12.

The lens 11 forms an image on an imaging plane of the imaging section 150. Into the lens 11, two reflected light pulses L21 and L22 respectively corresponding to the two light pulses L11 and L12 enter.

The imaging section 150 acquires the distance image PIC on the basis of an instruction from the controller 12. In a similar manner to the imaging section 40 (FIG. 4) according to the first embodiment, the imaging section 150 includes the pixel array 41, the scanner 42, a reading section 160, the image generator 44, and the imaging controller 45. The reading section 160 includes a plurality of reading circuits 170.

With this configuration, in a case where the distance D from the distance measurement device 5 to the measurement object is short, the distance measurement device 5 measures the distance D using the light pulse L11 having the short pulse width Tpw1 and the reflected light pulse L21, and, in the case where the distance D from the distance measurement device 5 to the measurement object is long, the distance measurement device 5 measures the distance D using the light pulse L12 having the long pulse width Tpw2 and the reflected light pulse L22.

FIG. 34 illustrates an operation example of the distance measurement device 5 in a case where the distance D between the distance measurement device 5 and the measurement object varies, where (A) indicates a waveform of light to be emitted from the light source 20A, (B) indicates a waveform of light to be emitted from the light source 20, (C) indicates waveforms of reflected light to be received by the imaging section 150, (D) indicates a waveform of the control signal RST, (E) waveforms of the pixel signals SIG, and (F) indicates an operation of the time counter 69. Here, FIG. 34(F) indicates a time period in which it is possible for the time counter 69 to perform the count operation.

In this example, the measurement range R is set to about 120 m. The measurement range R includes a measurement range R1 for short distances from 0 m to 15 m and a measurement range R2 for long distances from 15 m to 120 m. The measurement range R1 for short distances is a range in which the distance D is measured using the light pulse L11 having the short pulse width Tpw1 and the reflected light pulse L21, and the measurement range R2 for long distances is a range in which the distance D is measured using the light pulse L12 having the long pulse width Tpw2 and the reflected light pulse L22.

In the measurement range R1 for short distances, the cycle Tclk of the clock signal CLK is set to 200 psec, and, in the measurement range R2 for long distances, the cycle Tclk of the clock signal CLK is set to 8 nsec. Thus, for example, the measurement resolution of a case where the distance D between the distance measurement device 5 and the measurement object is 15 m is set to 1/500 (=200 psec/100 nsec), and the measurement resolution of a case where the distance D between the distance measurement device 5 and the measurement object is 120 m is set to 1/100 (=8 nsec/800 nsec).

As illustrated in FIGS. 34(A) and (B), first, the light source 20A emits the light pulse L11, and then the light source 20 emits the light pulse L12. In this example, the pulse width Tpw1 of the light pulse L11 is 200 psec and the pulse width Tpw2 of the light pulse L12 is 700 nsec. Then, as illustrated in FIG. 34(C), the imaging section 150 successively receives the reflected light pulse L21 and the reflected light pulse L22. Depending on the distance D between the distance measurement device 5 and the measurement object, the timings at which the reflected light pulses L21 and L22 reaches the imaging section 150 vary.

The time counter 69 starts the count operation at timing t111 corresponding to the posterior end of the light pulse L11. The cycle Tclk of the clock signal CLK at this time is 200 psec. In a case where the distance D between the distance measurement device 5 and the measurement object is less than or equal to 15 m, the time counter 69 stops the count operation on the basis of the change in the pixel signal SIG at a timing corresponding to the posterior end of the reflected light pulse L21 (timings to and tb in this example). The specific operation is similar to the operation of the distance measurement device 3A (FIG. 30). Thus, the reading circuit 170 measures the time interval from the posterior end timing of the light pulse L11 emitted by the light source 20A to the posterior end timing of the reflected light pulse L21 received by the image pixel P.

In a case where the distance D between the distance measurement device 5 and the measurement object is more than 15 m, the reflected light pulse L21 does not reach the imaging section 150 at timing t122, which is 100 nsec later than timing t121. Therefore, the time counter 69 temporarily stops the count operation at timing t122. At this time, the count value CNT is 500. Then, in the time period from timing t123 to timing t124, the imaging section 150 sets the control signal RST to the high level voltage VH and then to the middle-level voltage VM. The time counter 69 then resumes the count operation at timing t126, which is 100 nsec later than timing t125 corresponding to the posterior end of the light pulse L12. That is, the count value CNT is counted up from 500. The cycle Tclk of the clock signal CLK at this time is 8 nsec. Then, the time counter 69 stops the count operation on the basis of the change of the pixel signal SIG at a timing corresponding to the posterior end of the reflected light pulse L22 (timings tc and td in this example). The specific operation is similar to the operation of the distance measurement device 1 (FIG. 7). For example, in a case where the distance D between the distance measurement device 5 and the measurement object is 120 m, the count value CNT is 588. In this way, the reading circuit 170 measures the time interval from timing 100 nsec later than the posterior end timing of the light pulse L12 emitted by the light source 20 to the posterior end timing of the reflected light pulse L22 received by the image pixel P. Since the length of the time period from timing t125 to timing t126 is known (100 nsec in this instance), it is possible that the reading circuit 170 equivalently measure the time interval from the posterior end timing of the light pulse L12 emitted by the light source 20 to the posterior end timing of the reflected light pulse L22 received by the image pixel P.

As described above, in the distance measurement device 5, since the light source 20A includes the laser device, it is possible to decrease the pulse width Tpw of the light pulse L1, and to increase the light intensity of the light pulse L1. This makes it possible to increase the measurable distance in the distance measurement device 5. In addition, since it is possible to increase the S/N ratio, it is possible to easily detect the timing of the posterior end of the reflected light pulse L2. Other effects are similar to those of the fourth embodiment.

Other Modification Examples

In the above embodiment, the measurement range R is divided into the measurement range R1 for short distances and the measurement range R2 for long distances, but the present disclosure is not limited thereto, and instead, the measurement range R may be divided into, for example, three or more measurement ranges.

The modification examples of the first embodiment may be applied to the distance measurement device 5 according to the above embodiment.

6. Application Example

Next, an application example of the distance measurement devices described in the above embodiments and the modification examples will be described.

FIG. 35 shows a configuration example of an imaging device 200 to which a technique of the distance measurement device according to the above embodiments or the like is applied. The imaging device 200 is a device to which the technique of the distance measurement device 1 according to the first embodiment is applied. It should be noted that the present disclosure is not limited thereto, and techniques of distance measurement device technologies may be applied.

This imaging device 200 acquires a distance image PIC and a contrast image PIC2 such as a color image. Specifically, the imaging device 200 has two operation modes M (operation modes M1 and M2), and operates in the operation mode M1 to obtain the distance image PIC, and operates in the operation mode M2 to obtain the contrast image PIC2. The imaging device 200 includes a controller 212 and an imaging section 240. The controller 212 controls the operation of the imaging device 200 by supplying a control signal to the light source controller 30 and the imaging section 240 and controlling the operation of those circuits on the basis of the operation mode M of the imaging device 200. In a similar manner to the imaging section 40 (FIG. 4) according to the first embodiment, the imaging section 240 includes the pixel array 41, a scanner 242, a reading section 250, the image generator 44, and an imaging controller 245.

FIG. 36 illustrates a configuration example of the reading section 250. The reading section 250 includes a reading circuit 260, the signal output section 51, and a reading controller 252.

The reading circuit 260 includes the current source 61, the amplifier 63, the difference circuit 64, selectors 261 and 262, the comparator 67, the latch circuit 68, a selector 263, and a counter 69A. The counter 69A functions in a similar manner to the time counter 69 according to the first embodiment in the operation mode M1, and functions as a level counter for performing the count operation in accordance with the signal level in the operation mode M2.

The selector 261 selects one of the signal DIF and the signal S63 on the basis of the mode switching signal MODE, and supplies the selected signal to the positive input terminal of the comparator 67. The selector 261 selects the signal DIF in a case where the mode switching signal MODE is a signal indicating the operation mode M1, and selects the signal S63 in a case where the mode switching signal MODE is a signal indicating the operation mode M2.

The selector 262 selects one of the threshold voltage Vth and the reference signal REF on the basis of the mode switching signal MODE, and supplies the selected signal to the negative input terminal of the comparator 67. The reference signal REF has a so-called ramp waveform in which the voltage level gradually decreases with time in a P-phase time period PP and a D-phase time period PD, which will be described later. The selector 262 selects threshold voltage Vth in a case where the mode switching signal MODE is a signal indicating the operation mode M1, and selects the reference signal REF in a case where the mode switching signal MODE is a signal indicating operation mode M2.

The selector 263 selects one of a signal outputted from the latch circuit 68 and the signal COMP on the basis of the mode switching signal MODE, and supplies the selected signal to the counter 69A as the signal STOP. The selector 263 selects the signal outputted from the latch circuit 68 in a case where the mode switching signal MODE is a signal indicating the operation mode M1, and selects the signal COMP in a case where the mode switching signal MODE is a signal indicating the operation mode M2.

The reading controller 252 controls the read operation in the reading section 250. The reading controller 252 generates the mode switching signal MODE for indicating the operation mode M. Further, the reading controller 252 generates: the threshold voltage Vth, the clock signal CLK, and the signal START in a case where the imaging device 200 operates in the operation mode M1; the reference signal REF, the clock signal CLK, and the signal START in a case where the imaging device 200 operates in the operation mode M2.

Here, the amplifier 63, the difference circuit 64, and the comparator 67 correspond to an example of a "signal change detector" according to an embodiment of the present disclosure. The counter 69A and the reading controller 252 correspond to an example of a "measurement section" according to an embodiment of the present disclosure. The reading controller 252 corresponds to an example of a "clock generator" and a "signal generator" according to an embodiment of the present disclosure. The controller 212 corresponds to an example of a "controller" according to an embodiment of the present disclosure. The operation mode M1 corresponds to an example of a "first operation mode" according to an embodiment of the present disclosure. The operation mode M2 corresponds to an example of a "second operation mode" according to an embodiment of the present disclosure.

In a case where the imaging device 200 operates in the operation mode M1, the imaging device 200 generates the distance image PIC by performing an operation similarly as in the first embodiment (FIG. 7). Further, in a case where the imaging device 200 operates in the operation mode M2, the imaging device 200 generates the contrast image PIC2 by performing the following operation.

FIG. 37 illustrates an operation of the imaging device 200 in a case where the imaging device 200 operates in the operation mode M2, where (A) indicates a waveform of the control signal RST, (B) indicates a waveform of the control signal TG, (C) indicates a waveform of the control signal SL, (D) indicates a waveform of the reference signal REF, (E) indicates a waveform of the pixel signal SIG, (F) indicates a waveform of the signal COMP to be outputted from the comparator 67, and (G) indicates an operation of the counter 69A. Here, in FIGS. 37(D) and (E), the waveforms of the respective signals are indicated by the same voltage axes.

First, at timing t201, when a horizontal time period H starts, the scanner 242 changes the voltage of the control signal SL from the low level to the high level at timing t202 (FIG. 37(C)). In the image pixel P, the transistor 19 is turned into the on state, and the image pixel P is electrically coupled to the signal line SGL.

Next, at timing t203, the scanner 242 changes the voltage of the control signal RST from the low level voltage VL to the high level voltage VH (FIG. 37(A)). In the image pixel P, the reset transistor 16 is turned into the on state, and the voltage of the floating diffusion FD is set to the voltage VDD (reset operation).

Next, at timing t204, the scanner 242 changes the voltage of the control signal RST from the high level voltage VH to the low level voltage VL (FIG. 37(A)). In the image pixel P, the reset transistor 16 is turned into the off state. The image pixel P outputs a voltage (reset voltage Vreset) corresponding to the voltage of the floating diffusion FD at this time at and after timing t204 (FIG. 37(E)).

Next, at timing t205, the reading controller 252 changes the voltage of the reference signal REF to voltage V11 (FIG. 37(D)).

Next, in the time period (P-phase time period PP) from timing t206 to timing t208, the reading section 250 performs AD-conversion on the basis of the reset voltage Vreset. Specifically, first, at timing t206, the counter 69A starts the count operation (FIG. 37(G)). At the same time, the reading controller 252 starts to lower the voltage of the reference signal REF from voltage V11 by a predetermined degree of change (FIG. 37(D)).

Then, at timing t207, the voltage of the reference signal REF is lower than the voltage (reset Vreset) of the pixel signal SIG (FIGS. 37(D) and (E)). In response, the comparator 67 changes the voltage of the signal COMP from the low level to the high level (FIG. 37(F)). As a result, the counter 69A stops the count operation (FIG. 37(G)).

Next, at timing t208, the reading controller 252 stops the change of the voltage of the reference signal REF as the P-phase time period PP ends, and then changes the voltage of the reference signal REF to voltage V12 at timing t209 (FIG. 37(D)). Along with this, since the voltage of the reference signal REF exceeds the voltage (reset voltage Vreset) of the pixel signal SIG (FIGS. 37(D) and (E)), the comparator 67 changes the voltage of the signal COMP from the high level to the low level (FIG. 37(F)). Then, the counter 69A reverses the polarity of the count value CNT of the counter 69A at a predetermined timing.

Next, at timing t211, the scanner 242 changes the voltage of the control signal TG from the low level to the high level (FIG. 37(B)). As a result, in the image pixel P, the reading transistor 15 is turned into the on state, and as a result, the electrons generated in the photodiode 14 are transferred to the floating diffusion FD (charge-transfer operation). In response, the voltage of the pixel signal SIG decreases (FIG. 37(E)).

Then, at timing t212, the scanner 242 changes the voltage of the control signal TG from the high level to the low level (FIG. 37(B)). Accordingly, in the image pixel P, the reading transistor 15 turns into the off state. Then, the image pixel P outputs a voltage (pixel voltage Vpix) corresponding to the voltage of the floating diffusion FD at this time at and after timing t212 (FIG. 37(E)).

Next, in the time period (D-phase time period PD) from timing t213 to timing t215, the reading section 250 performs AD-conversion on the basis of the pixel voltage Vpix. Specifically, first, at timing t213, the counter 69A starts the count operation (FIG. 37(G)). At the same time, the reading controller 252 starts to lower the voltage of the reference signal REF from voltage V12 by a predetermined degree of change (FIG. 37(D)).

Then, at timing t214, the voltage of the reference signal REF is lower than the voltage (pixel voltage Vpix) of the pixel signal SIG (FIGS. 37(D) and (E)). In response, the comparator 67 changes the voltage of the signal COMP from the low level to the high level (FIG. 37(F)). As a result, the counter 69A stops the count operation (FIG. 37(G)). In this manner, the reading circuit 260 obtains a count value CNT corresponding to the difference (signal level) between the pixel voltage Vpix and the reset voltage Vreset.

Next, at timing t215, the reading controller 252 stops the change of the voltage of the reference signal REF as the D-phase time period PD ends, and then changes the voltage of the reference signal REF to voltage V13 at timing t216 (FIG. 37(D)). Along with this, since the voltage of the reference signal REF exceeds the voltage (pixel voltage Vpix) of the pixel signal SIG (FIGS. 37(D) and (E)), the comparator 67 changes the voltage of the signal COMP from the high level to the low level (FIG. 38(F)).

Next, at timing t217, the scanner 242 changes the voltage of the control signal SL from the high level to the low level (FIG. 37(C)). In the image pixel P, the transistor 19 is turned into the off state and the image pixel P is electrically decoupled from the signal line SGL.

In this manner, in the imaging device 200, the contrast image PIC2 corresponding to the signal level is acquired by performing the operation in the operation mode M2.

In the imaging device 200, the imaging device 200 is able to obtain the distance image PIC and the contrast image PIC2 by switching the operation mode M. This makes it possible to reduce the size of the device compared to, for example, a case where a device for acquiring the distance image PIC and a device for acquiring the contrast image PIC2 are separately provided. In addition, in the imaging device 200, since it is possible to acquire the distance image PIC and the contrast image PIC2 by using the same pixel array 41, it is possible to suppress the positional deviation in the distance image PIC and the contrast image PIC2. Thus, for example, in the fields of virtual reality (VR) and augmented reality, it is possible to realize a process with higher accuracy using the distance image PIC and the contrast image PIC2.

Although the present technology has been described with reference to some embodiments and modification examples, and some specific application examples thereof, the present technology is not limited thereto, and various modifications can be made.

For example, by mounting the distance measurement device according to the above-described embodiments on a vehicle and measuring a distance between the vehicle and another vehicle traveling in front of the vehicle, it is possible to realize a function of preventing collisions of the vehicles, for example. Further, the distance measurement device according to the above embodiments may be mounted on a drone to measure a distance between the drone and the ground or a distance between the drone and an obstacle. In addition, the distance measurement device according to the above embodiments may be mounted on a robot that conveys packages.

For example, the measurement range R, the pulse widths of the light pulses L1, L11, and L12, the cycle Tclk of the clock signal CLK, the measurement resolution, and the like in the above embodiments and the like are mere examples, and may be changed as appropriate.

It should be appreciated that the effects described herein are mere examples, and are not limited to those described herein. The present disclosure may further include any effects other than those described herein.

It is to be noted that the present disclosure may have the following configurations.

(1)
A distance sensor including:
a controller that instructs a light source section to emit a first light pulse;
a light receiver that includes a photodiode which causes a signal charge to be generated by receiving a first reflected light pulse corresponding to the first light pulse, and generates a light reception signal by storing the signal charge and converting the signal charge into a voltage;
a signal change detector that performs a first detection operation of detecting a first signal change corresponding to the first reflected light pulse in the light reception signal; and
a time measurement section that performs, on a basis of the first signal change, a first measurement operation of measuring a first time interval from an emission timing of the first light pulse in the light source section to a reception timing of the first reflected light pulse in the light receiver.

(2)
The distance sensor according to (1), in which
the first signal change is a signal change corresponding to a posterior end of the first reflected light pulse,
the emission timing is a posterior end timing of the first light pulse, and
the reception timing is a posterior end timing of the first reflected light pulse.

(3)
The distance sensor according to (1) or (2), in which the light receiver further includes
a first transistor that has a gate, a source, and a drain, one of the source and the drain being coupled to the photodiode, another one of the source and the drain being coupled to a first node,
a signal converter that is coupled to the first node, stores the signal charge, and converts the signal charge into a voltage,
a second transistor that has a gate, a source, and a drain, one of the source and the drain being supplied with a predetermined voltage, another one of the source and the drain being coupled to the first node, and
an output section that outputs a voltage corresponding to a voltage in the first node.

(4)
The distance sensor according to (1) or (2), in which
the photodiode is coupled to a first node and stores the signal charge, and
the light receiver further includes
a second transistor that has a gate, a source, and a drain, one of the source and the drain being supplied with a predetermined voltage, another one of the source and the drain being coupled to the first node, and
an output section that outputs a voltage corresponding to a voltage in the first node.

(5)
The distance sensor according to (3) or (4), in which a gate length of the gate of the second transistor is longer than a gate width of the gate of the second transistor.

(6)
The distance sensor according to any one of (3) to (5), further including
a driver configured to apply, to the gate of the second transistor, an intermediate voltage between an on voltage that causes the second transistor to be in an on state and an off voltage that causes the second transistor to be in an off state.

(7)
The distance sensor according to any one of (3) to (5), further including
a driver configured to apply selectively, to the gate of the second transistor, an off voltage that causes the second transistor to be in an off state and an intermediate voltage between an on voltage that causes the second transistor to be in an on state and the off voltage.

(8)
The distance sensor according to (7), in which the driver applies the intermediate voltage to the gate of the second transistor during a first time period, and applies alternately the intermediate voltage and the off voltage to the gate of the second transistor during a second time period that follows the first time period.

(9)
The distance sensor according to any one of (3) to (5), further including
a driver configured to apply selectively, to the gate of the second transistor, an on voltage that causes the second transistor to be in an on state and an off voltage that causes the second transistor to be in an off state, in which
the driver applies the on voltage to the gate of the second transistor during a first time period, and applies the off voltage to the gate of the second transistor during a second time period that follows the first time period, and
the signal change detector performs the first detection operation during the second time period.

(10)
The distance sensor according to any one of (3) to (5), further including
a driver configured to change a voltage to be applied to the gate of the second transistor.

(11)
The distance sensor according to any one of (1) to (10), in which the signal change detector detects the first signal change by comparing, with a predetermined threshold, a difference between two signal values at two timings apart from each other by a predetermined time period in the light reception signal.

(12)
The distance sensor according to any one of (1) to (10), in which the signal change detector detects the first signal change by comparing a differential value of the light reception signal with a predetermined threshold.

(13)
The distance sensor according to any one of (1) to (12), in which the signal change detector amplifies the light reception signal, and performs the first detection operation on a basis of the amplified light reception signal.

(14)
The distance sensor according to any one of (1) to (13), in which the photodiode includes an avalanche photodiode.

(15)

A distance measurement device including:
a light source section that emits a first light pulse;
a controller that instructs the light source section to emit the first light pulse;
a lens that a first reflected light pulse corresponding to the first light pulse enters;
a light receiver that includes a photodiode which causes a signal charge to be generated by receiving the first reflected light pulse via the lens, and generates a light reception signal by storing the signal charge and converting the signal charge into a voltage;
a signal change detector that performs a first detection operation of detecting a first signal change corresponding to the first reflected light pulse in the light reception signal; and
a time measurement section that performs, on a basis of the first signal change, a first measurement operation of measuring a first time interval from an emission timing of the first light pulse in the light source section to a reception timing of the first reflected light pulse in the light receiver.

(16)

The distance measurement device according to (15), in which
the first signal change is a signal change corresponding to a posterior end of the first reflected light pulse,
the emission timing is a posterior end timing of the first light pulse, and
the reception timing is a posterior end timing of the first reflected light pulse.

(17)

The distance measurement device according to (16), in which
the light source section includes
a light source that emits the first light pulse, and
a light source controller that controls emission of the first light pulse in the light source,
the light source controller includes
a current source that causes a light emission current to flow to the light source,
a switch that is provided in a path of the light emission current, and
a switch controller that controls an operation of the switch,
the switch controller turns the switch off at a posterior end timing of the first light pulse, and
the emission timing corresponds to a timing at which the switch is turned off.

(18)

The distance measurement device according to any one of (15) to (17), in which
the controller instructs the light source section to emit, in addition to the first light pulse, a second light pulse that follows the first light pulse,
the photodiode causes the signal charge to be generated by receiving a second reflected light pulse corresponding to the second light pulse,
the signal change detector performs a second detection operation of detecting a second signal change corresponding to the second reflected light pulse in the light reception signal, and
the time measurement section performs, on a basis of the second signal change, a second measurement operation of measuring a second time interval from an emission timing of the second light pulse in the light source section to a reception timing of the second reflected light pulse in the light receiver.

(19)

The distance measurement device according to (18), in which the light source section includes a light source that emits the first light pulse and the second light pulse.

(20)

The distance measurement device according to (18), in which the light source section includes
a first light source that emits the first light pulse, and
a second light source that emits the second light pulse, the second light source being different in type from the first light source.

(21)

The distance measurement device according to any one of (18) to (20), in which
the time measurement section includes
a clock generator that generates a clock signal, and
a time counter that measures the first time interval and the second time interval by performing a count operation on a basis of the clock signal, and
the clock generator sets, in the first measurement operation, a cycle of the clock signal to a first cycle, and sets, in the second measurement operation, a cycle of the clock signal to a second cycle.

(22)

The distance measurement device according to (21), in which, in the first measurement operation, the time counter starts the count operation at the emission timing of the first light pulse in the light source section, and stops the count operation on a basis of the first signal change.

(23)

The distance measurement device according to (22), in which,
in the first measurement operation, in a case where the count operation does not stop within a time period of a predetermined length from the emission timing of the first light pulse, the time counter stops the count operation at an end of the time period of the predetermined length, and,
in the second measurement operation, the time counter resumes the count operation at a timing at which a time period, which is the same as the time period of the predetermined length, has elapsed from the emission timing of the second light pulse, and stops the count operation on a basis of the second signal change.

(24)

An image sensor including:
a controller that instructs a light source section to emit a first light pulse;
a plurality of light receivers that each includes a photodiode which causes a signal charge to be generated by receiving a first reflected light pulse corresponding to the first light pulse, and each generates a light reception signal by storing the signal charge and converting the signal charge into a voltage;
a signal change detector that performs a first detection operation of detecting a first signal change corresponding to the first reflected light pulse in the light reception signal; and
a measurement section that performs, on a basis of the first signal change, a first measurement operation of measuring a first time interval from an emission timing of the first light pulse in the light source section to a reception timing of the first reflected light pulse in the light receiver.

(25)

The image sensor according to (24), in which
the controller further controls the image sensor to operate in one of a plurality of operation modes including a first operation mode,
the measurement section includes
a clock generator that generates a clock signal, and
a counter that performs a count operation on a basis of the clock signal,
the plurality of light receivers each generates the light reception signal on a basis of the first reflected light pulse in the first operation mode,
the signal change detector performs the first detection operation in the first operation mode, and
the counter measures the first time interval by stopping the count operation on a basis of the first signal change in the first operation mode.

(26)

The image sensor according to (25), in which
the measurement section includes a signal generator that generates a reference signal whose voltage level changes,
the plurality of operation modes includes a second operation mode,
the plurality of light receivers each generates a pixel signal corresponding to an amount of light received in the second operation mode, and
the counter converts the pixel signal into a pixel value by stopping the count operation on a basis of a result of a comparison between the reference signal and the pixel signal in the second operation mode.

This application claims the benefit of Japanese Priority Patent Application JP2017-152501 filed with the Japan Patent Office on Aug. 7, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A distance sensor comprising:
a controller that instructs a light source section to emit a first light pulse, the first light pulse including a first ramp portion between a first signal level and a second signal level and a first discrete signal edge between the first signal level and the second signal level that is different from the first ramp portion;
a light receiver that includes a photodiode which causes a signal charge to be generated by receiving a first reflected light pulse corresponding to the first light pulse, and generates a light reception signal by storing the signal charge and converting the signal charge into a voltage;
a signal edge detector that performs a first detection operation of detecting the first discrete signal edge corresponding to the first reflected light pulse in the light reception signal; and
a time measurement section that performs, on a basis of the first discrete signal edge, a first measurement operation of measuring a first time interval from an emission timing of the first light pulse in the light source section to a reception timing of the first reflected light pulse in the light receiver.

2. The distance sensor according to claim 1, wherein
the first discrete signal edge is a signal edge corresponding to a posterior end of the first reflected light pulse, the emission timing is a posterior end timing of the first light pulse, and
the reception timing is a posterior end timing of the first reflected light pulse.

3. The distance sensor according to claim 1, wherein the light receiver further includes
a first transistor that has a gate, a source, and a drain, one of the source and the drain being coupled to the photodiode, another one of the source and the drain being coupled to a first node,
a signal converter that is coupled to the first node, stores the signal charge, and converts the signal charge into a voltage,
a second transistor that has a gate, a source, and a drain, one of the source and the drain being supplied with a predetermined voltage, another one of the source and the drain being coupled to the first node, and
an output section that outputs a voltage corresponding to a voltage in the first node.

4. The distance sensor according to claim 1, wherein
the photodiode is coupled to a first node and stores the signal charge, and
the light receiver further includes
a second transistor that has a gate, a source, and a drain, one of the source and the drain being supplied with a predetermined voltage, another one of the source and the drain being coupled to the first node, and
an output section that outputs a voltage corresponding to a voltage in the first node.

5. The distance sensor according to claim 3, wherein a gate length of the gate of the second transistor is longer than a gate width of the gate of the second transistor.

6. The distance sensor according to claim 3, further comprising
a driver configured to apply, to the gate of the second transistor, an intermediate voltage between an on voltage that causes the second transistor to be in an on state and an off voltage that causes the second transistor to be in an off state.

7. The distance sensor according to claim 3, further comprising
a driver configured to apply selectively, to the gate of the second transistor, an off voltage that causes the second transistor to be in an off state and an intermediate voltage between an on voltage that causes the second transistor to be in an on state and the off voltage.

8. The distance sensor according to claim 7, wherein the driver applies the intermediate voltage to the gate of the second transistor during a first time period, and applies alternately the intermediate voltage and the off voltage to the gate of the second transistor during a second time period that follows the first time period.

9. The distance sensor according to claim 3, further comprising
a driver configured to apply selectively, to the gate of the second transistor, an on voltage that causes the second transistor to be in an on state and an off voltage that causes the second transistor to be in an off state, wherein
the driver applies the on voltage to the gate of the second transistor during a first time period, and applies the off voltage to the gate of the second transistor during a second time period that follows the first time period, and
the signal edge detector performs the first detection operation during the second time period.

10. The distance sensor according to claim 3, further comprising
a driver configured to change a voltage to be applied to the gate of the second transistor.

11. The distance sensor according to claim 1, wherein the signal edge detector detects the first discrete signal edge by comparing, with a predetermined threshold, a difference between two signal values at two timings apart from each other by a predetermined time period in the light reception signal.

12. The distance sensor according to claim 1, wherein the signal edge detector detects the first discrete signal edge by comparing a differential value of the light reception signal with a predetermined threshold.

13. The distance sensor according to claim 1, wherein the signal edge detector amplifies the light reception signal, and performs the first detection operation on a basis of the amplified light reception signal.

14. The distance sensor according to claim 1, wherein the photodiode includes an avalanche photodiode.

15. A distance measurement device comprising:
a light source section that emits a first light pulse, the first light pulse including a first ramp portion between a first signal level and a second signal level and a first discrete signal edge between the first signal level and the second signal level that is different from the first ramp portion;
a controller that instructs the light source section to emit the first light pulse;
a lens that a first reflected light pulse corresponding to the first light pulse enters;
a light receiver that includes a photodiode which causes a signal charge to be generated by receiving the first reflected light pulse via the lens, and generates a light reception signal by storing the signal charge and converting the signal charge into a voltage;
a signal edge detector that performs a first detection operation of detecting the first discrete signal edge corresponding to the first reflected light pulse in the light reception signal; and
a time measurement section that performs, on a basis of the first discrete signal edge, a first measurement operation of measuring a first time interval from an emission timing of the first light pulse in the light source section to a reception timing of the first reflected light pulse in the light receiver.

16. The distance measurement device according to claim 15, wherein
the first discrete signal edge is a signal edge corresponding to a posterior end of the first reflected light pulse,
the emission timing is a posterior end timing of the first light pulse, and
the reception timing is a posterior end timing of the first reflected light pulse.

17. The distance measurement device according to claim 16, wherein
the light source section includes
a light source that emits the first light pulse, and
a light source controller that controls emission of the first light pulse in the light source,
the light source controller includes
a current source that causes a light emission current to flow to the light source,
a switch that is provided in a path of the light emission current, and
a switch controller that controls an operation of the switch, the switch controller turns the switch off at a posterior end timing of the first light pulse, and
the emission timing corresponds to a timing at which the switch is turned off.

18. The distance measurement device according to claim 15, wherein
the controller instructs the light source section to emit, in addition to the first light pulse, a second light pulse that follows the first light pulse,
the photodiode causes the signal charge to be generated by receiving a second reflected light pulse corresponding to the second light pulse,
the signal edge detector performs a second detection operation of detecting a second signal edge corresponding to the second reflected light pulse in the light reception signal, and
the time measurement section performs, on a basis of the second signal edge, a second measurement operation of measuring a second time interval from an emission timing of the second light pulse in the light source section to a reception timing of the second reflected light pulse in the light receiver.

19. The distance measurement device according to claim 18, wherein the light source section includes a light source that emits the first light pulse and the second light pulse.

20. The distance measurement device according to claim 18, wherein the light source section includes
a first light source that emits the first light pulse, and
a second light source that emits the second light pulse, the second light source being different in type from the first light source.

21. The distance measurement device according to claim 18, wherein
the time measurement section includes
a clock generator that generates a clock signal, and
a time counter that measures the first time interval and the second time interval by performing a count operation on a basis of the clock signal, and
the clock generator sets, in the first measurement operation, a cycle of the clock signal to a first cycle, and sets, in the second measurement operation, a cycle of the clock signal to a second cycle.

22. The distance measurement device according to claim 21, wherein, in the first measurement operation, the time counter starts the count operation at the emission timing of the first light pulse in the light source section, and stops the count operation on a basis of the first discrete signal edge.

23. The distance measurement device according to claim 22, wherein,
in the first measurement operation, in a case where the count operation does not stop within a time period of a predetermined length from the emission timing of the first light pulse, the time counter stops the count operation at an end of the time period of the predetermined length, and,
in the second measurement operation, the time counter resumes the count operation at a timing at which a time period, which is the same as the time period of the predetermined length, has elapsed from the emission timing of the second light pulse, and stops the count operation on a basis of the second signal edge.

24. An image sensor comprising:
a controller that instructs a light source section to emit a first light pulse, the first light pulse including a first ramp portion between a first signal level and a second signal level and a first discrete signal edge between the first signal level and the second signal level that is different from the first ramp portion;

a plurality of light receivers that each includes a photodiode which causes a signal charge to be generated by receiving a first reflected light pulse corresponding to the first light pulse, and each generates a light reception signal by storing the signal charge and converting the signal charge into a voltage;

a signal edge detector that performs a first detection operation of detecting the first discrete signal edge corresponding to the first reflected light pulse in the light reception signal; and a measurement section that performs, on a basis of the first discrete signal edge, a first measurement operation of measuring a first time interval from an emission timing of the first light pulse in the light source section to a reception timing of the first reflected light pulse in one of the plurality of light receivers.

25. The image sensor according to claim 24, wherein the controller further controls the image sensor to operate in one of a plurality of operation modes including a first operation mode, the measurement section includes
  a clock generator that generates a clock signal, and
  a counter that performs a count operation on a basis of the clock signal, the plurality of light receivers each generates the light reception signal on a basis of the first reflected light pulse in the first operation mode, the signal edge detector performs the first detection operation in the first operation mode, and the counter measures the first time interval by stopping the count operation on a basis of the first discrete signal edge in the first operation mode.

26. The image sensor according to claim 25, wherein the measurement section includes a signal generator that generates a reference signal whose voltage level changes, the plurality of operation modes includes a second operation mode, the plurality of light receivers each generates a pixel signal corresponding to an amount of light received in the second operation mode, and the counter converts the pixel signal into a pixel value by stopping the count operation on a basis of a result of a comparison between the reference signal and the pixel signal in the second operation mode.

* * * * *